(12) United States Patent
Solomon

(10) Patent No.: US 7,837,424 B2
(45) Date of Patent: Nov. 23, 2010

(54) STORAGE AND RETRIEVAL SYSTEM

(75) Inventor: Stanley B. Solomon, Rolling Hills Estates, CA (US)

(73) Assignee: Worthwhile Products, Rolling Hills Estates, CA (US)

( * ) Notice: Subject to any disclaimer, the term of this patent is extended or adjusted under 35 U.S.C. 154(b) by 278 days.

(21) Appl. No.: 11/854,232

(22) Filed: Sep. 12, 2007

(65) Prior Publication Data
US 2008/0003083 A1   Jan. 3, 2008

Related U.S. Application Data

(63) Continuation-in-part of application No. 11/308,791, filed on May 4, 2006, which is a continuation-in-part of application No. 11/195,248, filed on Aug. 1, 2005, now Pat. No. 7,168,905.

(51) Int. Cl.
B65G 1/127 (2006.01)
(52) U.S. Cl. ............. 414/331.04; 414/282; 414/331.06; 198/580; 312/267
(58) Field of Classification Search ............ 104/130.07; 198/580; 312/131, 132, 266, 267; 414/331.03, 414/331.04, 331.06, 237, 282
See application file for complete search history.

(56) References Cited

U.S. PATENT DOCUMENTS

| | | | |
|---|---|---|---|
| 2,089,341 A | 8/1937 | Cocks | |
| 2,451,120 A | 10/1948 | Rossetter | |
| 2,617,700 A | 11/1952 | Christie et al. | |
| 2,881,041 A * | 4/1959 | Liebman | 312/267 |
| 3,717,102 A * | 2/1973 | Lott et al. | 104/130.07 |
| 3,763,991 A | 10/1973 | Batiik | |
| 3,860,130 A | 1/1975 | Frangos | |
| 4,191,435 A | 3/1980 | Lehman | |
| 4,422,554 A | 12/1983 | Lichti | |
| 4,615,430 A | 10/1986 | Satoh | |
| 5,921,739 A * | 7/1999 | Keip | 414/331.14 |
| 6,792,935 B2 | 9/2004 | Williams et al. | |
| 6,851,611 B1 | 2/2005 | Shaw-Sinclair | |
| 6,870,464 B2 | 3/2005 | Okamura | |
| 6,923,612 B2 | 8/2005 | Hansl | |
| 6,927,692 B1 | 8/2005 | Petrinovic | |
| 6,996,538 B2 | 2/2006 | Lucas | |
| 2003/0118428 A1 * | 6/2003 | McFarland | 414/331.04 |

* cited by examiner

Primary Examiner—Gregory W Adams
Assistant Examiner—Jonathan D Snelting
(74) Attorney, Agent, or Firm—Kelly Lowry & Kelley, LLP

(57) ABSTRACT

A storage and retrieval system includes a continuous track and a plurality of individual storage units stacked in multiple columns or rows. Each storage unit is engaged with the track for selective movement along the track. Each storage unit includes two sets of wheels, a first set of wheels for engaging the continuous track, and a second set of wheels for engaging support rails disposed above an upper rail of first and second tracks of the continuous track, so as to support the storage unit as the storage unit passes gaps in the upper rail due to intermediate vertical rails extending downwardly intermediate ends thereof.

25 Claims, 42 Drawing Sheets

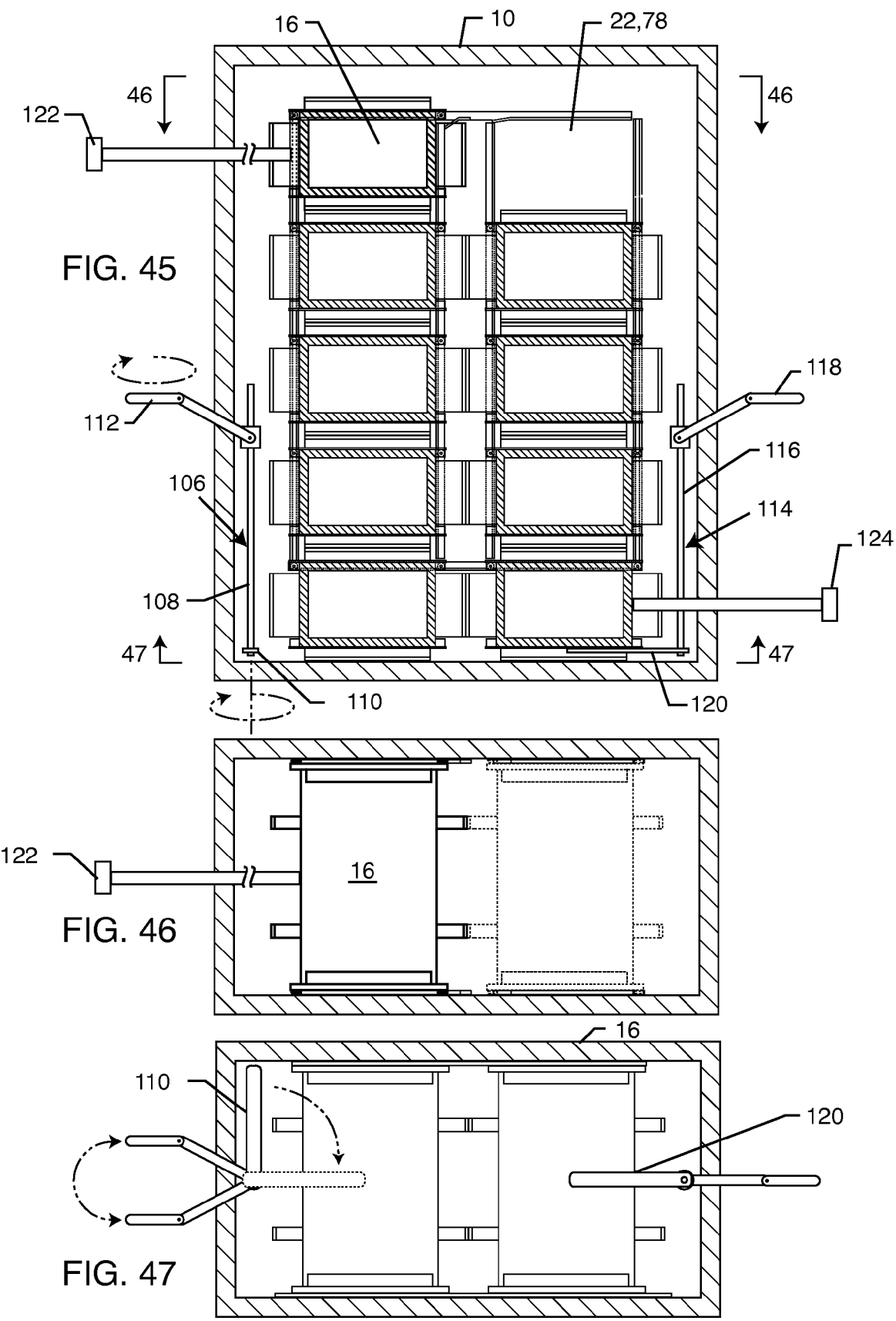

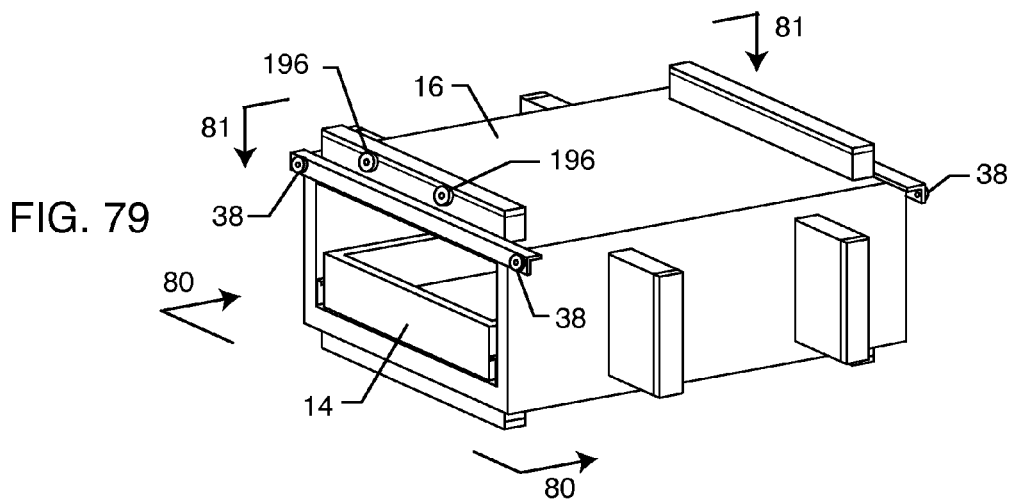
FIG. 79
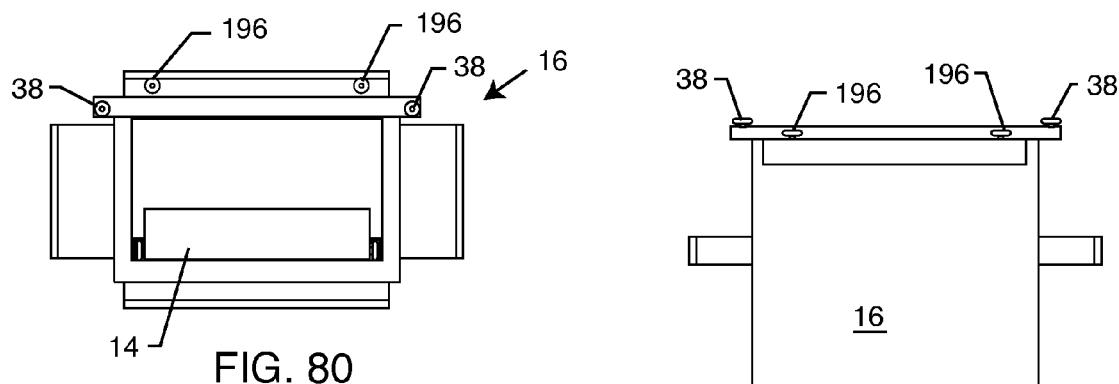
FIG. 80
FIG. 81
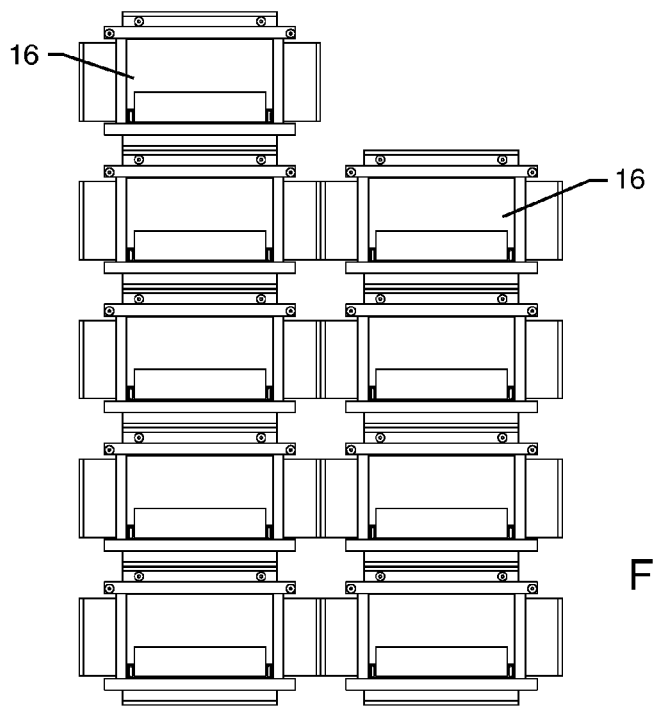
FIG. 82

STORAGE AND RETRIEVAL SYSTEM

BACKGROUND OF THE INVENTION

The present invention generally relates to storage and retrieval systems. More particularly, the present invention is directed towards a modular storage and retrieval system employing a plurality of movable storage units, as well as an inventory control system for tracking the location of the individual movable storage units, and the contents thereof.

In the kitchen, pots, pans, flour, condiments, boxes and cans of food, mixers and other paraphernalia are usually stored in drawers and cupboards which are scattered throughout the kitchen. Pots and pans are ordinarily kept in cupboards which are dark, difficult to access and maintain. The average housewife is subjected to considerable exercise and rummaging through cupboards in an attempt to locate a pot or pan of the desired shape and size. Many cupboards are either below sinks or stoves, or elevated. This requires the housewife to bend down to find the desired container, pot or food article, or sometimes stand on a chair to retrieve these items. The storage of such kitchen equipment and food takes up a large number of cubic feet of space, some of which is wasted as the items are not readily retrievable in corners and the like.

A similar problem is encountered with closets, which are used to store shoes, pants, blouses, dresses, socks and other non-clothing items. Oftentimes, shoes are stored on the floor, clothes are hung on elongated rods in the closet (which often do not provide sufficient storage space) and other items are stacked on shelves—often at a considerable height. Such an arrangement presents many of the same disadvantages of kitchen storage.

Retrieving items in such settings is particularly difficult for those individuals who are taller than usual, shorter than usual, elderly or handicapped. Much of the space in corners and near ceilings are wasted space in a household.

The present invention seeks to provide a simplified, efficient and comparatively inexpensive storage conveyor apparatus for easy installation in a kitchen, closet, or the like. The invention can utilize adjacent wasted spaces above stairways, beneath floors, above ceilings, in corners, etc.

Various conveyor systems for a wide variety of goods, including elevating conveyors, horizontal conveyors, and combination types, are known in the prior art. This so-called "dumb-waiter" for elevating various articles in homes, restaurants and the like between different floor levels has long been known. The art relating to storage and display cases provides a number of devices in which two adjacent columns of containers are disposed one behind the other with the upward movement of one column and a downward movement of the adjacent one being obtained by associating the various containers with chains or cables passing over suitable wheels or sprockets. However, such devices present various drawbacks. For example, the type of movement from one column to another characteristic of the chain or cable type mechanism is such that a considerable amount of clearance is required for the containers. Moreover, the sprockets and cables operate under considerable loads and the bearings necessary to support these loads must be mounted upon sufficient structures to adequately carry the stresses to the floor. An elaborate shifting sequence must take place as the tension members pass over the pulleys in order to avoid inverting the containers during the process.

One of the main drawbacks encountered in automatic and semi-automatic storage systems relates to the complexity of the mechanisms used. Such complexity adds to the cost of installing the system, and adversely affects the reliability of such systems. Incorporating chain and pulley systems, unique lifting mechanisms, etc., renders the systems complicated and expensive to build, prone to breakage, and increases maintenance time and costs.

Another drawback encountered with storage systems relates to an owner of an object not being able to remember or locate where that object was stored in their home. The owner of the object may know that the object is stored somewhere in their house but may not be able to remember in which room or in what storage device the object is located. An inventory control system that can identify and keep track of objects is therefore highly desirable. While some objects, such as products purchased from commercial entities (e.g., retail stores, wholesalers or the like) have identifying indicia, such as Uniform Product Code (UPC) numbers, many objects do not. For example, UPC numbers are used on can labels and tags attached to clothing. However, many objects either do not have such labels or tags in the first place or they were removed from the object after purchase.

Accordingly, there is a continuing need for an automated storage and retrieval system which is simplified, efficient and comparatively inexpensive. Moreover, there is a continuing need for an automated storage and retrieval inventory control system which can inform a user whether or not an object is in a storage location; in which part of the storage location the object is located; and find the object no matter where the object is stored. There is a further need for an inventory control system that can associate certain information with an object to identify that object and its location. The present invention fulfills these needs and provides other related advantages.

SUMMARY OF THE INVENTION

The present invention resides in a storage and retrieval inventory control system. The storage and retrieval system of the present invention generally comprises first and second tracks having a generally rectangular configuration, and spaced apart from one another in generally parallel fashion so as to cooperatively form a continuous track. A plurality of individual storage units stacked in multiple columns are disposed between the first and second tracks. Means are provided for selectively moving the storage units along the length of the continuous track.

In a particularly preferred embodiment, the first track comprises generally parallel and spaced apart upper and lower horizontal rails. A first vertical end rail interconnects the upper and lower rails. A first vertical intermediate rail extends between the upper and lower rails in spaced relation to the first vertical end rail. The first vertical end rail and the first vertical intermediate rail cooperatively form a first portion of a first vertical track. A second vertical end rail extends between the upper and lower rails, and a second vertical intermediate rail extends between the upper and lower rails in spaced relation to the second vertical end rail. The second vertical end rail and the second vertical intermediate rail cooperatively form a first portion of a second vertical track.

The second track is spaced apart from the first track and in parallel relation thereto. The second track comprises generally parallel and spaced apart upper and lower horizontal rails. A first vertical end rail interconnects the upper and lower rails, and a first vertical intermediate rail extends between the upper and lower rails in spaced relation with the first vertical end rail. The first vertical end rail and the first vertical intermediate rail cooperatively form a second portion of the first vertical track. A second vertical end rail extends between the upper and lower rails. A second vertical intermediate rail extends between the upper and lower rails in spaced relation to the second vertical end rail, the second vertical end rail and the second vertical intermediate rail cooperatively forming a second portion of the second vertical track.

A first support rail is disposed above the upper rail of the first track. The first support rail extends at least the length of the gap between the first and second vertical intermediate rails of the first track, but less than the length of the upper rail. Similarly, a second support rail is disposed above the upper rail of the second track. The second support rail extends at least the length of the gap between the first and second vertical intermediate rails of the second track, but less than the length of the upper rail of the second track.

A first set of wheels extends from each storage unit and are configured to engage the upper rails or lower rails of the first and second tracks so as to suspend the storage unit from the upper or lower rails of the first and second tracks when the storage unit is disposed in an uppermost or lowermost position in the column, and permit selective movement along the continuous track.

A second set of wheels extend from each storage unit in spaced relation to the first set of wheels, and are configured to engage the first and second support rails as the storage unit is moved between the first vertical track to the second vertical track. A first end column of storage units have wheels which are engaged with the first vertical track. A second end column of stacked storage units is engaged with the second vertical track. In some cases, the first and second end columns are adjacent to one another, and in other cases at least one column of stacked storage units is disposed between the first and second end columns. Typically, the first set of wheels extend from the storage unit a first distance from engagement with the upper and lower rails, and the second set of wheels extend from the storage unit a second distance for engagement with the support rails.

The means for selectively moving the storage units along the continuous track includes a first vertical actuator having an arm selectively moveable under a bottom storage unit of a first end column, and adapted to lift the first end column of storage units. A first horizontal actuator moves a storage unit from a top position in the first end column to a composition in an adjacent column. A second vertical actuator has an arm selectively moveable under a storage unit, and is adapted to support all but a bottom storage unit of the second end column of storage units. A second horizontal actuator moves the bottom storage unit from a bottom position in the second end column to a bottom position of an adjacent column.

Typically, the first and second horizontal actuators include a telescopic ram adapted to extend from and contact a sidewall of a storage unit and push the storage unit to an adjacent column. Preferably, the actuators are power-driven, and operably coupled to control circuitry for coordinating their movement.

In a particularly preferred embodiment, a stop is disposed on the upper rail intermediate the ends thereof, of at least the first or second track. Typically, the stop is biased away from the rail so as to be adapted to permit one-way travel of a storage unit past the stop.

In a particularly preferred embodiment, the system includes means, apart from the track itself, for determining balance of the storage units.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 45 is a cross-sectional diagrammatic view of the present invention, utilizing a manually operated actuating system, in accordance with the present invention.

FIG. 46 is a top view taken generally along line 46-46 of FIG. 45.

FIG. 47 is a bottom view taken generally along line 47-47 of FIG. 45.

FIG. 79 is a perspective view of another storage unit having two sets of wheels, in accordance with the present invention;

FIG. 80 is an end view taken generally along line 80-80 of FIG. 79;

FIG. 81 is a top plan view taken generally along line 81-81 of FIG. 79;

FIG. 82 is a diagrammatic view of a plurality of storage units arranged in two columns, in accordance with the present invention;

DETAILED DESCRIPTION OF THE PREFERRED EMBODIMENTS

As shown in the accompanying drawings, for purposes of illustration, the present invention is directed to a storage and retrieval system. This system is intended to maximize the storage capacity anywhere in a home or business, and allow for easy access and retrievability for anyone whether he or she be tall, short or handicapped, such as in a wheelchair. As will be more fully discussed herein, the design and configuration of the system is not complex so as not to be overly expensive or prone to breakage and maintenance.

Figure 1:
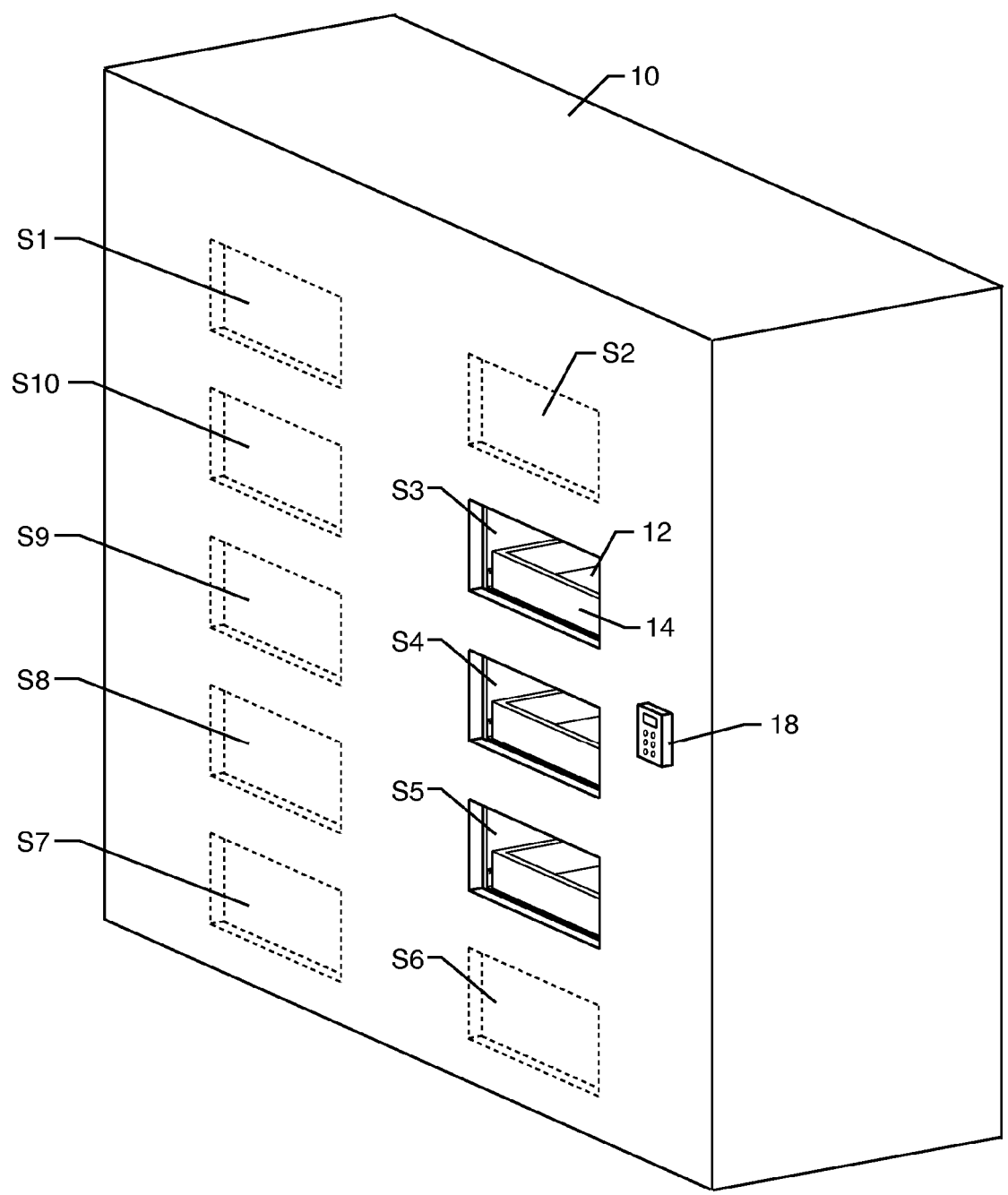
FIG. 1 is a front perspective view of a storage system embodying the present invention.

With reference now to FIG. 1, the storage system of the present invention is illustrated in an upright box structure 10 defining a housing or the like. It will be understood by those skilled in the art that the system of the present invention need not necessarily be housed in such a structure 10, but instead can be built into cabinetry, walls of a home or business, etc.

One or more apertures 12 are formed in the structure 10 for access to drawers 14 which are preferably slidably mounted within a storage unit 16. As will be more fully explained herein, the storage units 16 are stacked upon one another or in aligned or stacked relation so as to form a plurality of columns. In this description, two end columns occupying a total of ten spaces S1-S10, and having a total of nine storage units 16, so as always to present a vacant space (typically in one of the corners of the columns) is used for purposes of illustration. However, it will be readily understood by those skilled in the art that the number of columns and the number of stacked storage units 16 can be varied. For example, there can be as few as two columns having the total of only four spaces, with three storage units 16. Alternatively, there can be a plurality of columns each with two or more storage units 16 stacked upon one another to form the columns. The fewer the columns and larger number of storage units 16, the more vertical in operation is the system. Conversely, the more columns and the fewer number of storage units 16, present a more horizontally operated system. Thus, although two adjacent end columns with a total of nine storage units are used for purpose of illustration and example, the invention is not intended to be limited to such.

In a particularly preferred embodiment, the system of the present invention presents multiple apertures 12, such that multiple drawers 14 or storage units 16 can be accessible at any given time. The apertures or openings 12 are preferably arranged such that a relatively tall person can access the upper most position, and shorter individuals, such as children, or even those in wheelchairs or the like can access a lowermost opening to a storage unit 16.

In a preferred embodiment of the system, a controller 18 is mounted to the structure 10 or wall, or may be in the form of a wireless controller or even a controller wired to the system but placed in another room or the like. The controller 18 is used by the end user to select which storage unit 16 to be present in one of the openings 12 so as to be accessed. The controller 18 includes or communicates with electronic control circuitry for controlling the movement of the storage units 16, as will be more fully described herein. In this manner, the end user can select which storage unit 16 is to be moved into which desired opening 12 by simply entering the commands into the controller 18, such as by using a keypad or the like. Use of a wireless controller would allow one in the kitchen to point the controller 18 to the system and select a given storage unit 16 which might contain a given pot, ingredient, can of food, etc. Similarly, a controller 18 can be placed in another room, such as in a bedroom, so that an individual can select a given storage unit 16 which may contain cold cereal or other breakfast item to be moved into a given opening 12 while the individual showers or traverses the distance between the bedroom and the kitchen. Preferably, the system rotates the storage unit 16 in a relatively rapid manner so that a long wait is not necessary, even if the command is given at the structure 10 itself.

Figure 2:
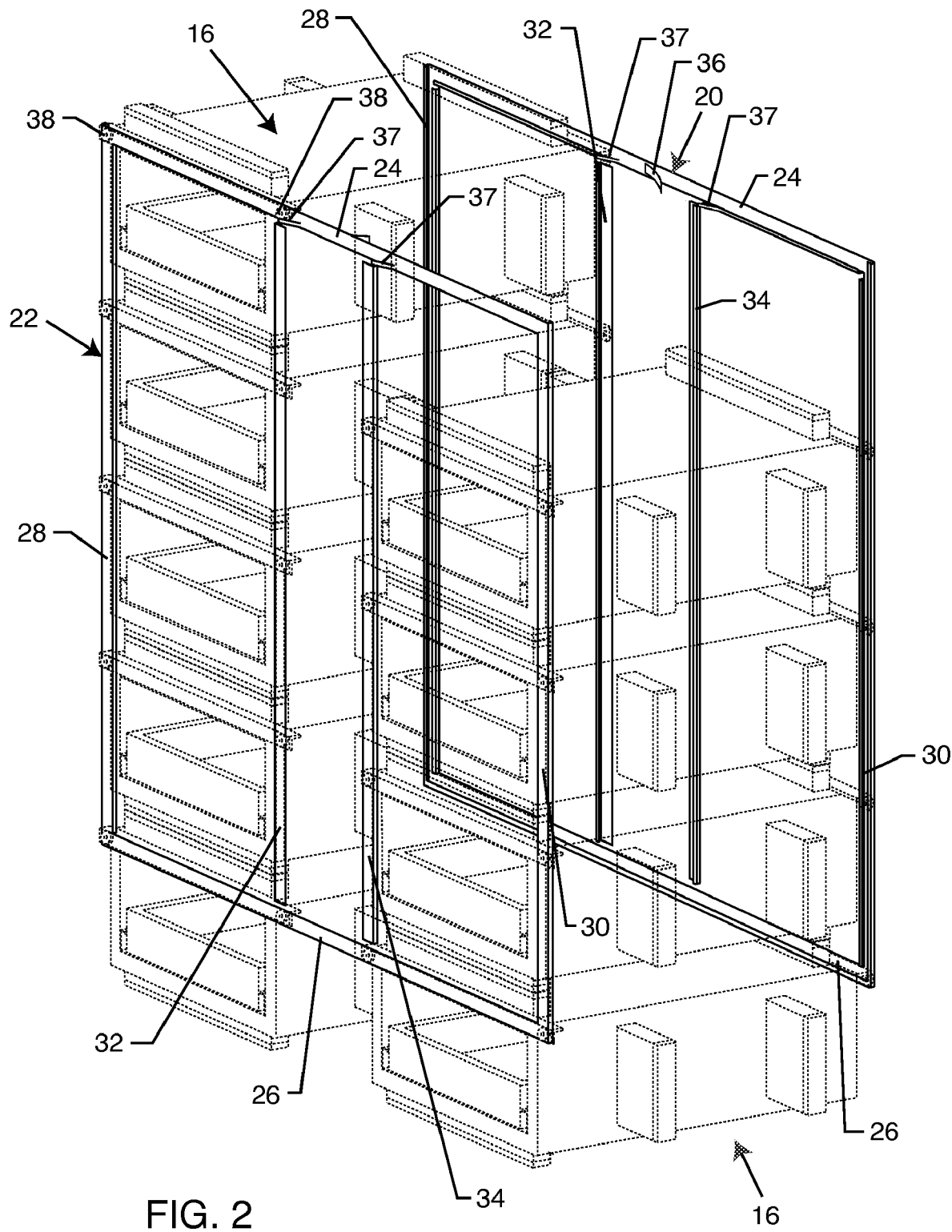
FIG. 2 is a perspective view of a single track system used in accordance with the present invention and showing a plurality of stacked storage units operably connected thereto, in phantom.
Figure 3:
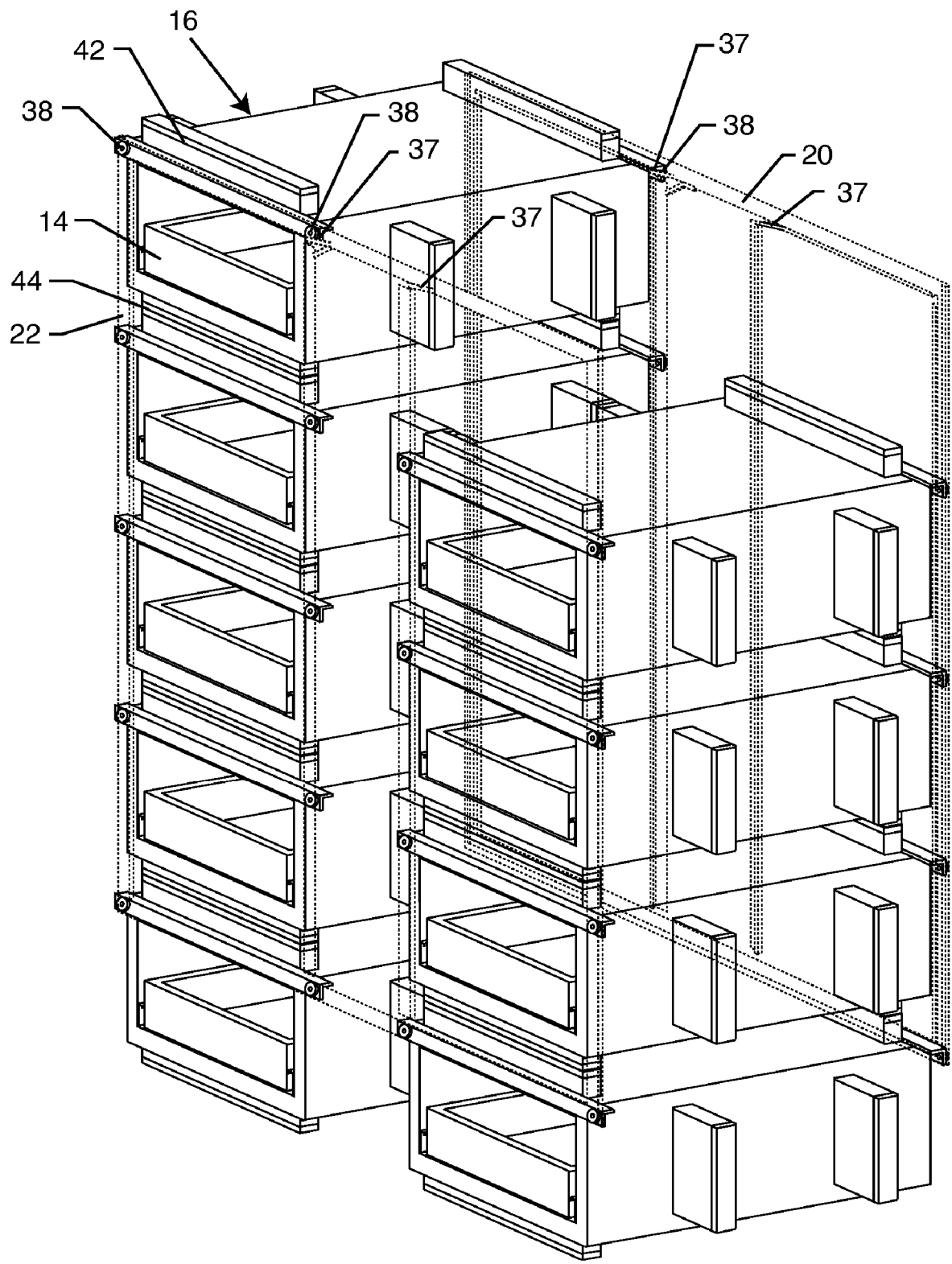
FIG. 3 is a perspective view of the stacked storage units, with the single track illustrated in phantom.
Figure 4:
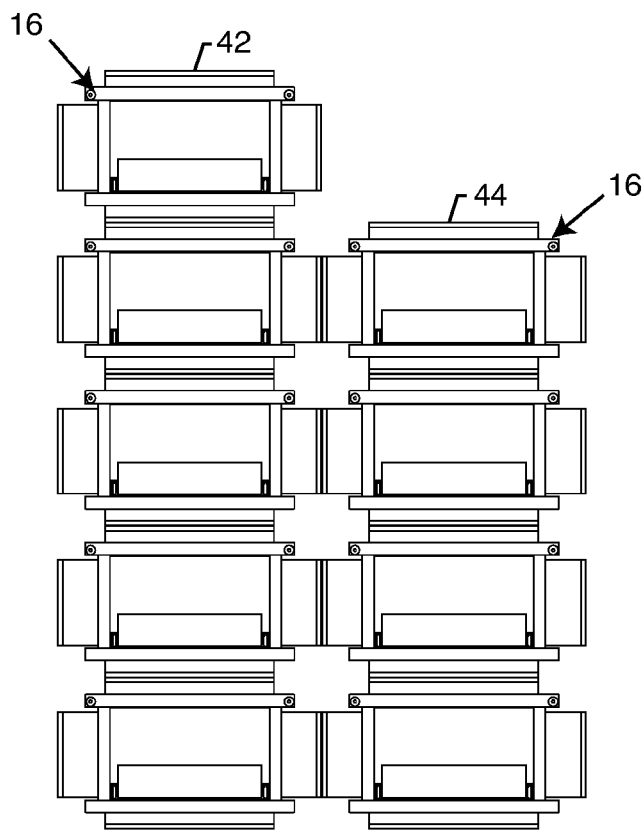
FIG. 4 is a front elevational view of the stacked storage units in accordance with the present invention.
Figure 5:
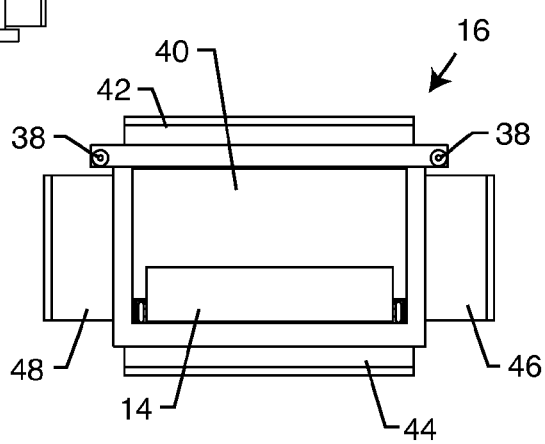
FIG. 5 is a front elevational view of a single storage unit embodying the present invention.
Figure 6:
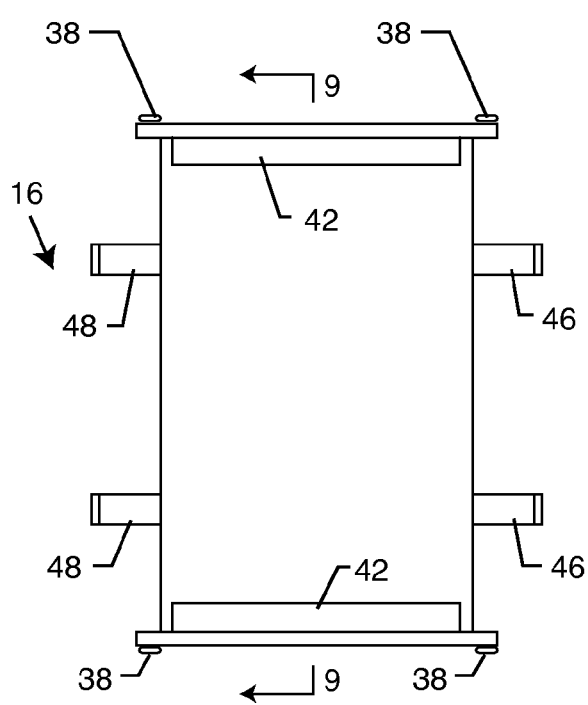
FIG. 6 is a top plan view of the storage unit of FIG. 5.
Figure 7:
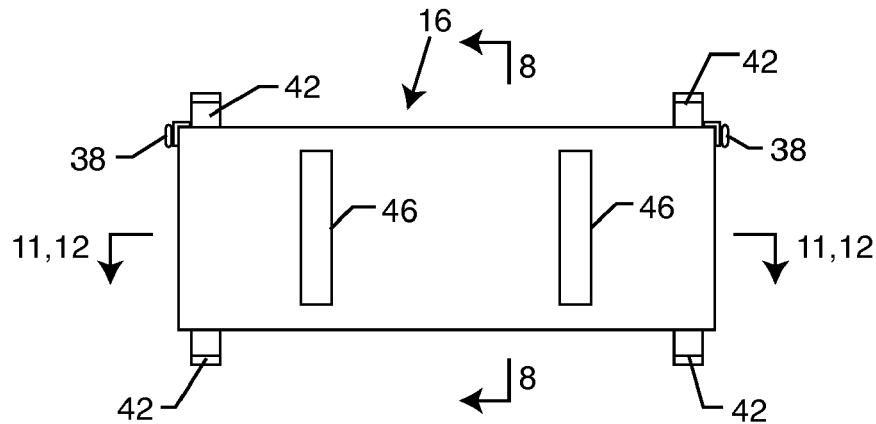
FIG. 7 is a side elevational view of the storage unit of FIG. 5.
Figure 8:
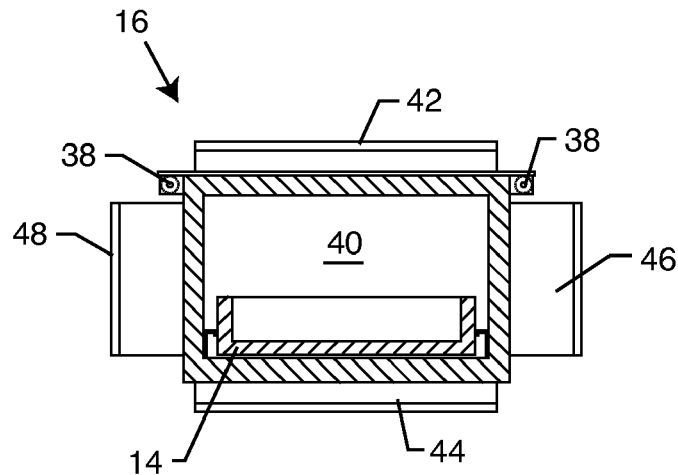
FIG. 8 is a cross-sectional view taken generally along line 8-8 of FIG. 7.
Figure 9:
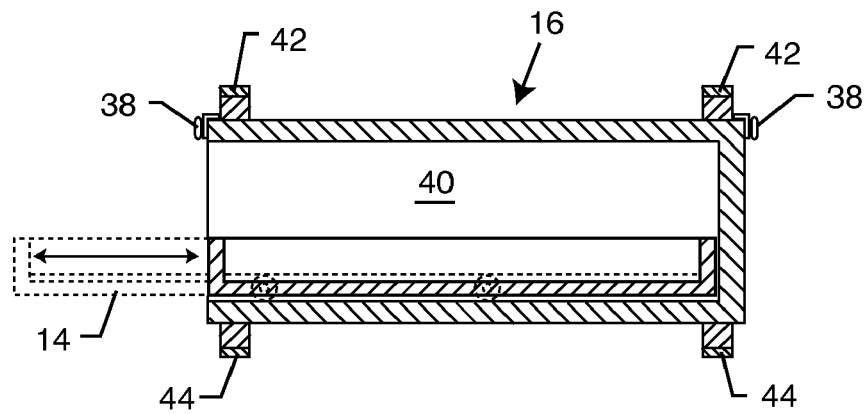
FIG. 9 is a cross-sectional view taken generally along line 9-9 of FIG. 6, illustrating a slidable drawer thereof.

With reference now to FIGS. 2-4, an endless track is shown in FIG. 2 comprising tracks 20 and 22 which are positioned generally parallel to one another and spaced apart a distance substantially equal to the length of a storage unit 16, as illustrated. By "endless" herein, it is intended to convey the meaning that the storage unit 16 can travel in the pre-defined path, typically a circular path, continuously without end. The track system 20 and 22 illustrated in FIG. 2 comprises what is referred to herein as a single track system. That is, each track 20 and 22 includes upper and lower horizontal rails 24 and 26 spaced from one another vertically and positioned along the same plane. The rails 24 and 26 are interconnected with first and second end vertical rails 28 and 30. First and second inner or intermediate rails 32 and 34 are spaced apart from one another and extend from the upper rail 24 to the lower rail 26. The first and second inner or intermediate rails 32 and 34 are disposed intermediate the ends of upper and lower rails 24 and 26. The first track 20 and the second track 22 are mirror images of one another, and are spaced apart from one another and generally parallel to one another so as to perform a continuous track. Moreover, a first end vertical rail 28 and its adjacent intermediate rail 32 form a portion of a first vertical track, the corresponding end rail 28 and adjacent intermediate rail 32 forming the other portion of the first vertical track, which the storage units 16 ride upon in their vertical motion at one end of the continuous track. Similarly, the second end vertical rail 30 of each track 20 and 22 along with the intermediate rail 34 adjacent thereto form portions of a second vertical track which supports a column of storage units 16 at the opposite end of the continuous track.

Although the tracks 20 and 22 are generally square or rectangular, it will be appreciated by those skilled in the art that the movement of the storage unit 16 thereon is generally circular and continuous. The upper rails 24 may include ramps 37 to facilitate smooth transition of storage unit 16 from one column to the next.

As will be more fully discussed herein, each track 20 and 22 includes a flexible stop 36, typically along the uppermost rail 24, and possibly on the lower rail 26. The stop 36 is biased outwardly such that a storage unit 16 can pass thereby, but the stop 36 springs back to prevent the storage unit 16 from reversing travel.

As can be seen in FIGS. 2 and 3, each storage unit 16 includes wheels 38 which engage the track 20 and 22 so that the storage unit 16 is slidably movable along the pair of tracks 20 and 22.

As can be seen from FIG. 2, the wheels 38 of a given storage unit 16 engage corresponding rails 28 and 32 or 30 and 34 when in a vertical motion, and upper rail 24 when positioned at an uppermost position, or bottom rail 26 when in a lower position.

Throughout the description hereof, similar functional structure or components in different embodiments may be labeled with the same reference number. Thus, as can be seen from the description above, the tracks 20 and 22 are substantially identical and mirror-imaged structures.

Of particular reference now to FIGS. 3 and 4, two columns of storage units 16 are illustrated. As discussed above, in the illustrated exemplary embodiment, a total of ten spaces or cavities are available within the structure 10. However, to provide movement of the storage unit 16 in sequential fashion, an empty space is provided, as illustrated in FIGS. 3 and 4. As will be seen herein, this empty space is typically in one of the four corners, or in the upper most and lower most spaces of the end columns. As will be more fully discussed herein, each storage unit 16 travels in a sequential, or generally circular, path during the course of operation of the system.

With reference now to FIGS. 3-9, each storage unit 16 defines an inner cavity 40 for the storage of items therein. In a particularly preferred embodiment, a drawer 14 is disposed within the cavity 40, and is slidably extended and retracted out of and into the cavity 40, such as by rollers, cabinet sliders, tongue and groove inter-connection, etc. Such would enable the end user to pull out the drawer 14 and retrieve selected items therefrom during operation of the system. Although the storage unit 16 of a given system are typically relatively the same size, there may be as few as a single drawer 14 within the inner compartment 40, or a plurality of drawers 14 within the inner compartment 40. Thus, for example, a storage unit 16 with a single drawer 14 could accommodate larger or taller items, such as a two liter bottle of soda. However, placing two or three drawers 14 within the same inner space 40 would enable the storage of smaller cans or other smaller items in each drawer 14. Of course, it will be appreciated that the drawer 14 is not necessary, but rather the items can be stored directly within the inner storage cavity 40.

In a particularly preferred embodiment, spacers 42 and 44 extend from the top and bottom of each storage unit 16. As illustrated in FIGS. 3 and 4, the lower spacers 44 of one storage unit 16 will contact and rest or slide upon the upper spacers 42 of a storage unit 16 immediately below it. Preferably, spacers 46 and 48 extend from the sides of each storage unit 16 as well, such that the storage units are in fixed spaced relationship with one another. In a particularly preferred embodiment, the spacers 42-48 are comprised of or include an outermost layer of relatively friction free material, such as Teflon, plastic, smooth metal, etc. which enable the storage unit 16 to slide past one another relatively easy even if the spacers 42-48 come into contact with one another during the movement of the storage unit 16.

Preferably, the wheels 38 extend from an upper portion of the storage unit 16, such that the storage unit 16 is essentially suspended from the upper or lower rails 24, 26. Suspension renders it relatively easy for the storage unit 16 to be horizontally moved across the upper or lower rails 24 or 26.

With reference to FIGS. 10-13, the storage units 16 are preferably loaded with items such that they are substantially balanced or such that the weight of the items placed therein are centered or substantially spread across the inner cavity 40 or drawer 14 of the storage unit 16. Extreme unbalancing may potentially cause the storage unit's wheels 38 to bind. Accordingly, means are contemplated for indicating balance of the storage unit 16.

Such means can be in the form of visual aids for the end user. For example, a bubble level device 50 can be placed on the storage unit, such as the front panel of the drawer 14, so that the individual can determine that the bubble is within a safe range and the storage unit 16 substantially balanced.

Figure 11:
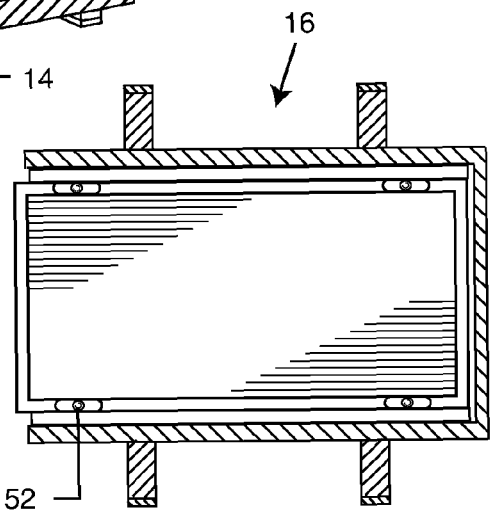
FIG. 11 is a cross-sectional view taken generally along line 11-11 of FIG. 7.

Alternatively, as illustrated in FIG. 11, the storage unit 16 may include electronic sensors 52 which would detect when the storage unit 16 becomes unbalanced. In such case, an alarm, such as a visual or audible alarm, could be activated to alert the end user of the unbalanced situation.

Figure 10:
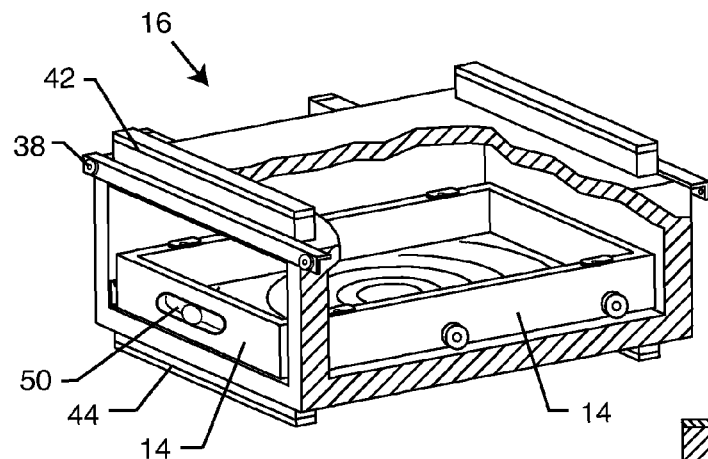
FIG. 10 is a partially sectioned and fragmented perspective view of a storage unit embodying the present invention, having balancing means incorporated therewith.
Figure 12:
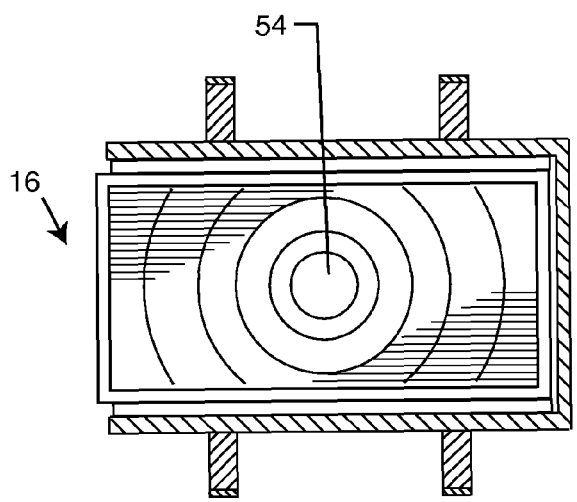
FIG. 12 is a cross-sectional view taken generally along line 12-12 of FIG. 7.
Figure 13:
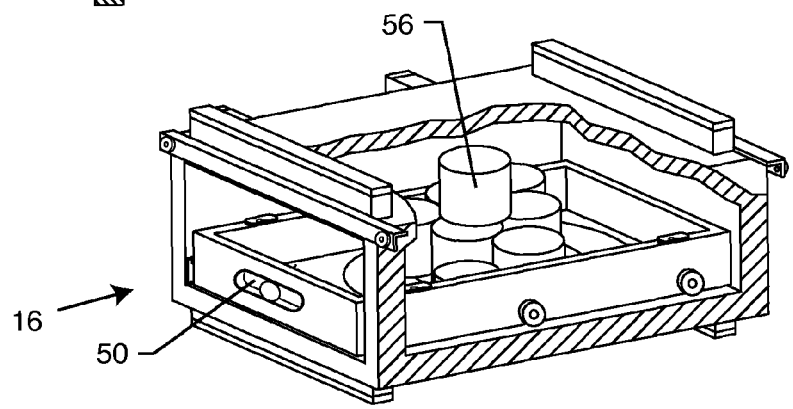
FIG. 13 is a view similar to FIG. 10, but illustrating containers within a drawer of the storage unit.

With reference to FIGS. 10 and 12, another visual means for identifying balance is illustrated. This is referred to herein as the "bulls-eye" method wherein concentric circles are formed in the bottom of the storage unit 16 or drawer 14. The inner most concentric circles could be painted green, and then surrounding circles yellow, even further surrounding circles orange, and the outermost circles red. In addition, a free-floating disc or the like could be placed between the bottom panel of the storage unit 16 or drawer 14 and a clear floor such that if the storage unit 16 were unbalanced, the free-floating disk would travel into an orange or red area, indicating to the end user that the storage unit 16 was imbalanced. In this manner, as illustrated in FIG. 13, items 56 could be placed towards the center of the storage unit 16, or in a substantially uniform manner, such that the storage unit 16 would be more or less balanced.

Other means of balancing the storage unit 16, to the extent necessary, are contemplated by the present invention. For example, each storage unit could have attached thereto a movable weight which slides on a track, which may also be movable along another track, such that the movable counter weight counters the imbalance of weight within the storage unit 16 itself in both the X and Y planes. However, given the fact that the storage unit 16 moves along the tracks 20 and 22 on wheels 38, the potential for binding is minimized.

Figure 14:
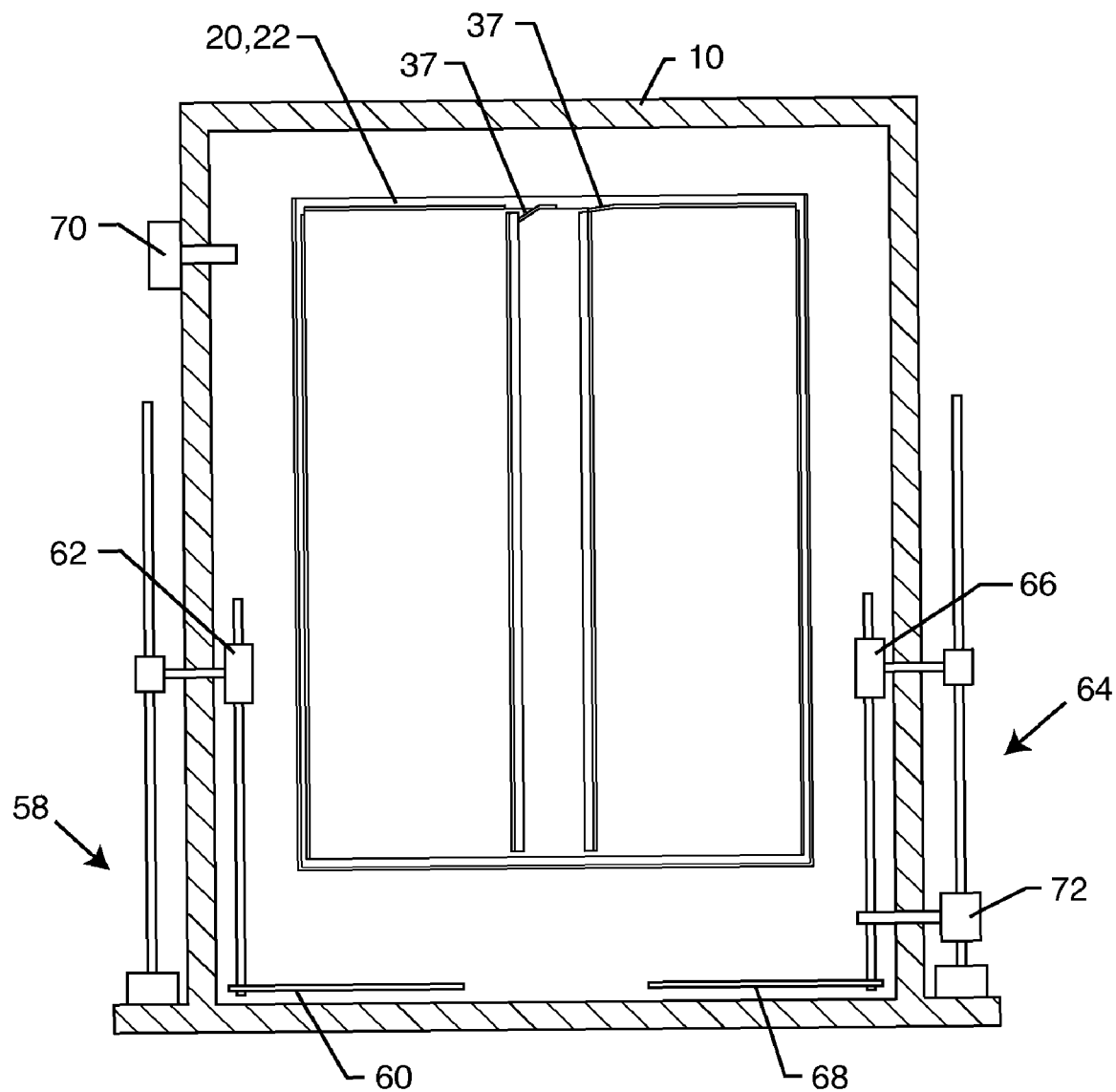
FIG. 14 is a diagrammatic view of a storage system embodying the present invention, with power-driven actuators positioned about the single track system.

With reference now to FIG. 14, the operation of the present invention with respect to the single track system will now be described. As discussed above, the tracks 20 and 22 are typically disposed within a housing and or other structure, such as a cabinet, behind a wall, which may extend into a ceiling or floor, etc. Although the tracks 20, 22 appear to be completely suspended within the structure 10, it will be understood that support members or the like hold the tracks 20 and 22 in place within the structure 10. The storage units 16, as illustrated and described above, are suspended and stacked between the parallel tracks 20, 22 so as to be at least partially supported by the tracks 20 and 22.

Actuators are used to move the storage units. Typically, as discussed above, the actuators are power-driven so as to be capable of lifting substantial weight and operated with control circuitry. However, as will be more fully discussed herein, it is also possible to have a manual back-up system.

The system includes a first vertical actuator 58 which, as will be more fully described herein, serves to lift a column of storage units. The vertical actuator includes an arm 60 which is selectively moveable over an arc, typically of 90°, so as to be positioned below the storage units, or to the side of the storage units. The vertical actuator 58 can comprise a linear actuator, such as that offered by Jaeger Industrial Co., Ltd., under the SuperTak trade name. Such linear actuators are capable of lifting 500 or even 1000 pounds. When a vertical linear actuator is utilized, a rotary actuator 62 is also required to rotate the arm 60 over its arc under and away from the storage units. Other vertical actuators are also feasible, such as those referred to as "pick and place" actuators which are capable of both vertical as well as rotary motion. The cost and design of the system may dictate whether a "pick and place" actuator or multiple actuators 58 and 62 are utilized. Similarly, a second vertical actuator 64, and if necessary a rotary actuator 66 to rotate the arm 68, is disposed on the opposite end column to lower the stacked storage units 16, as will be more fully described herein.

A horizontal actuator 70 is disposed towards an upper left portion of the system and positioned so as to extend a ram or rod inwardly to move a storage unit 16 horizontally, as will be more fully described herein. Similarly, a horizontal actuator 72 is positioned in the lower right hand corner of the system so as to be positioned to push a storage unit 16 from a bottom position of one column to an adjacent column, as will be more fully described herein. This positioning, of course, relies upon a clockwise rotation or sequence of the storage units. If another sequence is desired, the actuators 58, 64, 70 and 72 are repositioned accordingly.

It will be appreciated by those skilled in the art that the system of the present invention does not necessarily need to have a certain or predefined start position or sequence. Typically, the storage units 16 travel in either a clockwise or counter-clockwise manner. The position of the storage unit 16 does not need to be placed at a start point or the like. Instead, the storage unit 16 can be moved from their current position until the desired storage unit is accessible.

Figure 15:
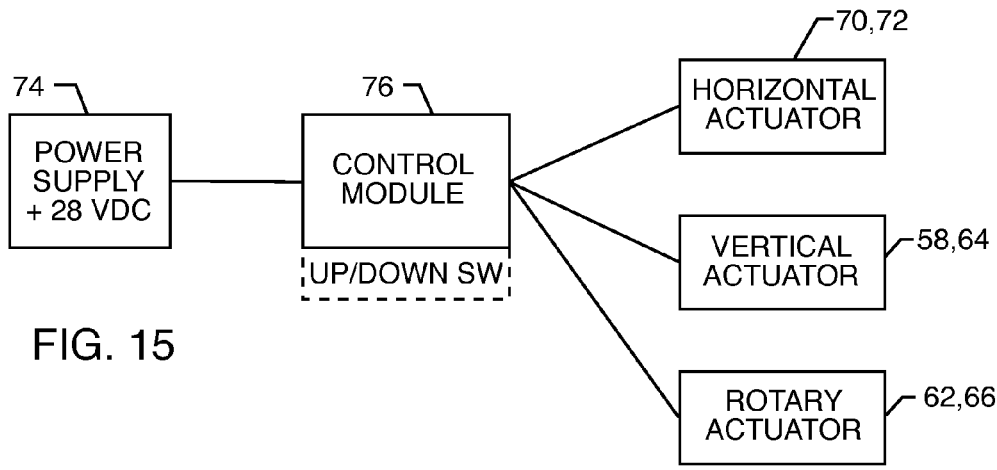
FIG. 15 is a diagrammatic view illustrating control of the power-driven actuators.
Figure 16:
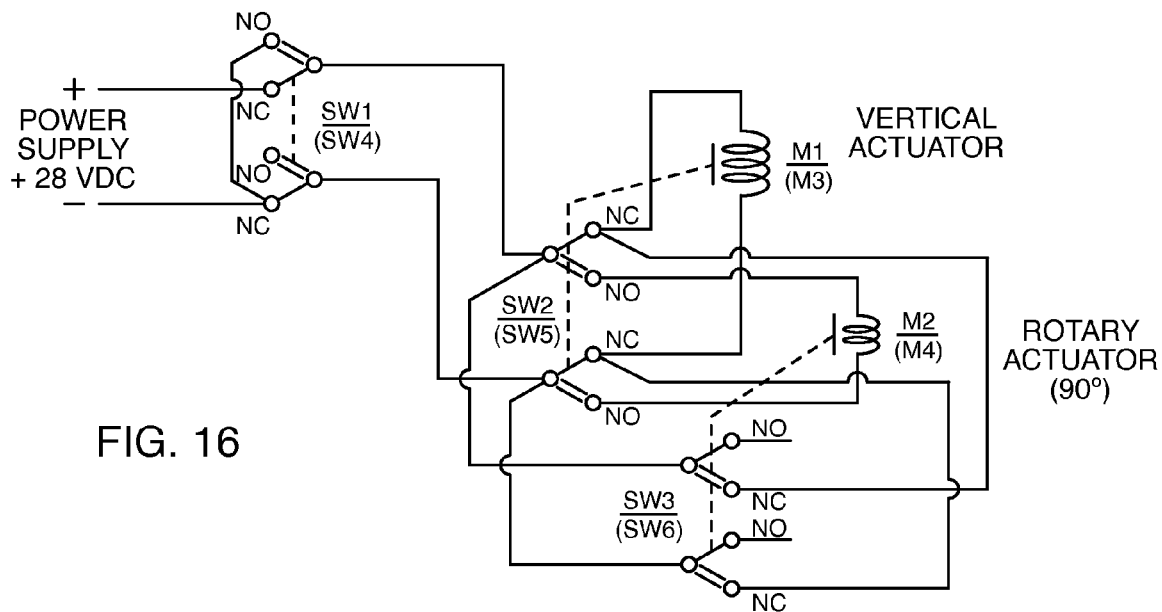
FIG. 16 is an electronic schematic illustrating the control circuitry for vertical and rotary actuators, in accordance with the present invention.
Figure 17:
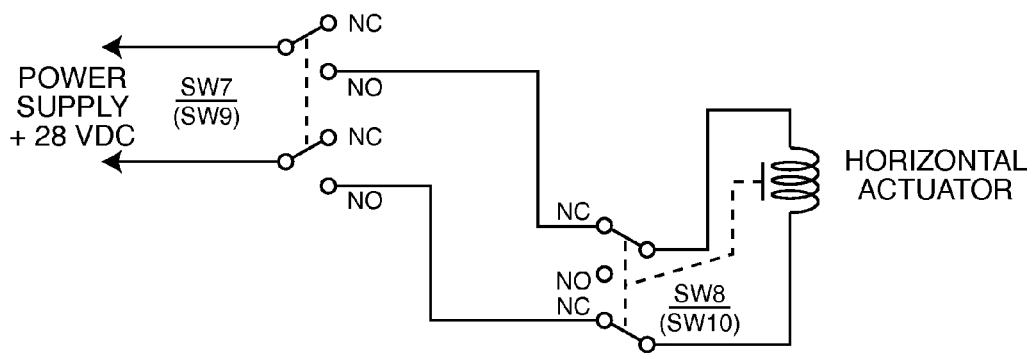
FIG. 17 is an electronic schematic of the control circuitry for operating the horizontal actuators, in accordance with the present invention.

With reference now to FIGS. 15 and 17, in a preferred embodiment, the actuators are power-driven. As such, control circuits control the timing and movement of each of the actuators 58, 64, 70 and 72. With reference now to FIG. 15, a power supply, such as a 28 volt direct current power supply 74 supplies power to a control module 76, such as the illustrated controller 18 in FIG. 1, which serves to control the horizontal actuators 70 and 72, vertical actuators 58 and 64 and rotary actuators 62 and 66, if necessary. It may be that the controller 18 includes merely a power switch which serves to power the control module 76 and cause the storage units 16 to rotate until the desired storage unit is available and accessible to the individual. Alternatively, circuitry can be implemented such that a particular storage unit 16 may be moved into a particular location, as determined by the individual. The control module 76 would then power on the actuators 58, 62, 64, 66, 70 and 72, if necessary. FIGS. 16 and 17 illustrate switches, such as the double-pole, double-throw switches which would be sequentially activated to supply power to the respective actuator. The control module 76 would determine the timing of such switch activation.

Figure 18:
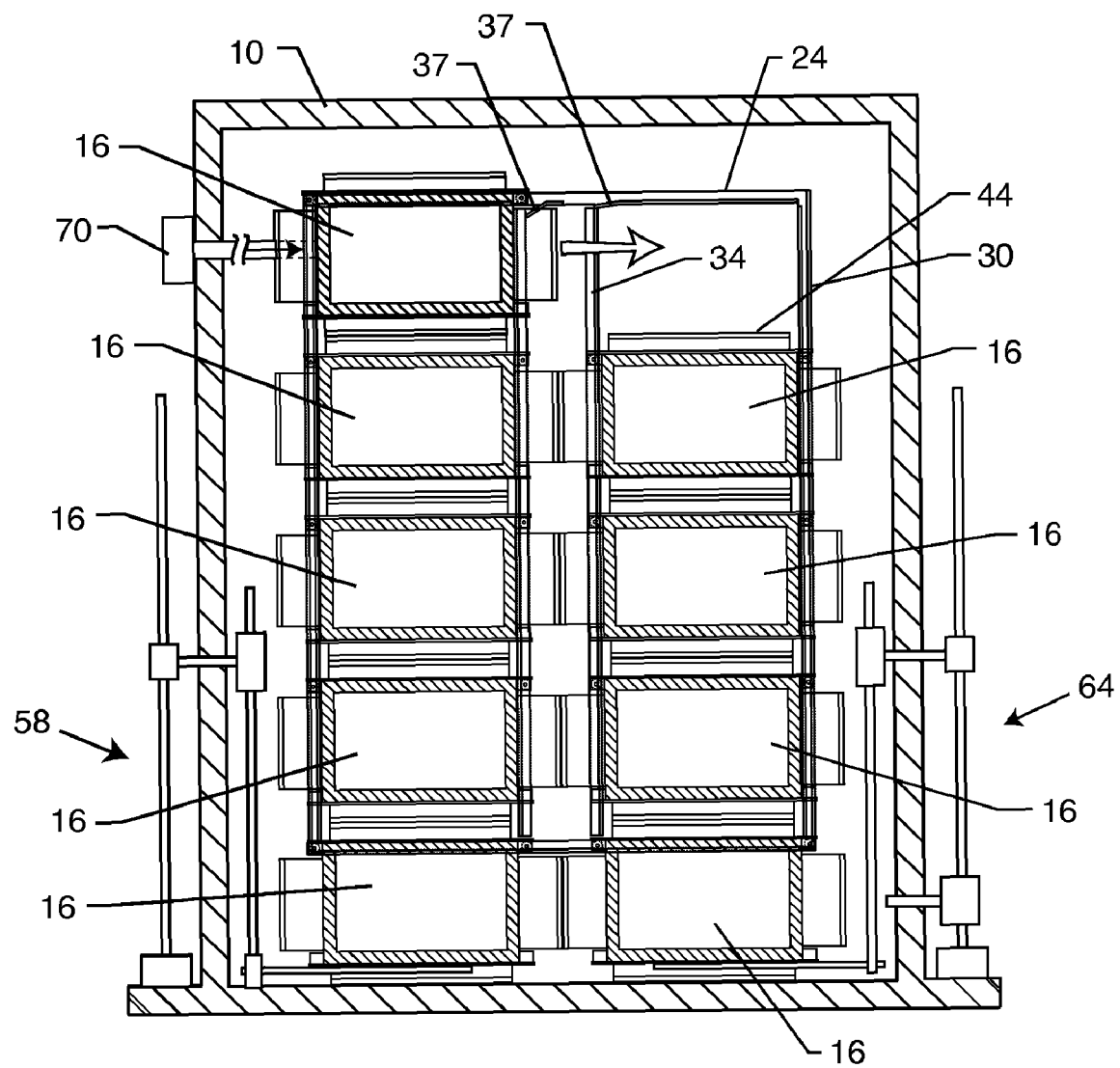
FIG. 18 is a diagrammatic view similar to FIG. 14, but illustrating two columns of storage units, and the operation of the actuators to move a top storage unit from one column to an adjacent column.
Figure 19:
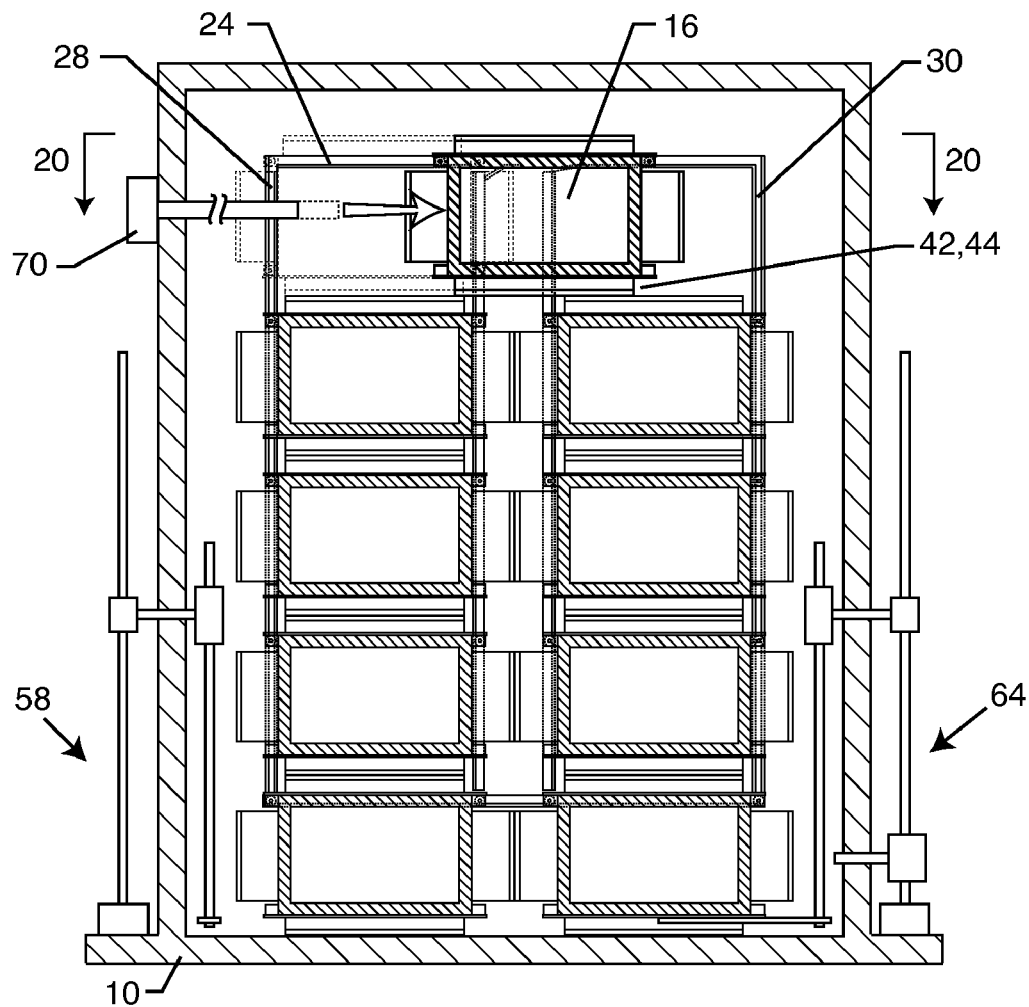
FIG. 19 is a diagrammatic view similar to FIG. 18, illustrating the top storage unit being moved.
Figure 20:
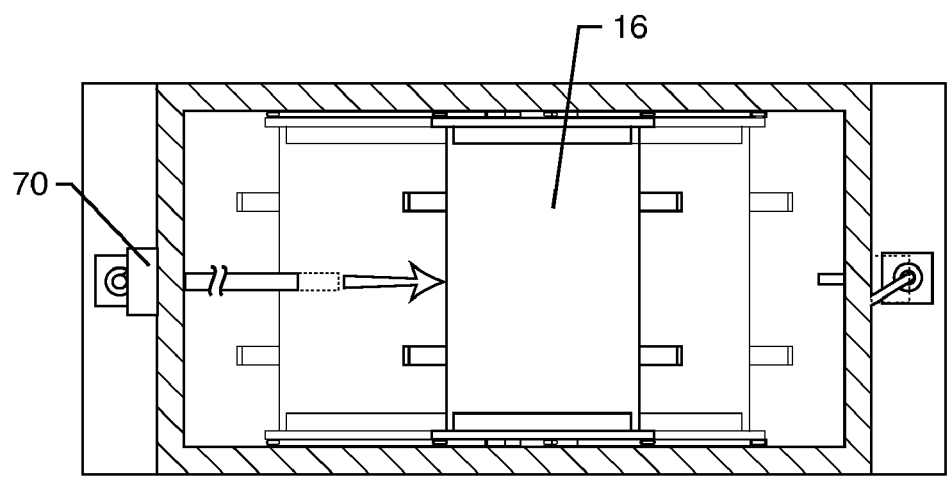
FIG. 20 is a cross-sectional view taken generally along line 20-20 of FIG. 19, illustrating the movement of the storage unit.
Figure 21:
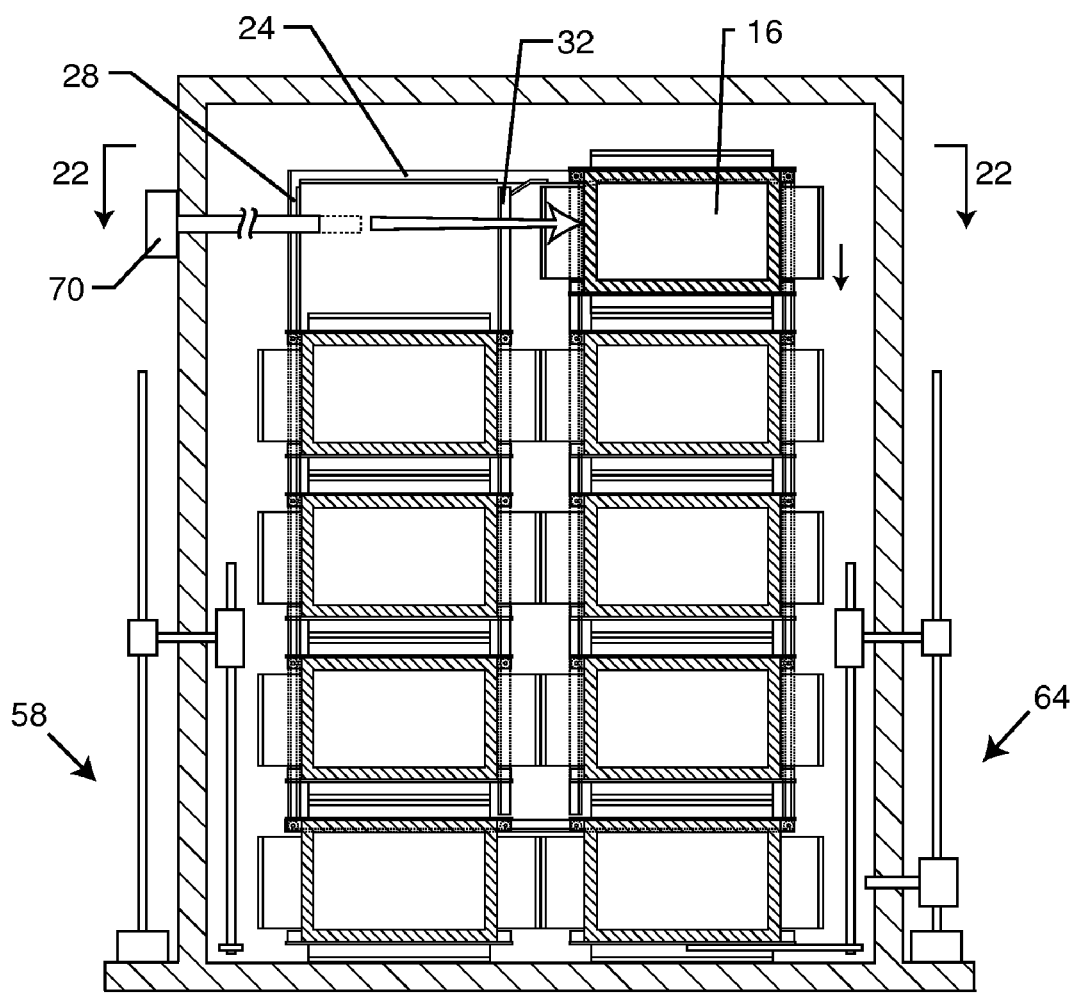
FIG. 21 is a diagrammatic view illustrating the repositioning of the storage unit from one column to another column.
Figure 22:
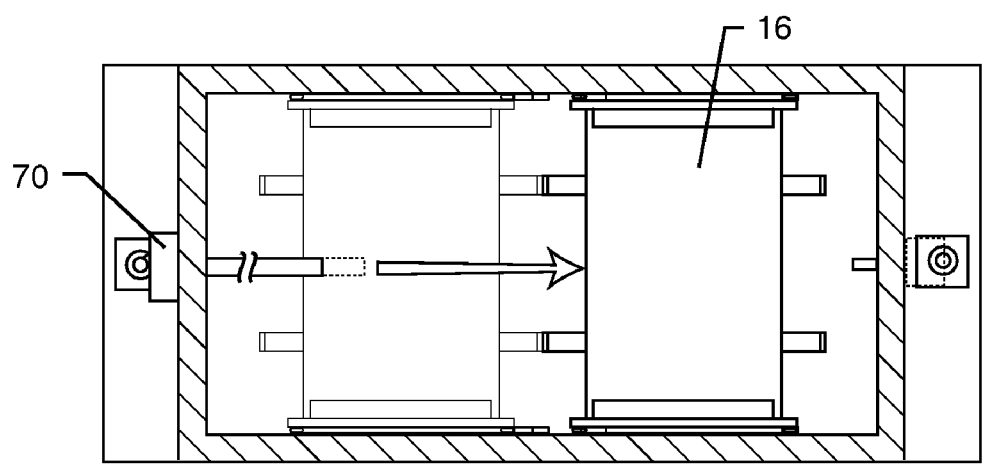
FIG. 22 is a cross-sectional view taken generally along line 22-22 of FIG. 21.
Figure 23:
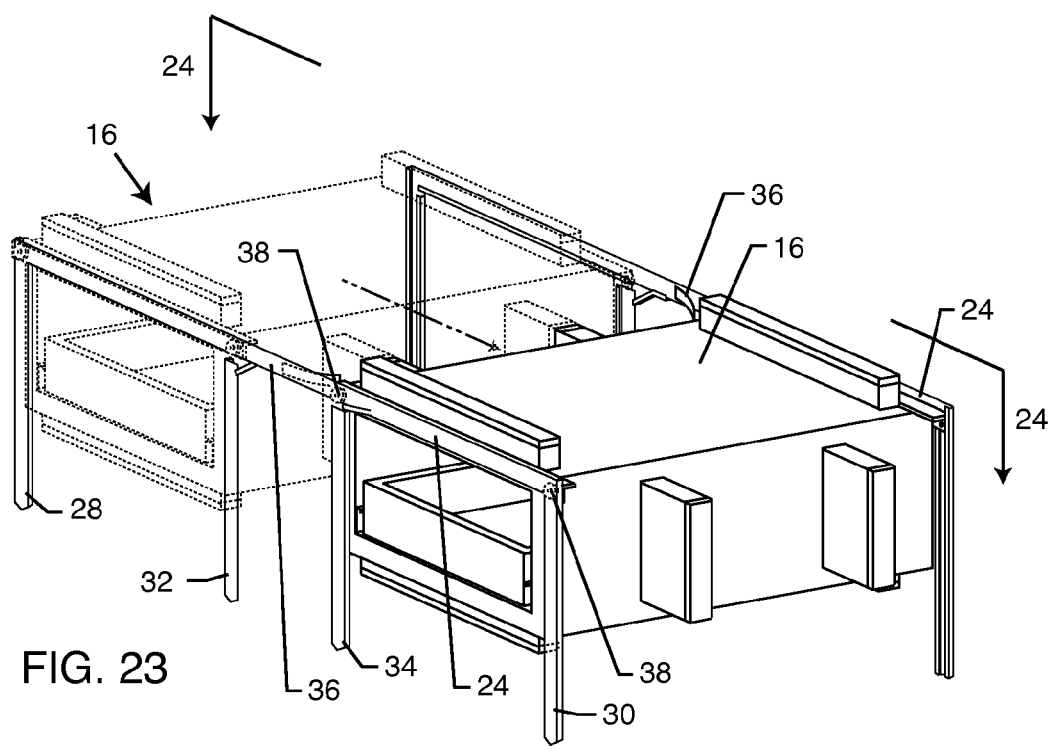
FIG. 23 is a perspective view illustrating the movement of the top storage unit from one column to an adjacent column along the single track system.
Figure 24:
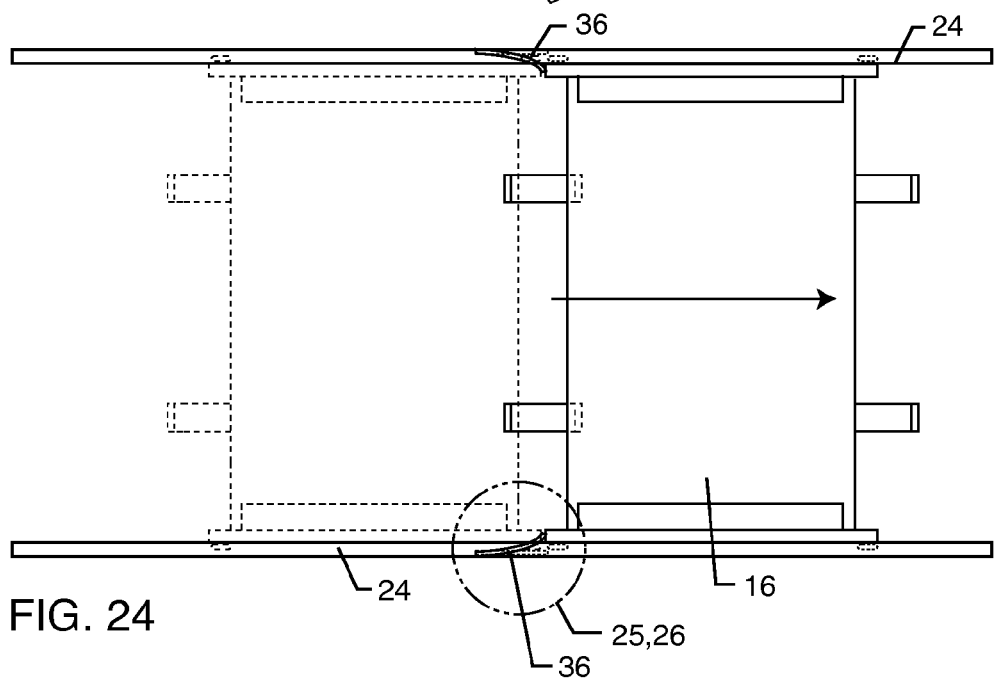
FIG. 24 is a top view of FIG. 23 taken generally along line 24-24 illustrating, the use of stops in the rails of the single track system to prevent reverse travel of the storage unit.

With reference now to FIG. 18, the operation of the system of the present invention will now be described. In the configuration illustrated, for exemplary purposes in this application, two columns having essentially ten vacancies or spaces S1-S10 are provided. Storage units 16 occupy all but one of these vacancies, as described above. It will be readily understood by those skilled in the art that regardless of the configuration of number of storage units, columns, etc., there must be one vacancy in order to sequentially move the storage unit 16. In accordance with the present invention, as will be described more fully herein, the vacancy is either present at the uppermost or lowermost position of the end columns.

In FIG. 18, a vacancy is present in the upper right hand corner or upper portion of the second column. When a user desires to have access to a storage unit 16 which is not currently available through an opening 12, the end user powers the system by depressing a button or the like, or imputing the identity of a storage unit into the system through a control module 76 or the like. In the illustrated embodiment, the storage units 16 are moved sequentially in a clockwise direction.

Accordingly, control module 76 supplies power to horizontal actuator 70, such as by activating switches SW7 and SW8. Typically, this will cause horizontal actuator 70 to extend a rod or ram outwardly into engagement with the storage unit 16 occupying space S1, as shown in FIG. 1. The rod or ram horizontal actuator 70 may be of a telescoping type so as to be able to extend outwardly, yet telescope inwardly into a relatively small space within a housing or the like. Alternatively, the rod or ram 70 may comprise a screw or any other means necessary for physically moving the storage unit 16 as needed. The storage unit 16 is moved along the upper rails 24 of the tracks 20 and 22 and partially supported by the low friction surface of spacers 42 and 44 until it is fully moved into space or vacancy S2, as illustrated in FIGS. 18-22. Ramps 37 minimize any binding effect of the wheels 38 bridging the gaps in the rails 24 created by the vertical rails 32 and 34.

At this point, the storage unit 16, now residing in space S2, is positioned at the top of the second column. Typically, the storage units 16 are stacked on to one another. This is due to the fact that the wheels 38 of the storage unit 16 travel from vertical rails 28 and 32, across upper rails 24, to the vertical rails 30 and 34 and the second column of storage units 16. In the event that the storage unit 16 moved from the first column contacts the upper most storage unit in the second column as it is moved, the spacers 42 and 44 are designed so as to enable the storage unit 16 to slide over the lower storage units 16 and into the desired position.

With reference now to FIGS. 23-26, in the single track system, a stop 36 is operably disposed on both of the upper rails 24 of the tracks 20 and 22. The purpose of the stop 36 as described above, is to prevent the storage unit 16 from traveling backwards once it has been moved into position. This is merely a precaution in the event that the overall system is not completely level, or that the storage unit 16 would reverse its course when the rod of the horizontal actuator 70 is retracted.

Figure 25:
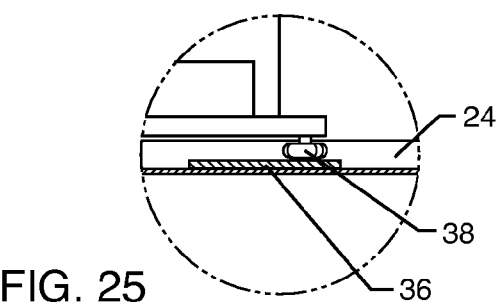
FIG. 25 is an enlarged view of area "25" of FIG. 24, illustrating the stop deflected as a wheel of the storage unit passes thereby.
Figure 26:
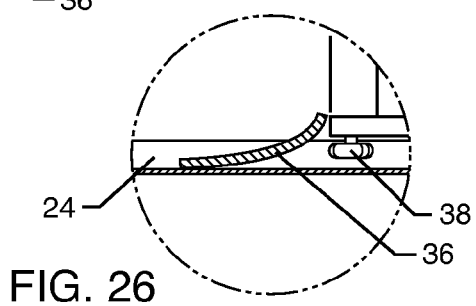
FIG. 26 is an enlarged view taken generally of area "26" of FIG. 24, illustrating the stop biased outwardly to prevent reverse travel of the storage unit.

As can be seen in FIGS. 23-26, the stop 36 is typically biased away from the rail 24. In this case the stop 36 comprises a leaf spring. As the storage unit 16 is moved past the stop, as illustrated in FIG. 25, the stop 36 is deflected into and against the rail 24 to permit the wheel 38 to pass thereby. However, once the wheel 38 has passed by the stop 36, the stop 36 is biased outwardly or away from the rail 24, again, preventing rearward travel of the storage unit 16.

Figure 27:
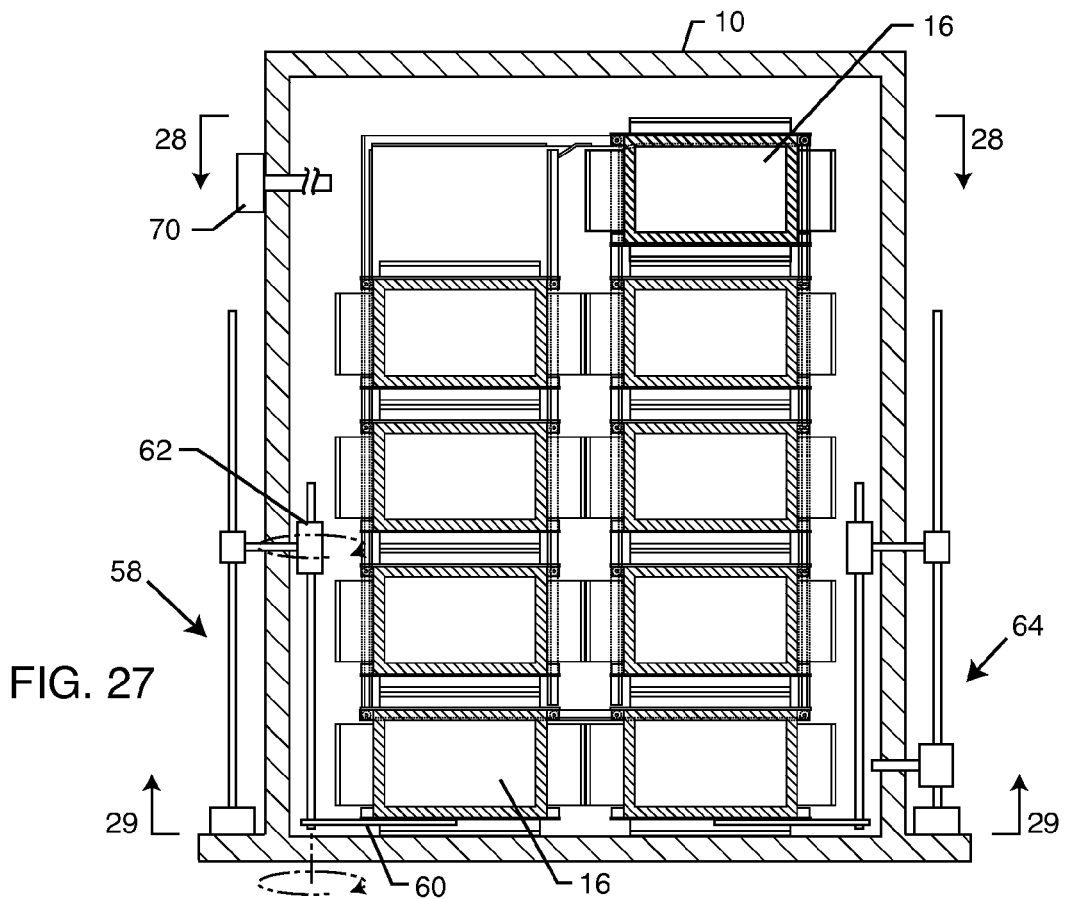
FIG. 27 is a diagrammatic view of the invention, with an actuator positioned below the first column of storage units.
Figure 28:
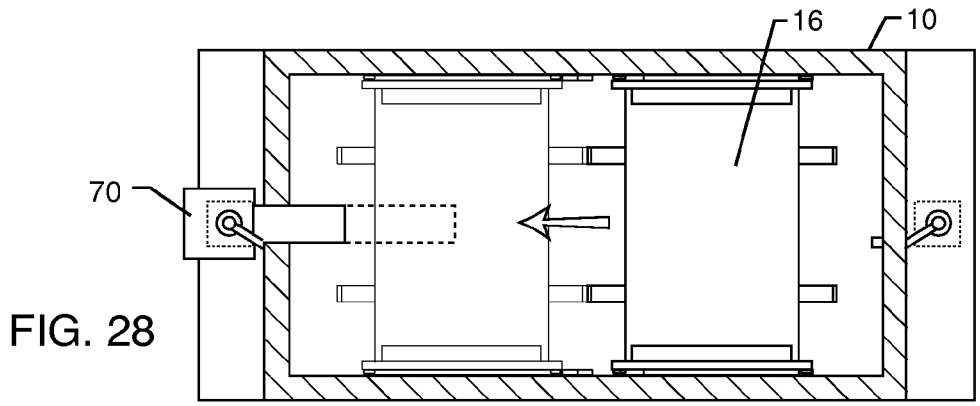
FIG. 28 is a top view taken generally along line 28-28 of FIG. 27, illustrating the retraction of a ram of an upper horizontal actuator, in accordance with the present invention.
Figure 29:
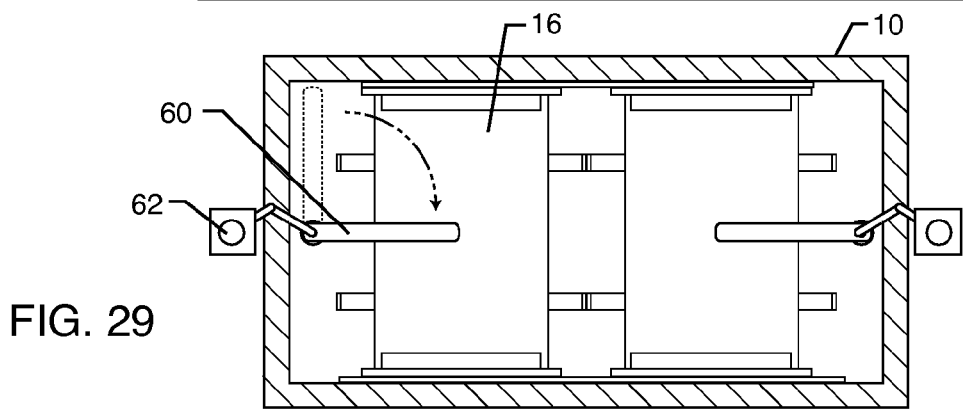
FIG. 29 is a cross-sectional view taken generally along line 29-29 of FIG. 27, illustrating the positioning of a swing arm by a vertical actuator, in accordance with the present invention.

With reference now to FIGS. 27-29, after the storage unit 16 has been moved from the top of the first end column to its adjacent column, in this case the second end column, the control module 76 activates vertical actuator 58 such that the arm 60 is swung approximately 90°, lowered and repositioned, so as to rest under the bottommost storage unit 16 of the first column. In the event that the vertical actuator 58 includes a rotary actuator 62, this would be done, for example, by powering switches SW1, SW2 and SW3, so as to power the rotary actuator M2.

Figure 30:
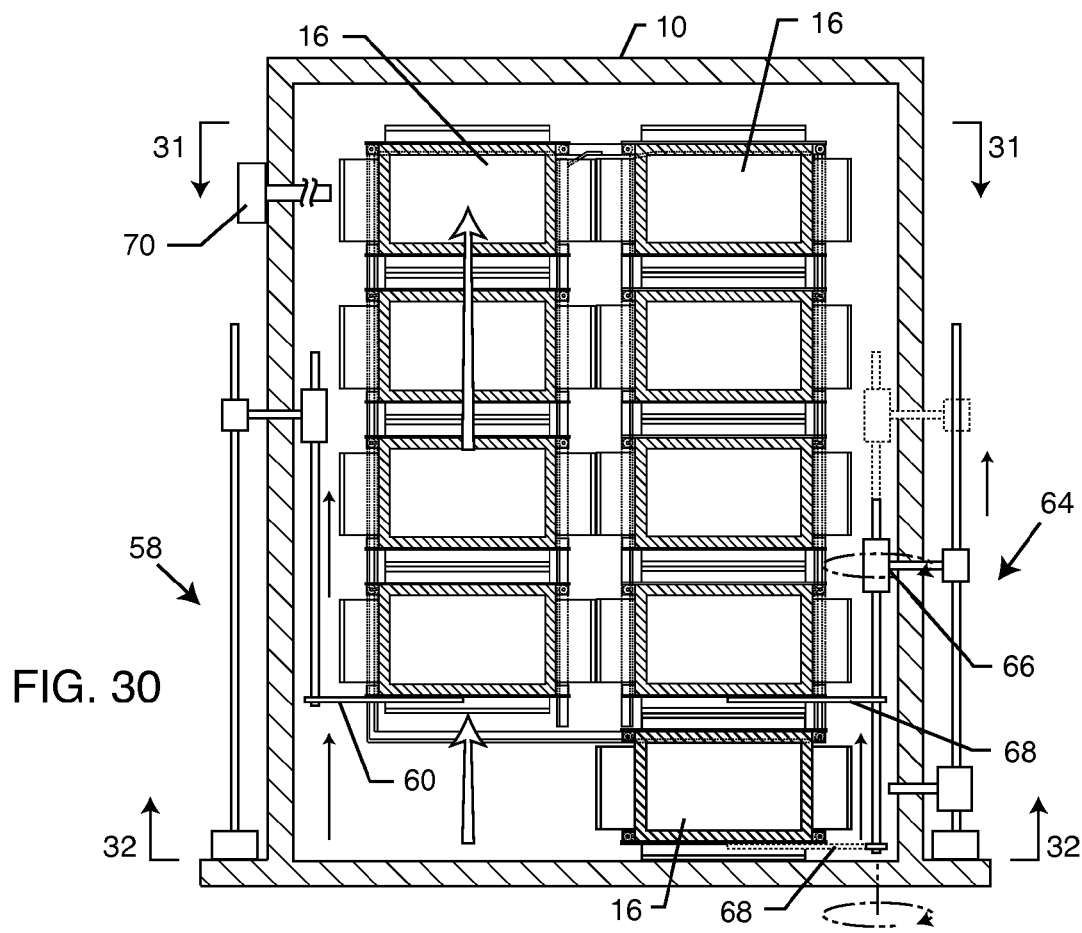
FIG. 30 is a cross-sectional diagrammatic view illustrating a vertical actuator lifting the first column of storage units, in accordance with the present invention.
Figure 31:
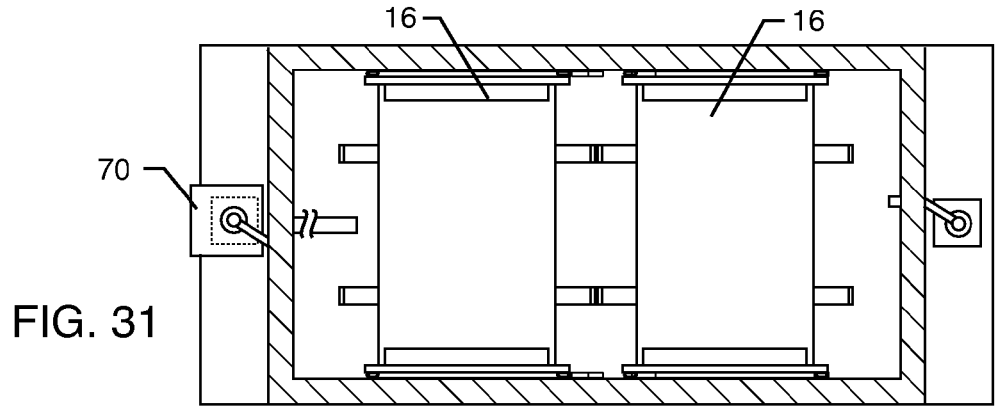
FIG. 31 is a top view taken generally along line 31-31 of FIG. 30 illustrating the top two storage units of the adjacent columns.
Figure 32:
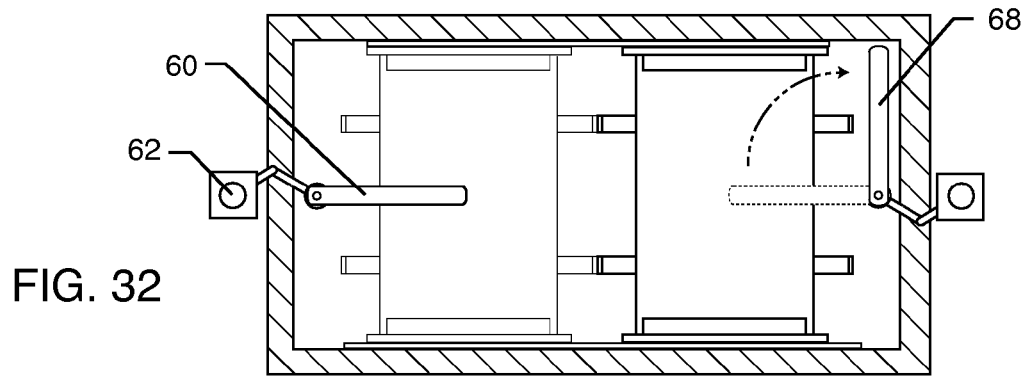
FIG. 32 is a bottom view taken generally along line 32-32, illustrating movement of another swing arm by an actuator, in accordance with the present invention.

With reference now to FIGS. 30 and 31, once the arm 60 is positioned under the storage unit 16 occupying space S7, with the vacancy in space S1, the vertical actuator 58 is activated to lift the first column of stacked storage units 16 such that the uppermost storage unit 16 now resides in space S1, creating a vacancy in space S7, as illustrated.

Figure 33:
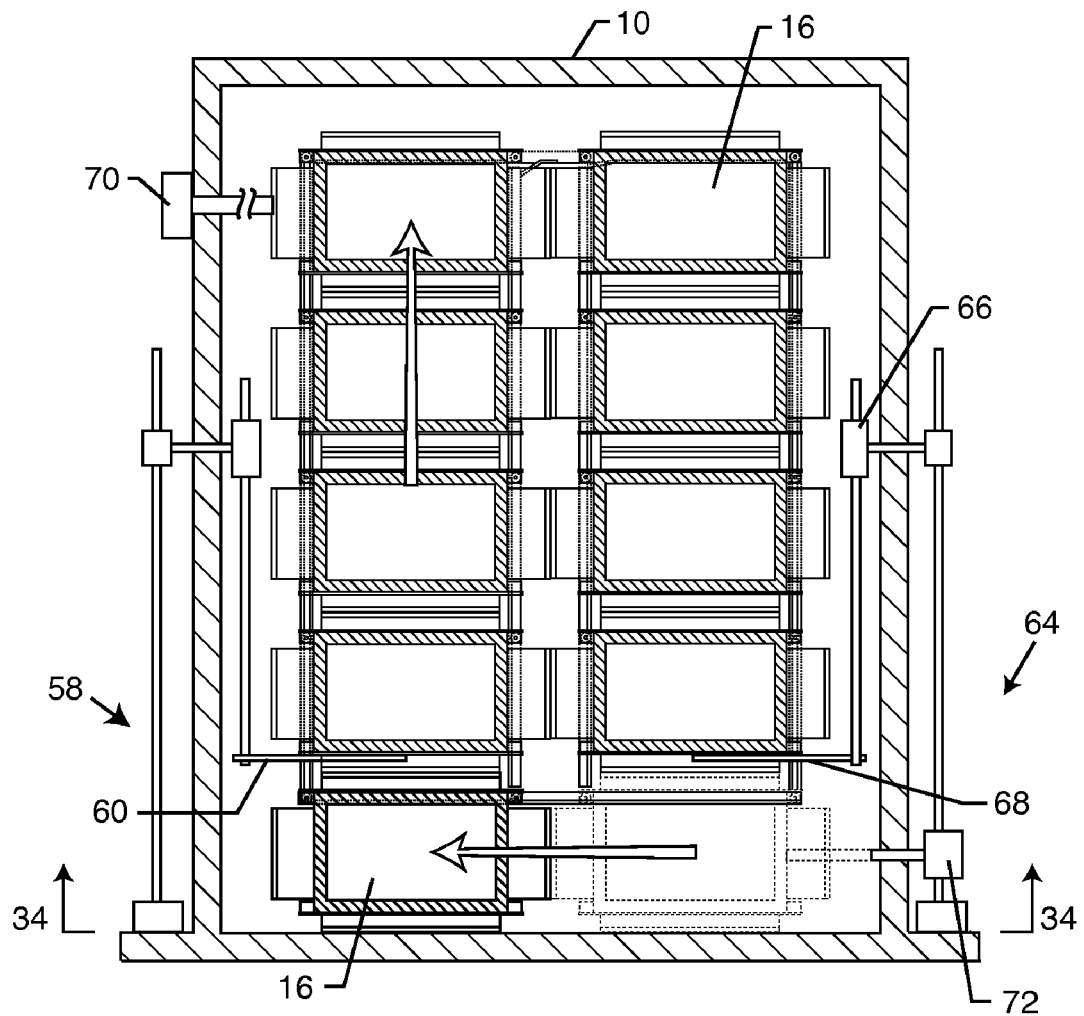
FIG. 33 is a cross-sectional diagrammatic view of the system of the present invention, illustrating the supporting of all but the bottom storage unit of the second column, and the repositioning of the bottom storage unit from one column to another column.

With reference to FIGS. 30-33, preferably simultaneously, or immediately thereafter, the second vertical actuator 64 rotates the second swing arm 68, as necessary, from under the lowermost storage unit in the second column, such as by using the rotary actuator 66 to rotate the arm 68 90 degrees. The vertical actuator 64 then lifts the arm 68 and the rotary actuator 66 repositions the arm 68 under the storage unit 16 immediately above the lowest storage unit 16, as illustrated in FIGS. 30 and 33.

Figure 34:
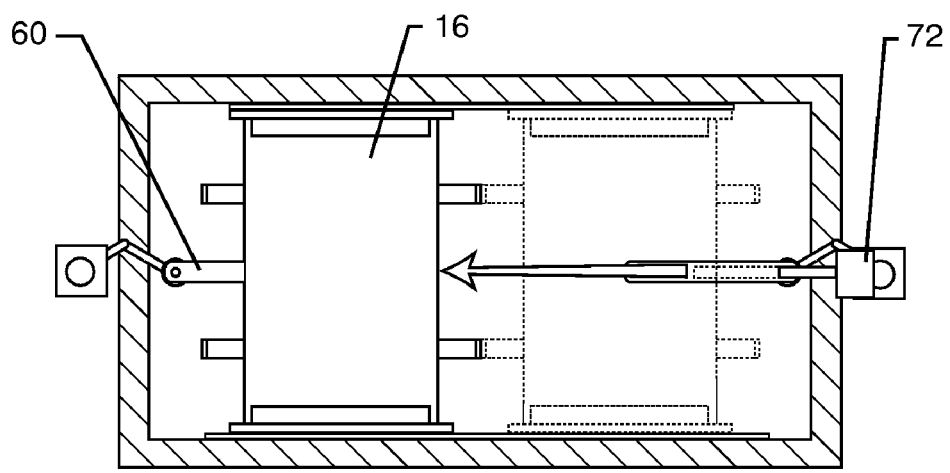
FIG. 34 is a bottom view taken generally along line 34-34, illustrating the movement of the bottom storage unit from one column to an adjacent column.

With reference now to FIGS. 33 and 34, the second vertical actuator 64 either holds the stack of storage units 16 in the second column, or slightly lifts the column, with the exception of the bottommost storage unit 16. The second horizontal actuator 72 is now activated. Referring back to FIGS. 15 and 17, this occurs when control module 76 powers the necessary switches, such as switches SW9 and SW10. A rod or ram is then extended outwardly, as shown in FIG. 33, to move the lowermost storage unit 16 from space S6 in the second column to space S7 in the adjacent first column. Stops 36 may be used in the bottom horizontal rail 26, if necessary, to prevent the storage unit 16 from reversing its course, as discussed above.

Figures 35, 36, 37:
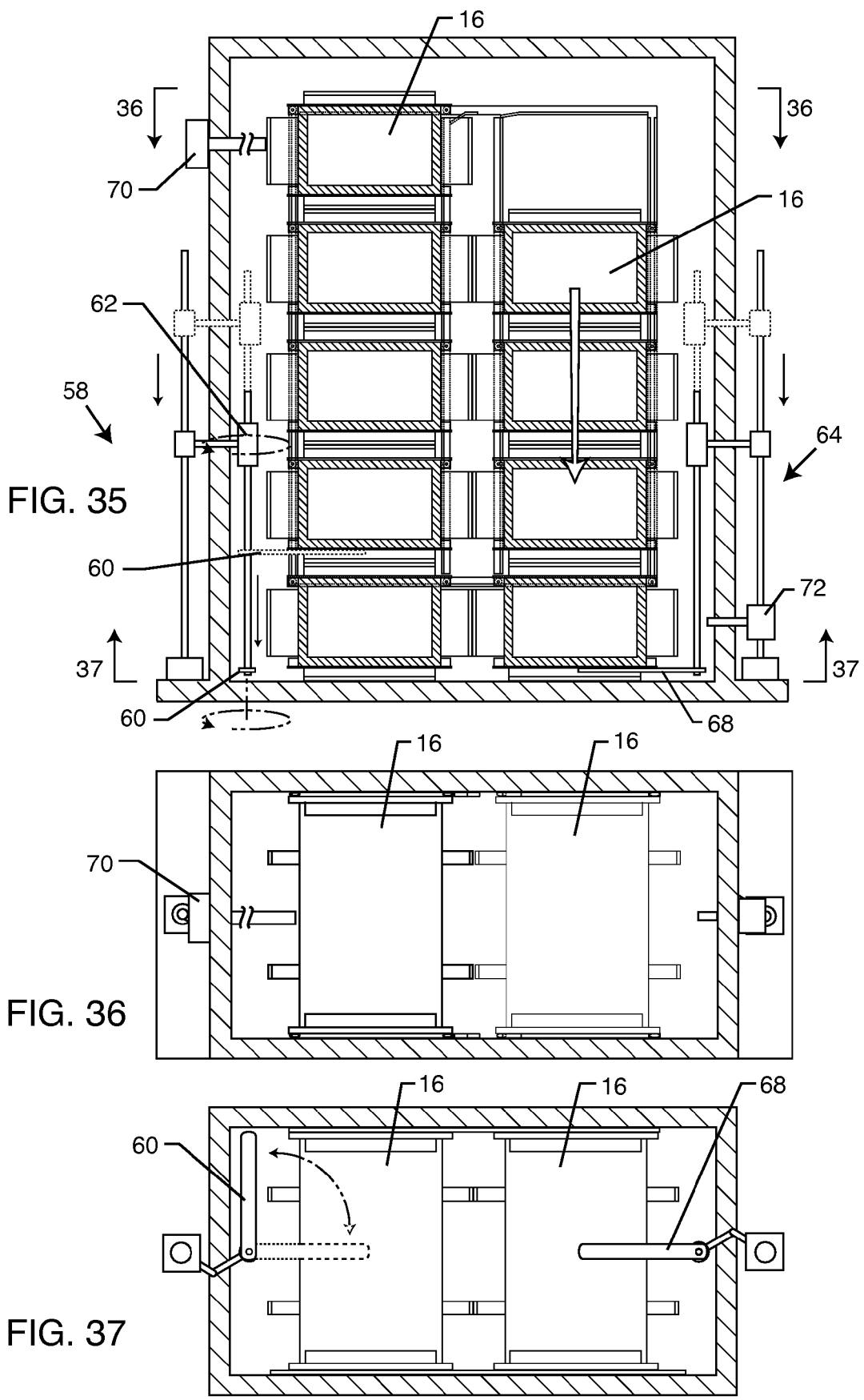
FIG. 35 is a cross-sectional diagrammatic view illustrating the lowering of the storage units in the second column to create a vacancy in a top position thereof.
FIG. 36 is a top view taken generally along line 36-36, illustrating the position of the storage units in the adjacent columns.
FIG. 37 is a bottom view taken generally along line 37-37 of FIG. 35, illustrating the positioning of the swing arms of the respective actuators.

Once the storage unit 16 has been moved into the open vacancy at the bottom of the first column, the second column of stacked storage units is lowered, as illustrated in FIG. 35. This can be done using the control module 76 and vertical actuator switches SW4 and SW5 to activate the vertical actuator M3. This creates a vacancy in space S2, similar to the situation illustrated in FIG. 18. Preferably, simultaneously, or immediately thereafter, vertical actuator 58 is activated so as to rotate arm 60 from under the second to the bottom storage unit 16 to either an at rest position as illustrated in FIGS. 35 and 37, or under the lowermost storage unit end space S7. The process then repeats itself until the desired storage unit 16 is presented within the desired open space 12 for access by the end user.

Figure 38:
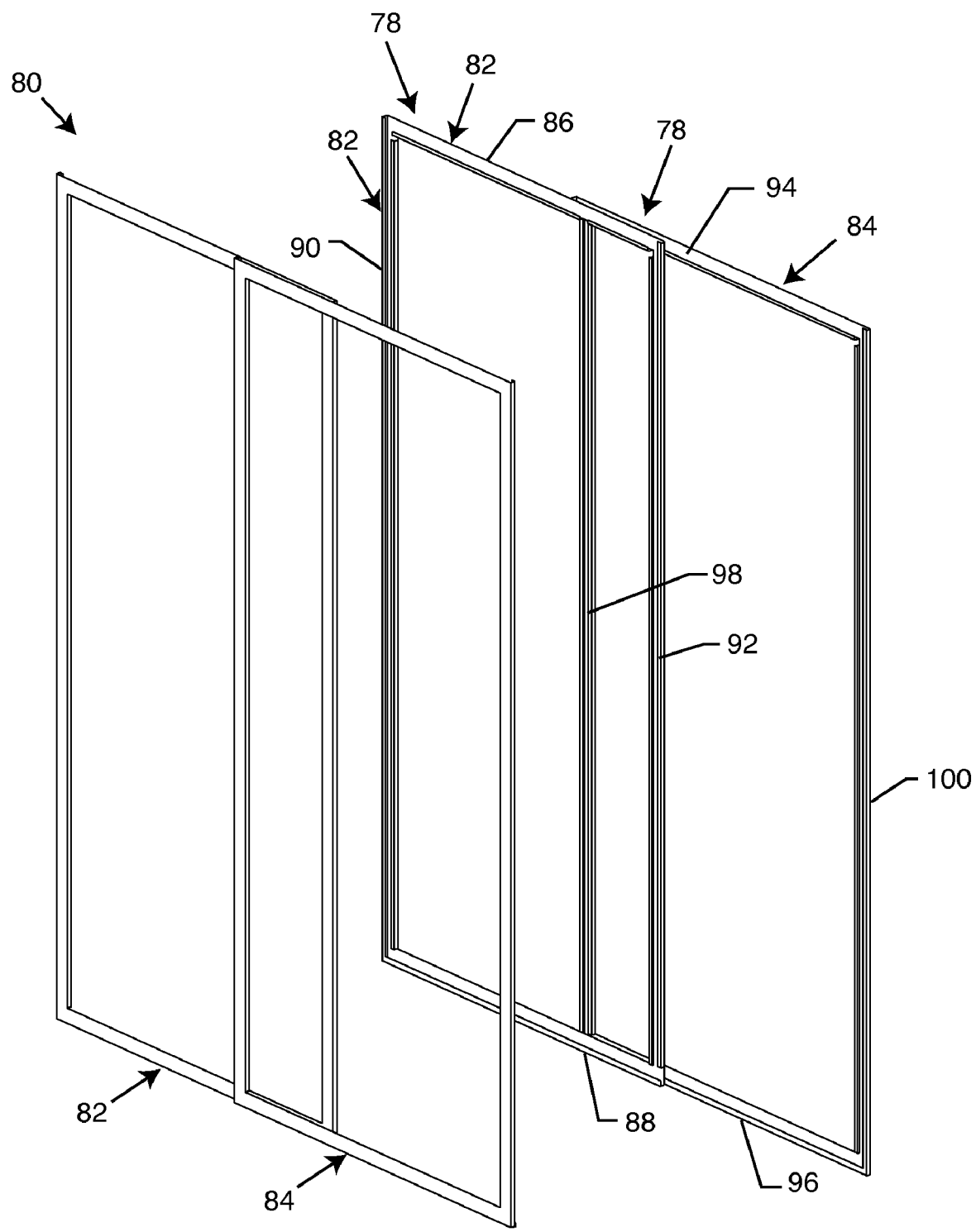
FIG. 38 is a perspective view of a dual track embodying the present invention.
Figure 39:
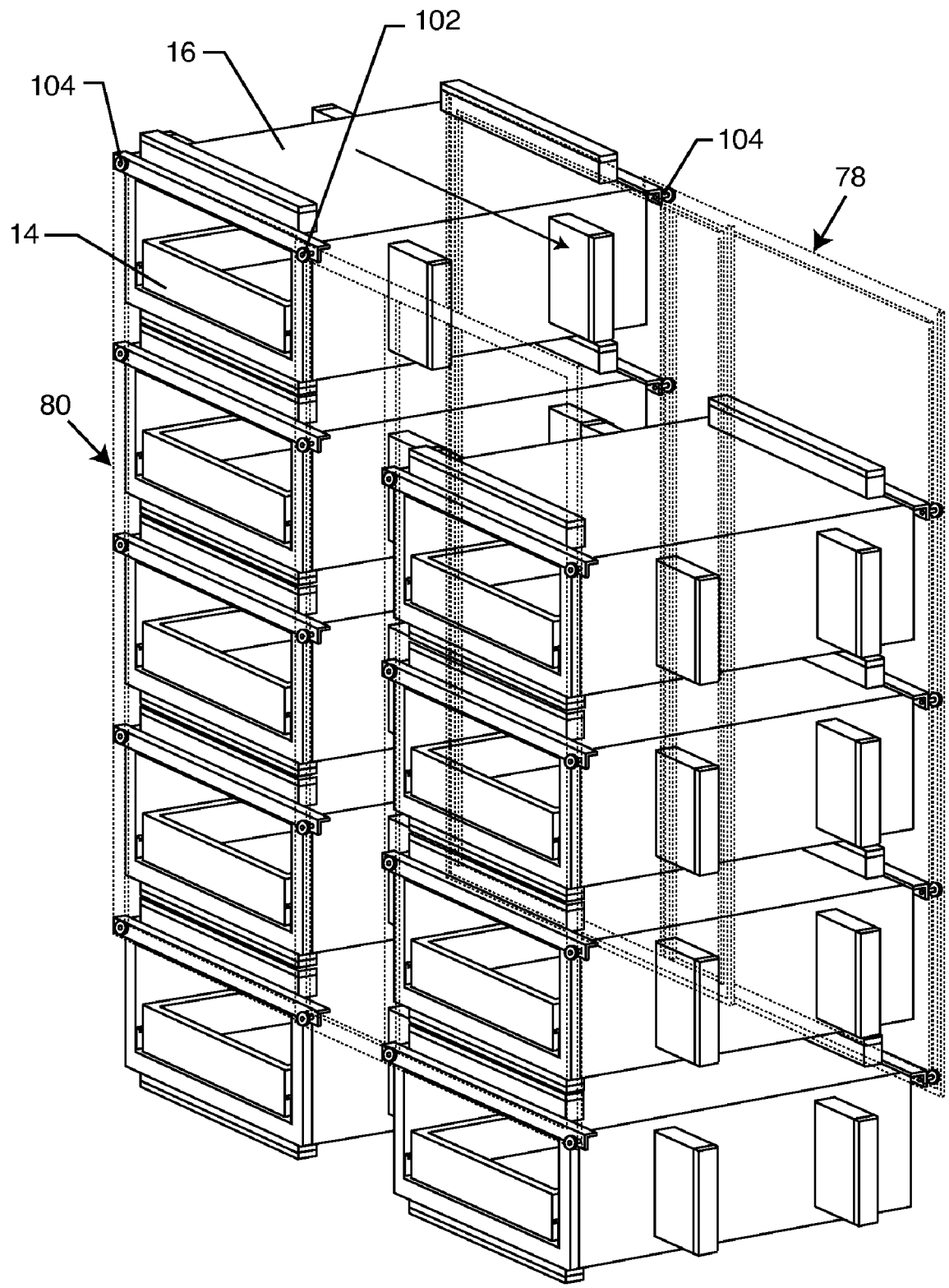
FIG. 39 is a perspective view of a plurality of stacked storage units operably connected to the dual track, in accordance with the present invention.

With reference now to FIGS. 38 and 39, a "dual track" embodiment of the present invention is illustrated and will now be described. The dual track comprises first and second sets of tracks 78 and 80 which are substantially similar mirror images of one another, and spaced apart in generally parallel relation to one another approximately the width or length of a storage unit. Each track 78 and 80 is comprised of a first rail 82 in a first plane, and a second rail 84 in a second plane so as to be in a slightly overlapping arrangement with the first rail 82, as illustrated in FIG. 38. Essentially, each rail 82 and 84 form a generally circular path. That is, the first rail 82 includes upper and lower rails 86 and 88, as well as vertical side rails 90 and 92. Similarly, the second rail 84 includes upper and lower rails 94 and 96 as well as vertical side rails 98 and 100. Each rail is generally circular, so as to be continuous and endless, such that the wheels of the storage unit 16 ride continuously within the rails 82 and 84, as will be more fully described herein. As mentioned above, the second track 80 is substantially similar to the first track 78 in structure and function.

As illustrated in FIG. 39, multiple columns of multiple storage units 16 stacked on one another operably engage the opposing tracks 78 and 80, in accordance with the present invention. The sequence of movement, and the actuators 58, 64, 70 and 72 to selectively move the storage units 16 are essentially as described above with respect to the "single track" embodiment.

Figure 40:
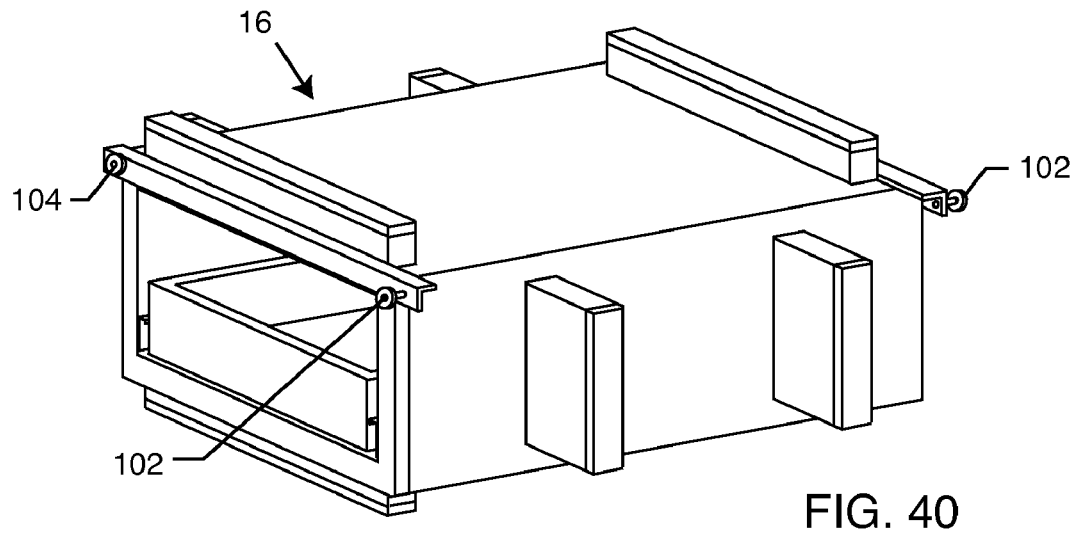
FIG. 40 is a perspective view of a storage unit used in the dual track embodiment of the present invention, illustrating sets of wheels extending therefrom.
Figure 41:
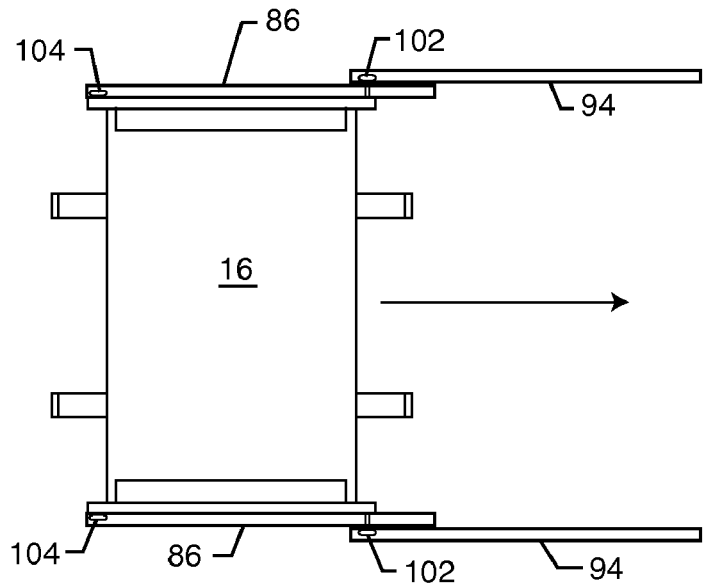
FIG. 41 is a top view illustrating a first set of wheels of the storage unit engaged with a first rail of the dual track.
Figure 42:
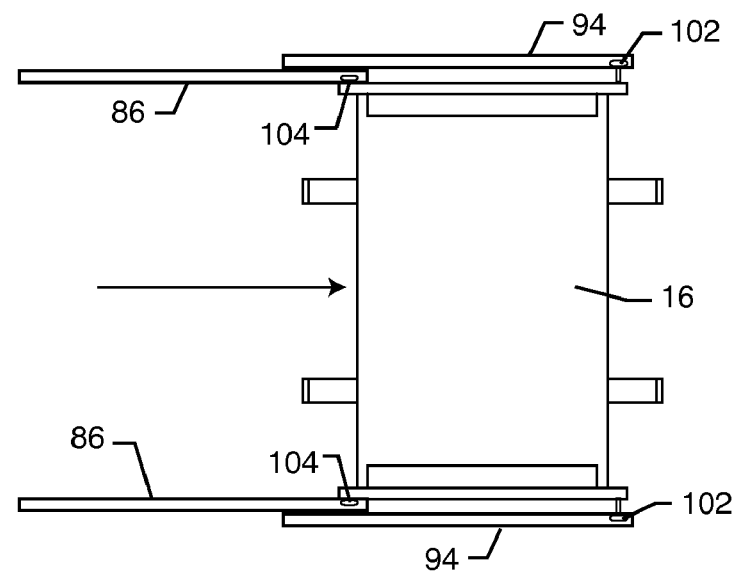
FIG. 42 is a top view illustrating a second set of wheels of the storage unit engaged with a second rail of the dual track.
Figure 43:
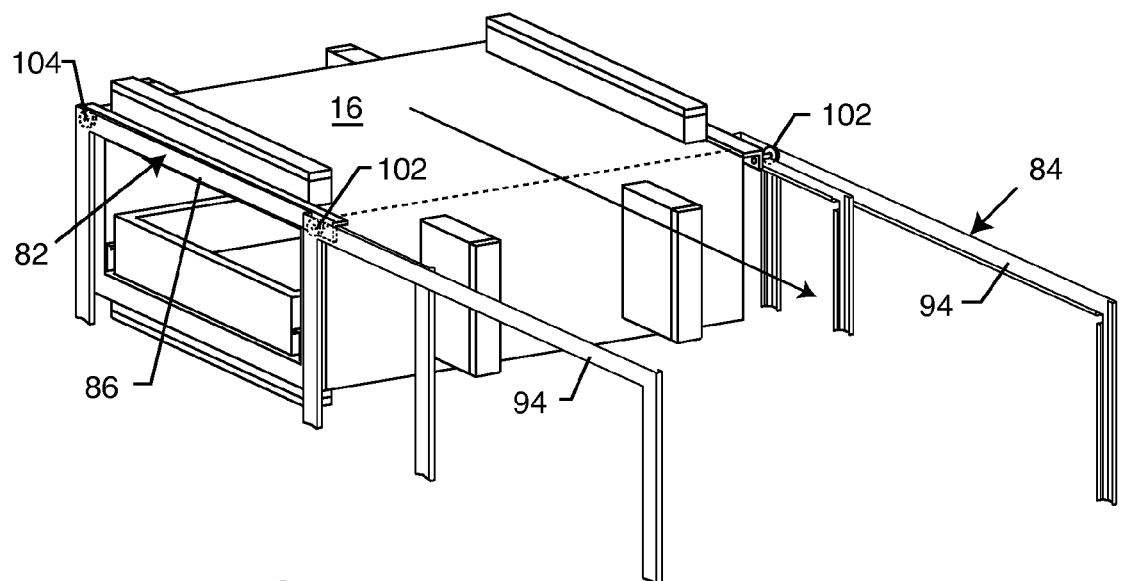
FIGS. 43 and 44 are perspective views illustrating movement of the storage unit along the dual track rails.
Figure 44:
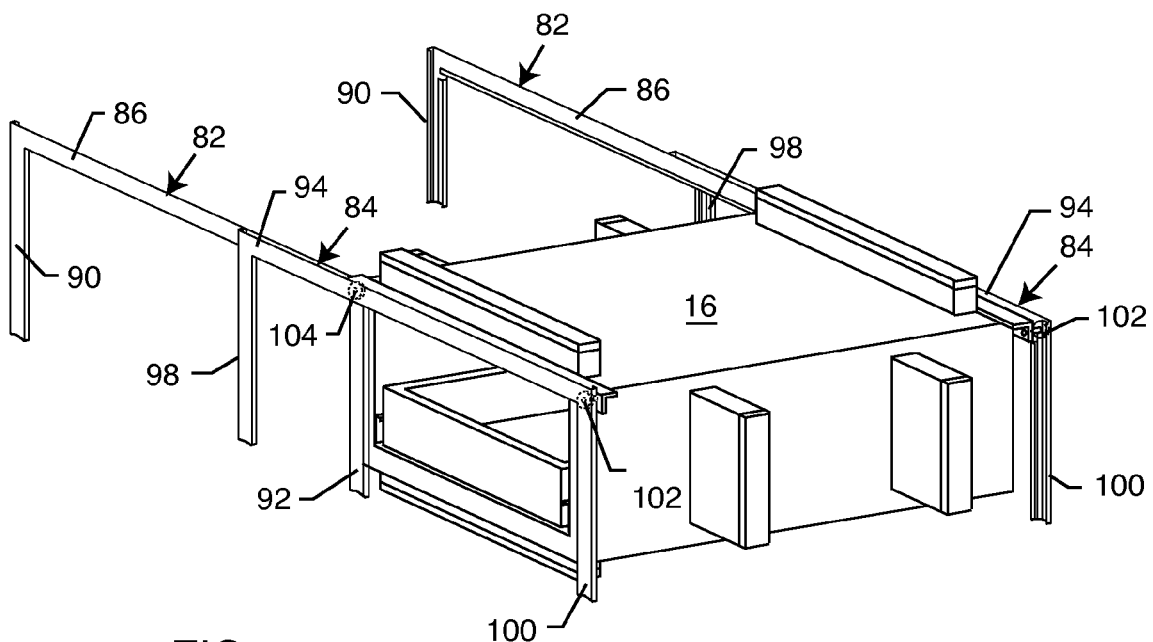
Figure 48:
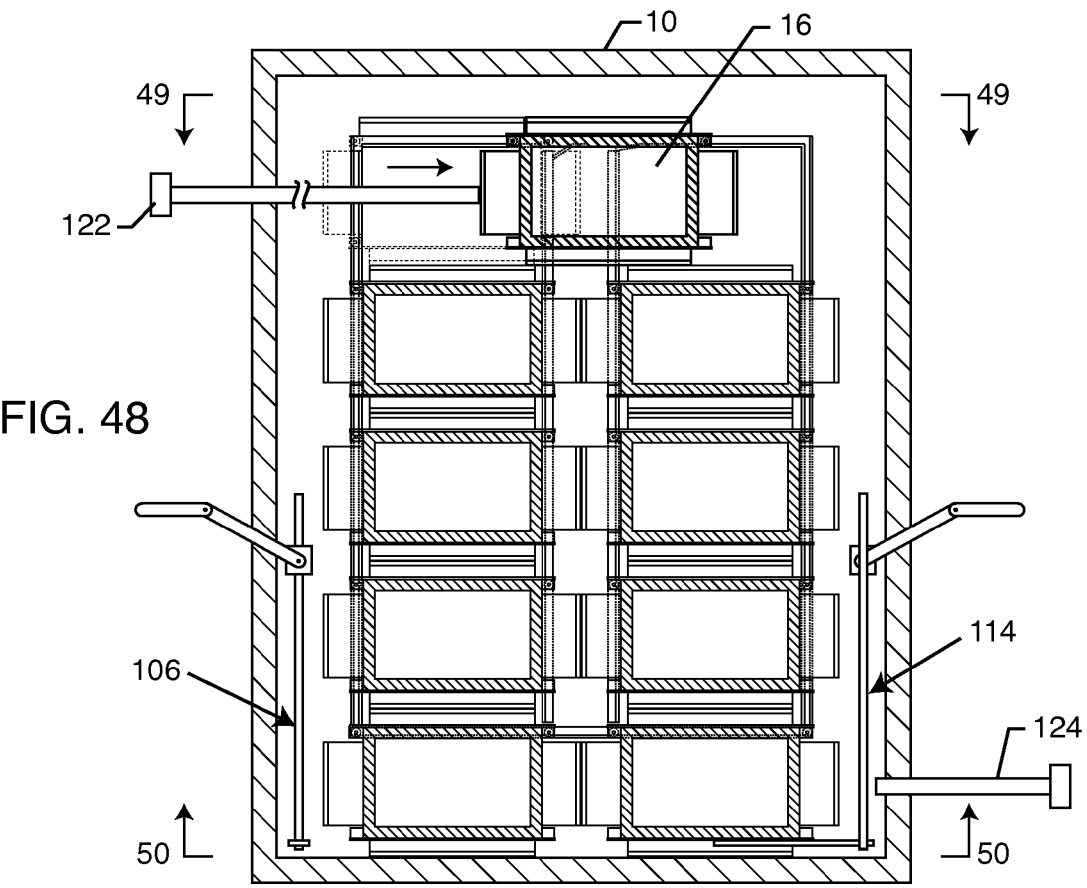
FIG. 48 is a diagrammatic view illustrating the movement from one column to an adjacent second column, in accordance with the present invention.
Figure 49:
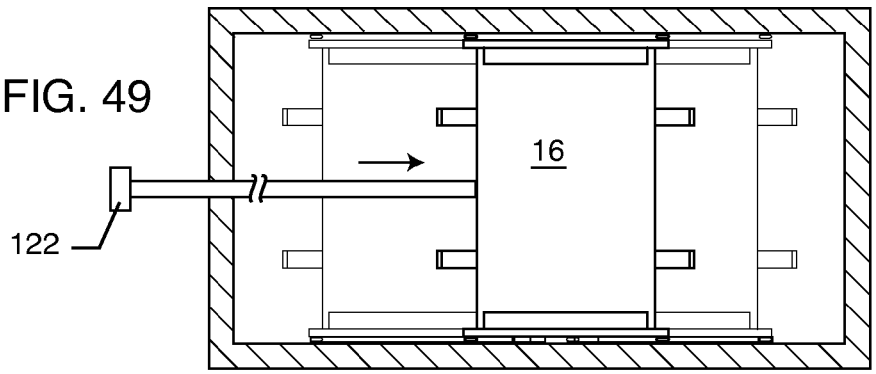
FIG. 49 is a top view taken generally along line 49-49 of FIG. 48.
Figure 50:
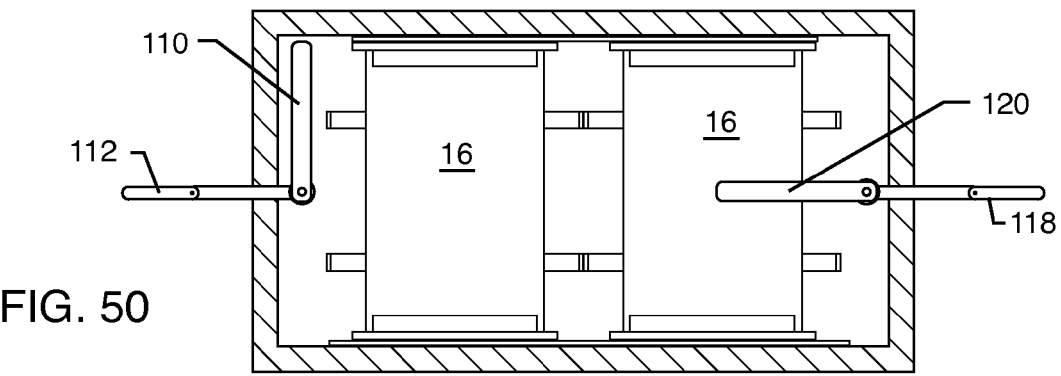
FIG. 50 is a bottom view taken generally along line 50-50 of FIG. 48.

With reference now to FIGS. 40-42, an exemplary storage unit 16 used in this embodiment is illustrated. It will be noted that the storage unit 16 has two sets of wheels, 102 and 104, each set extending outwardly from the storage unit 16 a different distance. In the illustrated embodiment, wheels 102 on one side of the storage unit 16 extend out farther than the wheels 104 on the opposite side of the storage unit 16. Each set of wheels 102 and 104 reside and travel within a separate rail 84 and 82 of the track 78 or 80, as illustrated. Thus, the front wheels 102 travel in track or rail 84, including sub-rail portions 94, 96, 98 and 100. The back wheels 104 travel in the second set of tracks or rails 82, including sub-rail sections 86, 88, 90 and 92. As the rails 82 and 84 are in adjacent planes, the wheels 104 and 102 extend from the storage unit 16 different distances so as to engage their respective rail 82 or 84. This will be seen in FIGS. 43 and 44, wherein wheels 102 are engaged with the upper portion 94 of rails 84 while the opposite wheels 104 remain engaged with the upper portion 86 of rails 82 while the storage unit 16 is moved from one column to a vacancy in an adjacent column. When traveling downwardly, the first set of wheels 102 travel downwardly on vertical rail section 100 of rail 84, or rails 84 while the second set of wheels 104 travel down vertical rail segments 92 of rails 82. When moving horizontally across the bottom of the tracks 78 and 80, outer wheels 102 engage with rail sections 96, while the inner wheels 104 engage sections 88. When moving upwardly, the outer wheels travel along rail segments 98 of rail 84, while the inner wheels 104 travel along vertical rail segments 90 of rails 82. Thus, the wheels 102 and 104 are in continuous travel and engagement with each respective rail 82 and 84 while the storage 16 is moved into the various spaces S1-S10 of the columns.

With reference back to FIG. 15, the system of the present invention, whether it be a single track or dual track embodiment is typically controlled electronically using control module 76 to power the various actuators in a timed sequence so as to move the storage unit 16, as described above. This requires a power supply 74, typically in the form of a direct current voltage. Thus, a transformer or the like is typically used to transform the 120V or 240V (or 12 volts or 24 volts, if available) alternating current voltage to the appropriate direct current voltage. In the event of a power outage or the like, a battery back-up system may be used to power the control module 76 and actuators 58, 62, 64, 66, 70 and 72. Such a battery can be built into the system and periodically or continuously recharged, or one or two twelve volt automobile batteries may be connected to the system.

Alternatively, the system can rely upon manual movement of the storage units 16. Such is illustrated in FIGS. 45-64. A plurality of storage units 16 are stacked upon one another in multiple columns within a structure 10 as described above. The structure 10 may be a housing or built within walls and ceilings or spaces within houses and business establishments or the like. In any event, access must be had to the sides of the end columns, as illustrated in FIG. 45. It will be understood by those skilled in the art that the manual system can be a separate system entirely, or be incorporated into the power-driven system described above, but used in emergency situations where power is not available to drive the power-driven actuators. As such, the manual system will be described herein as if completely separate from the power-driven actuators, although this is not necessarily the case.

A vertical actuator 106 is operably positioned at the lower left hand corner, or the bottom of the first end column. The vertical actuator 106 includes a rod or screw 108 and an arm 110. The handle or lever 112 is used to rotate the arm 110, such as by rotating the rod 108, and lifting the rod 108 and arm 110. Such may be accomplished by simple mechanical advantage, using lever principles. However, as the storage units 16 may have a considerable amount of aggregate weight, the vertical actuator 106 may take the form of a screw lift or hydraulic lift or jack. A similar vertical actuator 114 is positioned on the lower portion of the opposite end column, as illustrated in FIG. 45. Such would include a rod or screw 116, a handle or lever 118, as well as a swingable arm 120.

The handles or levers 112 and 118 extend through the structure 10 into operable engagement with the vertical actuator 106 and 114, respectively. Similarly, the passageway is available for the insertion of rods 122 and 124 so as to move the storage unit 16 from a top position of an end column to a top position in a vacancy of an adjacent column and from one bottom position of a column to another, respectively.

With reference now to FIGS. 45-52, in the manual system, rod 122 is inserted so as to be in engagement with the top storage unit 16 in the end column, and push the storage unit 16 along the single or dual tracks to the vacancy (in this case space S2) of the adjacent column, as illustrated. Vertical actuator 106 is then used to rotate the arm 110, as necessary to an at rest position so as to be insertable underneath the lower most storage unit 16 of the left end column.

Figure 51:
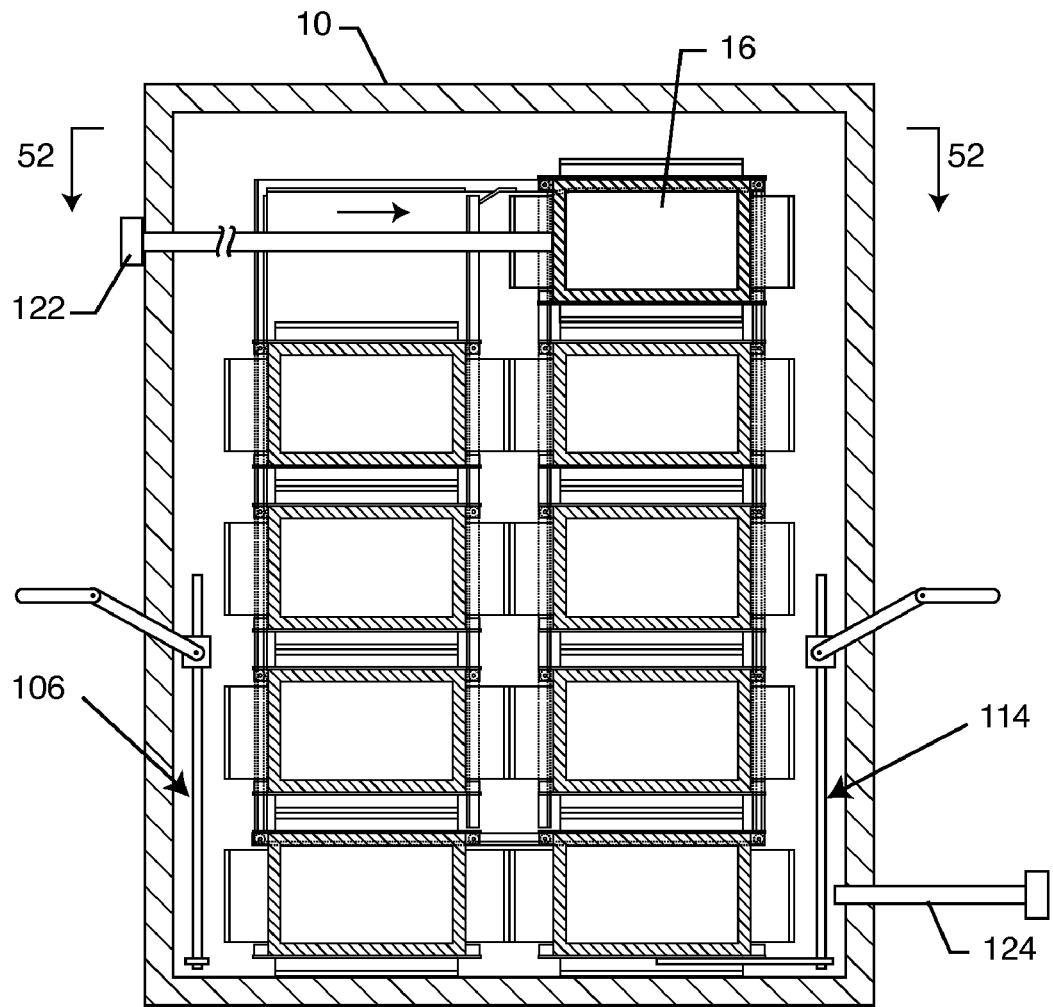
FIG. 51 is a diagrammatic view, illustrating the final placement of the top storage unit from one column to an adjacent column, in accordance with the present invention.
Figure 52:
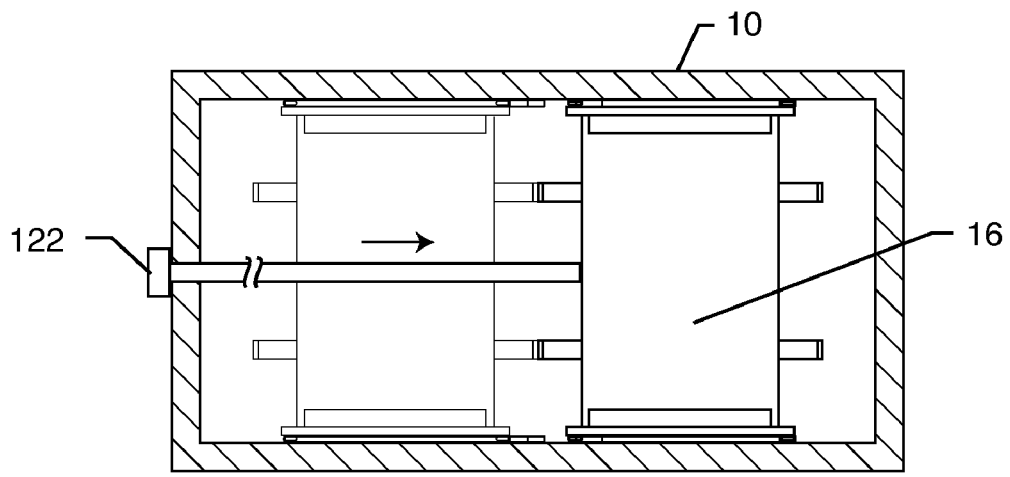
FIG. 52 is a top view taken generally along line 52-52 of FIG. 51.
Figure 53:
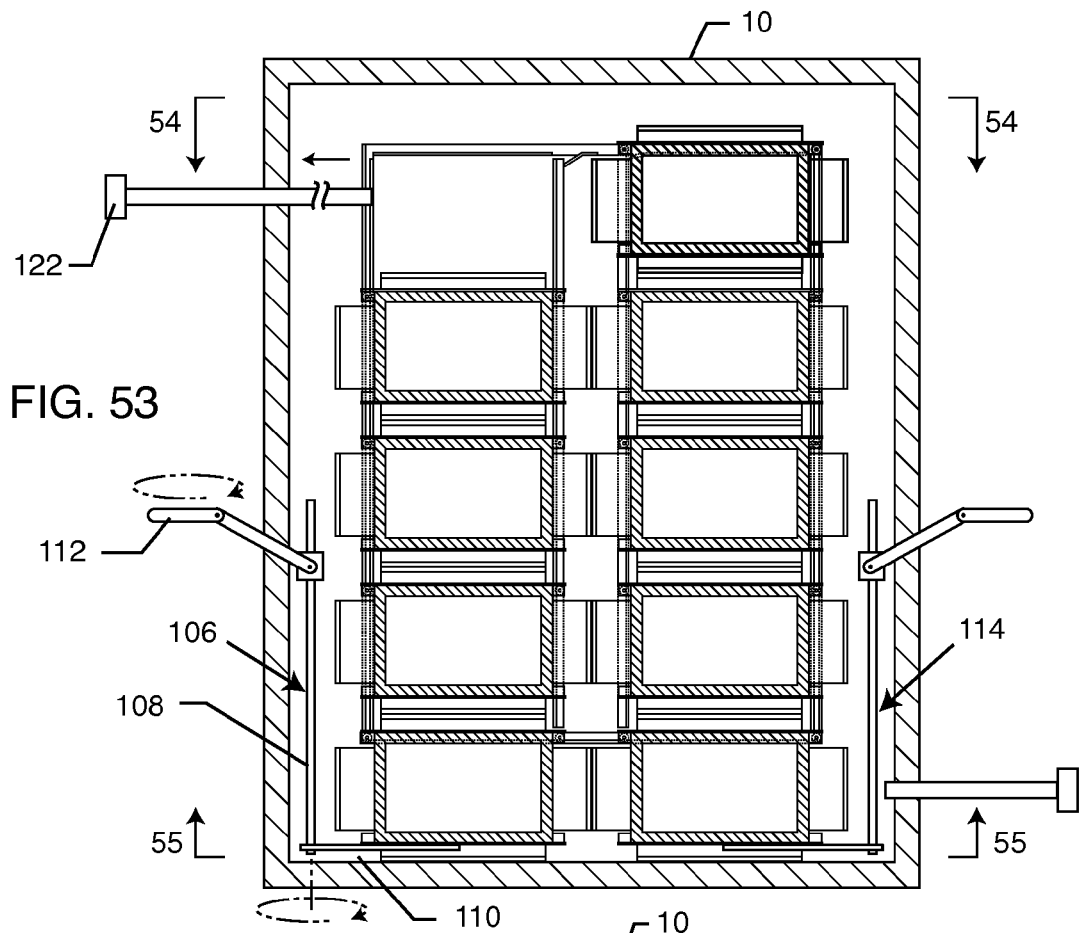
FIG. 53 is a cross-sectional diagrammatic view illustrating placement of a swing arm under the storage units of the first column in accordance with the present invention.
Figure 54:
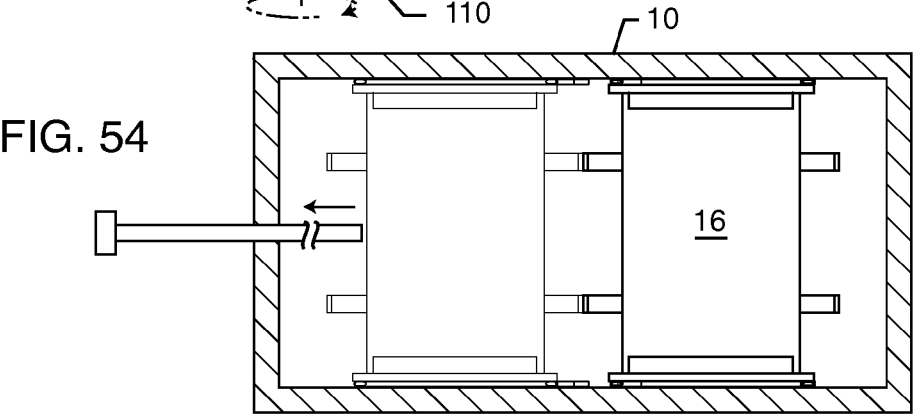
FIG. 54 is a top view taken generally along line 54-54 of FIG. 53 illustrating retraction of the upper horizontal actuator.
Figure 55:
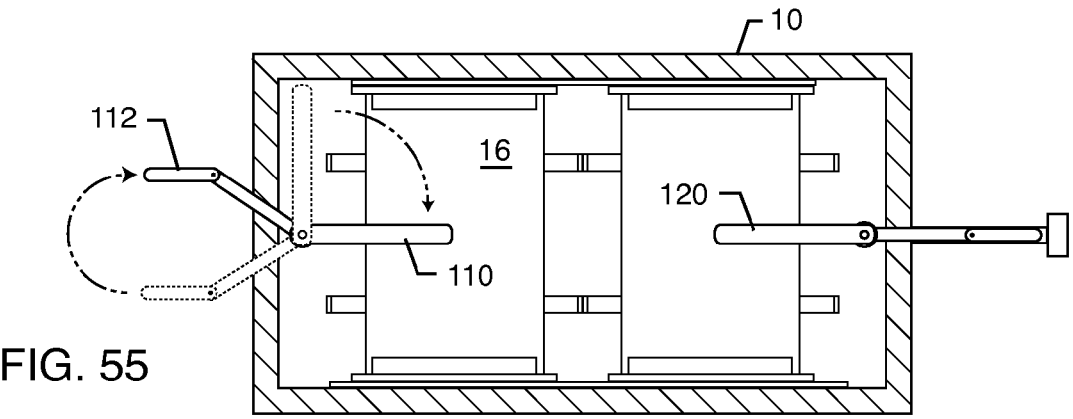
FIG. 55 is a bottom view taken generally along line 55-55 of FIG. 53 illustrating placement of the swing arm under the first column of storage units in accordance with the present invention.
Figure 56:
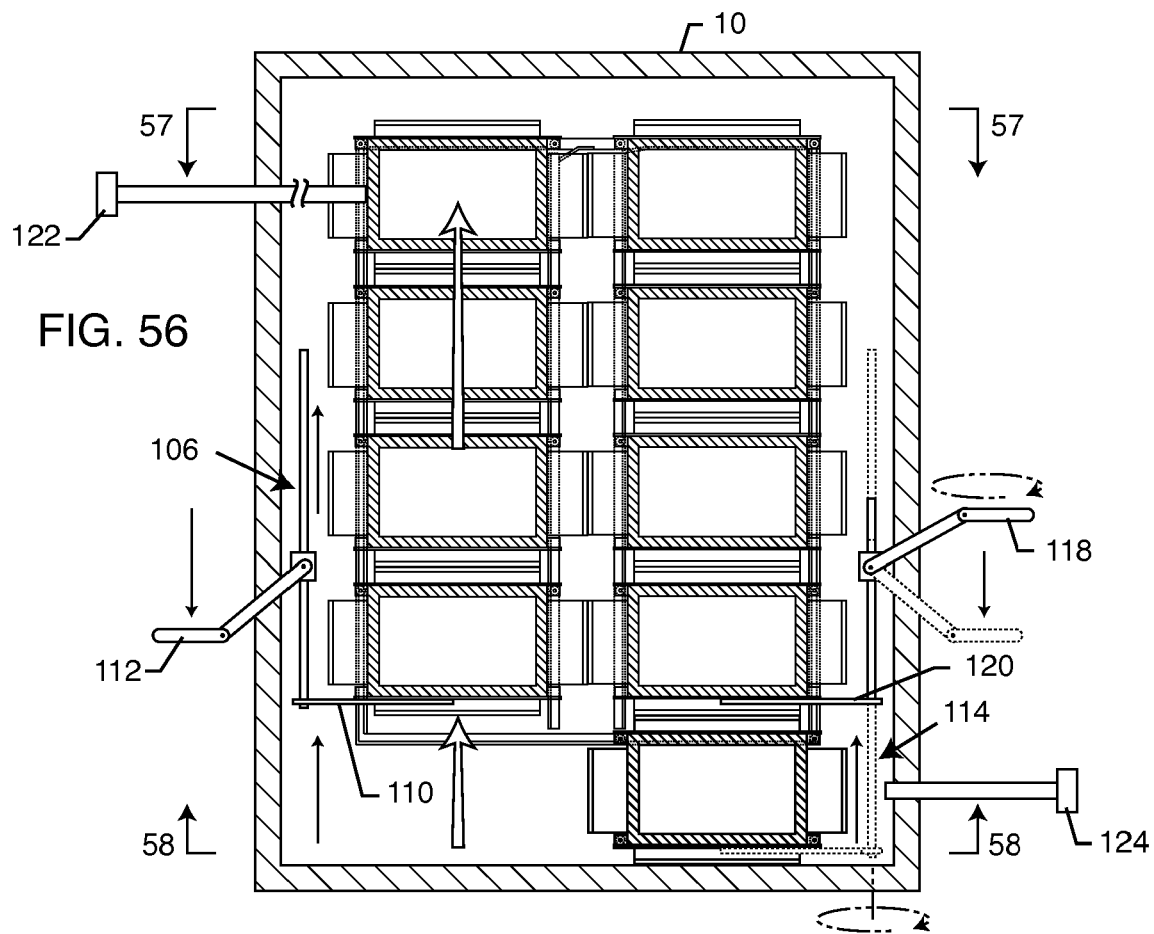
FIG. 56 is a cross-sectional diagrammatic view illustrating the lifting of the first column of storage units using a vertical actuator, in accordance with the present invention.

Once the upper most storage unit 16 (space S1) has been moved from the end column to the vacancy (space S2) in the adjacent column, as illustrated in FIGS. 51 and 52, the rod 122 is retracted out of the housing or track path. The arm 110 is then swung into position under the storage unit 16 at the bottom of the first end column, as illustrated in FIGS. 53 and 55, using the handle 112. The stack of storage units 16 and the end column is then lifted upwardly to create a vacancy in space S7, as shown in FIG. 56. As discussed above, given the weight of the storage units 16, a screw lift or hydraulic lift or jack may be used in this step.

Figure 57:
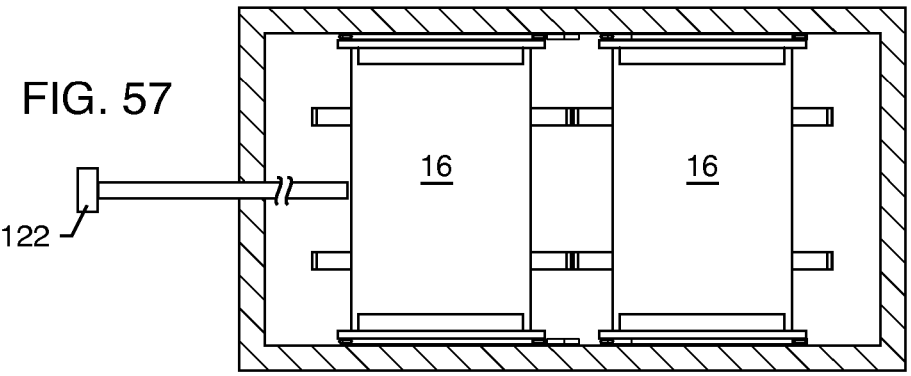
FIG. 57 is a top view taken generally along line 57-57 of FIG. 56.
Figure 58:
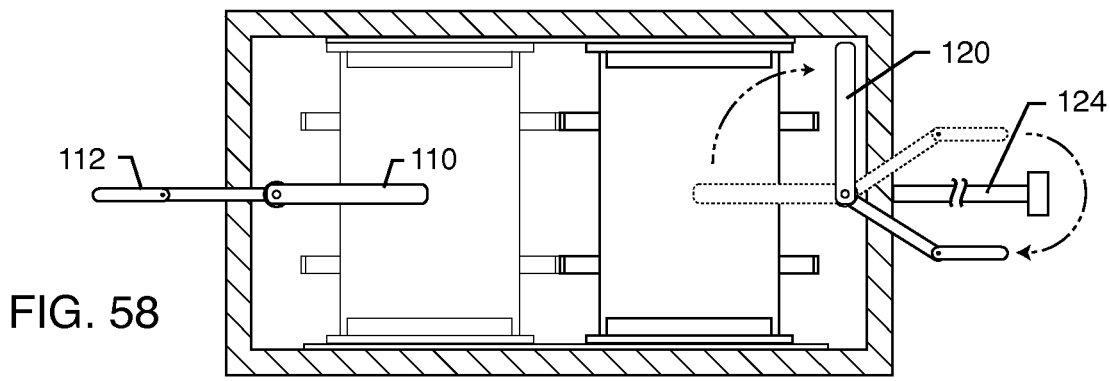
FIG. 58 is a bottom view taken generally along line 58-58 of FIG. 56, illustrating placement of the swing arms, in accordance with the present invention.
Figure 59:
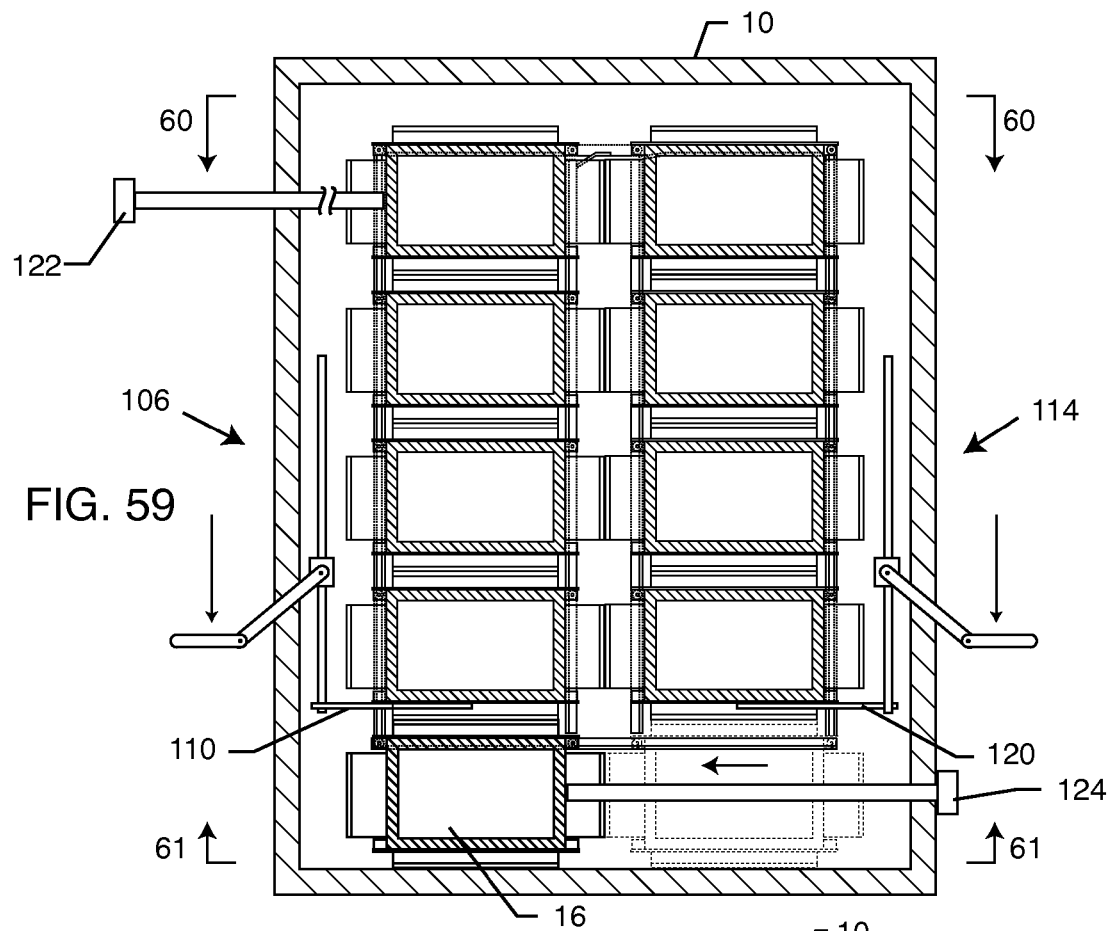
FIG. 59 is a cross-sectional diagrammatic view illustrating movement of a bottom storage unit from one column to another column, in accordance with the present invention.
Figure 60:
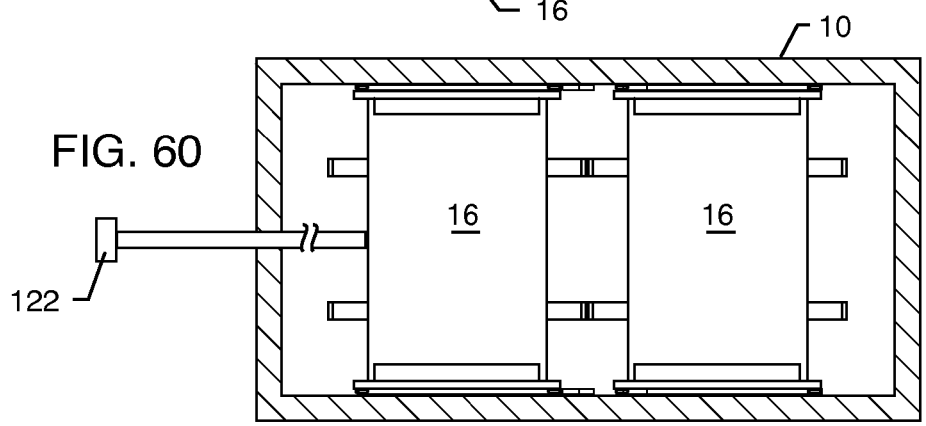
FIG. 60 is a top view taken generally along line 60-60 of FIG. 59.
Figure 61:
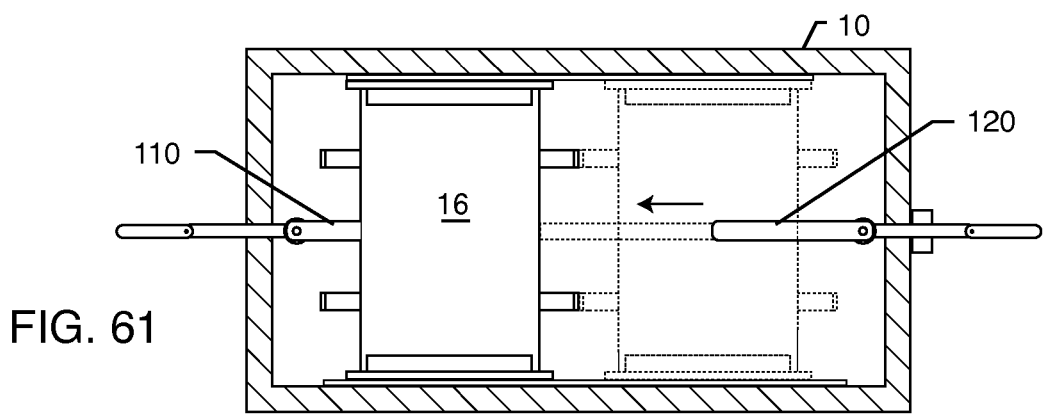
FIG. 61 is a bottom view taken generally along line 61-61 of FIG. 59.

Arm 120 is then moved into position using vertical actuator 114, such that it rests between the two bottommost storage units 16, as illustrated in FIG. 56. Rod 124 is then used to push the lowermost storage unit from space S6 into space S7 in the first end column, as illustrated in FIGS. 56-59. In FIGS. 56-58, FIG. 58 illustrates an intermediate step in the movement of the handle, levers and arms, with FIG. 56 illustrating an initial and end position of these structures.

Figure 62:
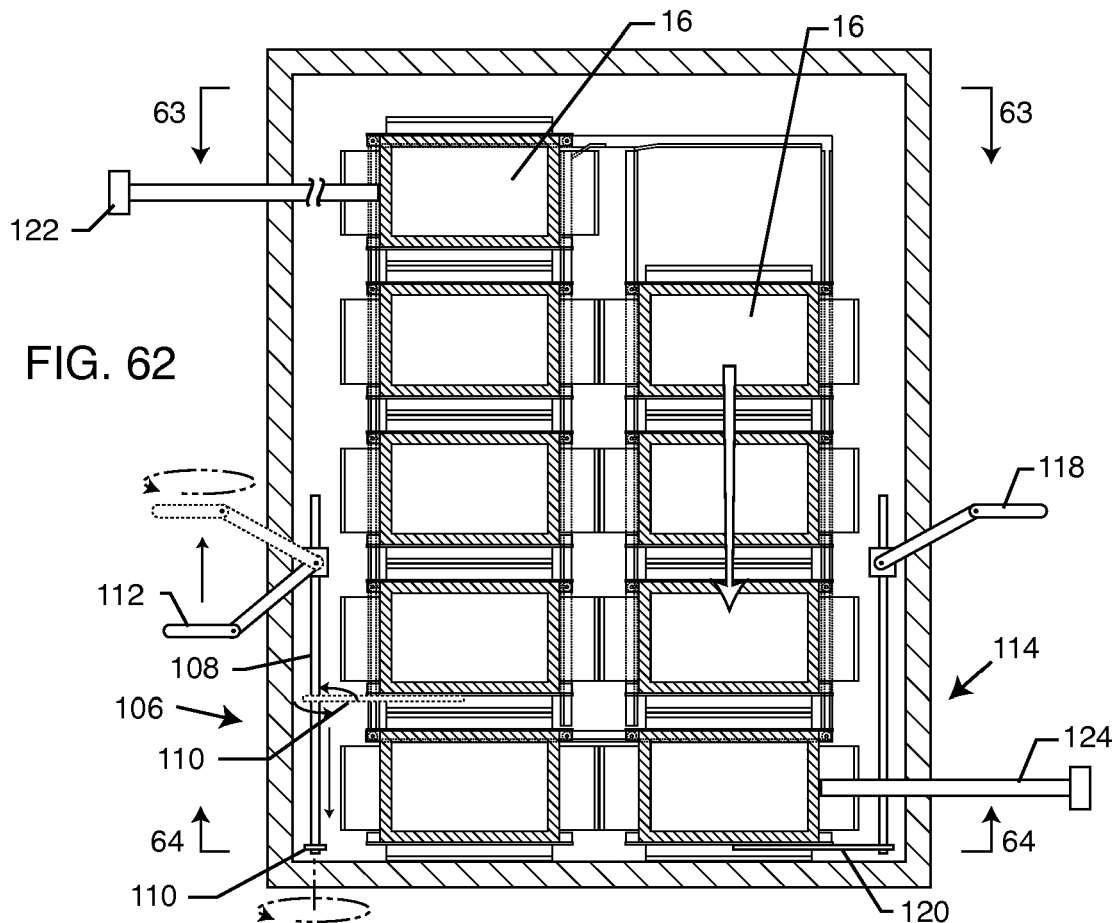
FIG. 62 is a cross-sectional diagrammatic view, illustrating the lowering of the second column of storage units in accordance with the present invention.
Figure 63:
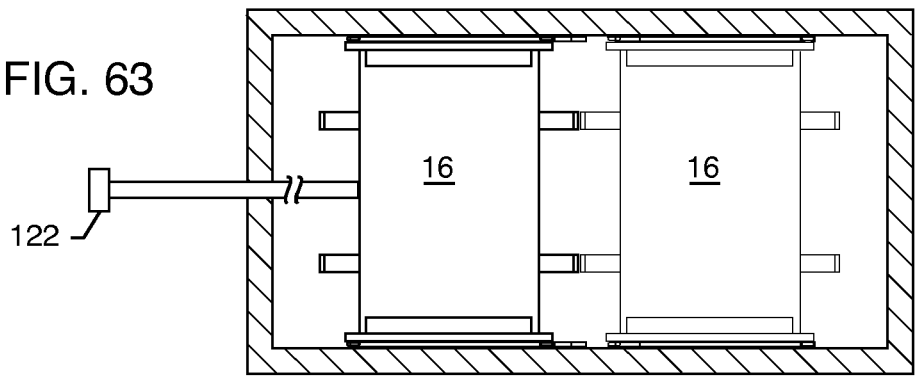
FIG. 63 is a top view taken generally along line 63-63 of FIG. 62.
Figure 64:
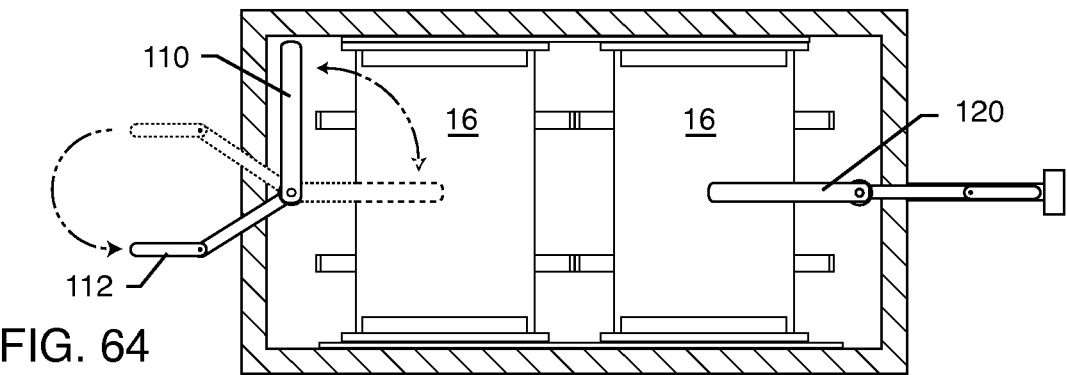
FIG. 64 is a bottom view taken generally along line 64-64 of FIG. 62, illustrating placement of the swing arms in accordance with the present invention.

Rod 124 is then retracted away from the track system and the second end column of now four stacked storage units 16 are lowered to create a vacancy in space S2, as illustrated in FIG. 62. Thereafter, arm 110 is pivoted, such as rotating rod 108 using handle 112, so that it is removed from the bottom of the second of the lowest stacked storage unit into an at rest position, as illustrated in FIGS. 62 and 64. The sequence is then repeated as necessary until the desired storage unit is accessible.

Figure 65:
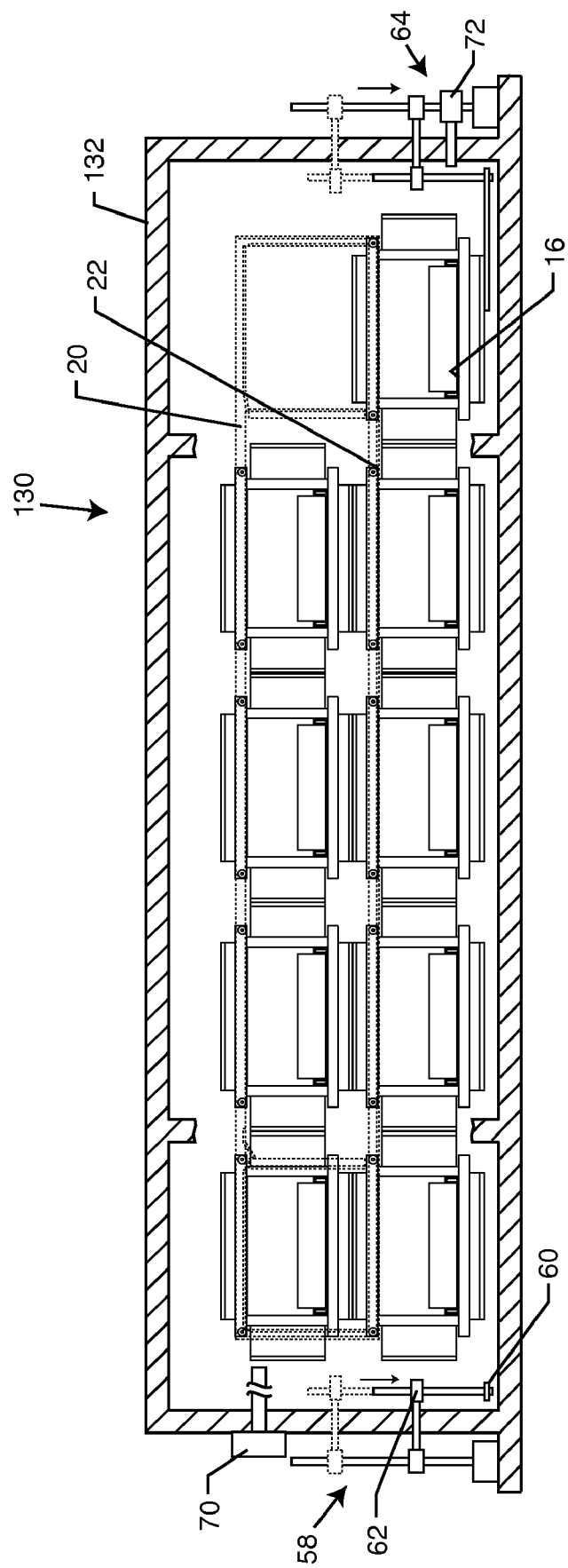
FIG. 65 is a cross-sectional diagrammatic view illustrating the present invention incorporated into a horizontal system, including two rows of storage units.
Figure 66:
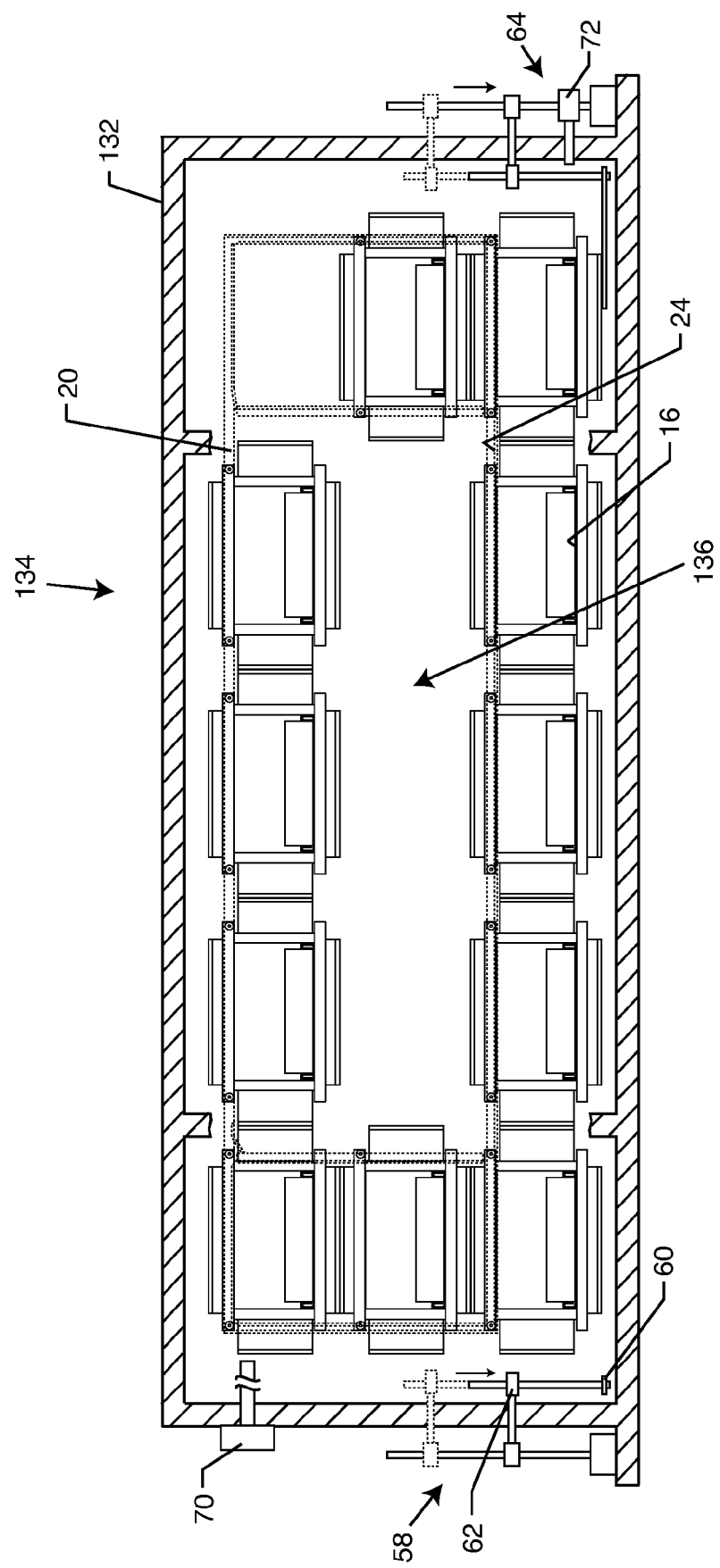
FIG. 66 is a cross-sectional diagrammatic view, similar to FIG. 65, illustrating three storage units in height at opposite end columns of the system, in accordance with the present invention.

With reference now to FIGS. 65 and 66, although the invention has been illustrated in FIGS. 1-64 as primarily a system with two adjacent vertical columns, it will be readily understood that this is not the only configuration of the present invention. For example, with reference to FIG. 65, a horizontal system 130 is shown having two horizontal rows of storage units 16. The storage units 16 may be similar in configuration as described above, and partially supported and slidably moved along tracks 20 and 22. However, in this case, there are only two rows of storage units 16 with a plurality of storage units (in this case five) horizontally aligned. The storage units 16 may be contained within a counter or filing cabinet 132. This configuration is particularly adapted and designed for office drawer systems wherein elongated rows of drawers with a relatively low table or counter space are found. Such applications can also be found in other settings, such as the kitchen where an elongated and relatively low counter is present. Vertical actuators 58 and 64, and horizontal actuators 70 and 72, as discussed above with respect to FIG. 35 are used in a similar manner as described above in order to rotate the storage units 16 to the desired position for access by the end user. The two end columns (in this case only two storage units 16 in height) are lifted, supported, and moved as discussed above. The difference being that instead of a storage unit 16 moving from one vertical column to an adjacent column, the storage unit 16 is moved into a horizontal row of storage units until it is positioned in one of the four corners comprising the vertical columns, as illustrated.

With reference now to FIG. 66, it will be appreciated that the end columns need not be restricted to two drawers in height. Instead, three or more storage units 16 may form the end vertical columns, with the uppermost and lowermost storage unit 16 resting on the horizontal portions of tracks 20 and 24 so as to form the elongated row of storage units 16, as illustrated in FIG. 66. In this embodiment 134, there exists a space or cavity 136 between the end columns and the upper and lower rows of storage units 16. Such space or cavity 136 can be used advantageously, such as for storage purposes, or in the event that the cavity 136 is occupied by wiring, an appliance, etc., which cannot be easily removed, and which must have the system 134 built around it. Using an example of a kitchen, the individual storage units 16 can store and house condiments and other food items. The cavity 136 between the storage units 16 can be a counter work space, or additional slide-out drawers or the like which house and contain items which must be frequently accessed, such as spoons, bowls, etc. It can also be a counter or work space.

It is contemplated by the present invention that the contents of the individual storage units 16 be tracked, such as using bar code symbols or the like, so that the contents of any given storage unit 16 is readily ascertainable. In this manner, using a keypad or electronic interface, the end user can determine in which storage unit a given object is located, or automatically move a given storage unit 16 into the desired location by inputting its assigned number, scanning a bar code from a product, etc.

Figure 67:
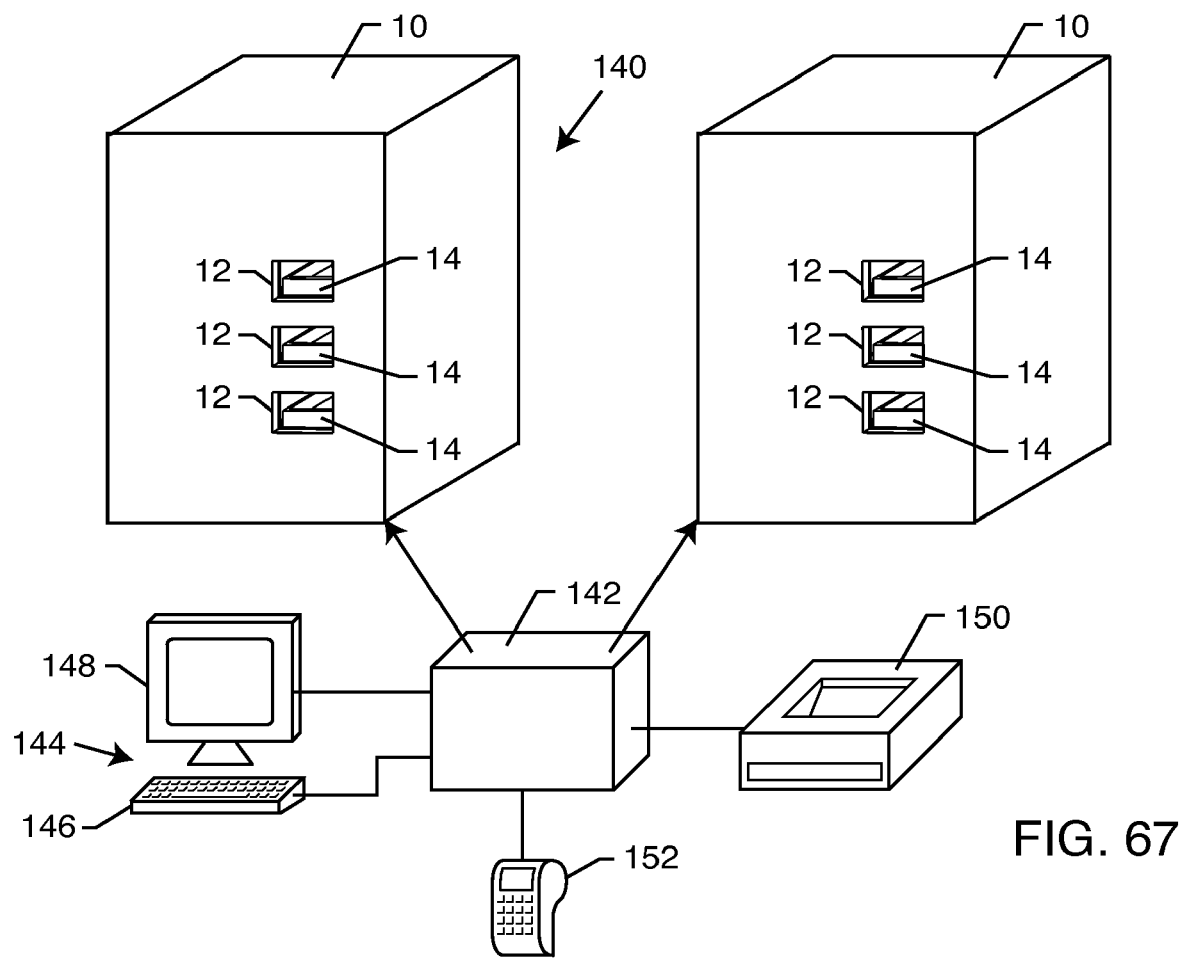
FIG. 67 is a perspective view of an inventory control system for use with one or more storage modules.

Therefore, in accordance with another embodiment, the present invention resides in an inventory control system 140. With reference to FIG. 67, an inventory control system 140 includes one or more storage modules, in the form of the upright box structures 10 described above, operationally connected to a control unit or controller 142, similar to controller 18 and control module 76 as described above, where the controller 142 is mounted to the structure(s) 10 or wall, or may be in the form of a wireless controller or even a controller wired to the system 140 but placed in another room or the like. As described above, each box structure 10 has a continuous track and a plurality of individual storage units 16 stacked in multiple columns. Each storage unit 16 is engaged with the track for selective movement along the track. The box structures 10 may be in the same room, placed in different rooms or even in different buildings (e.g., one box structure 10 in a house and another box structure 10 in a detached garage, guest house, pool house or the like). One of the upright box structures 10 may be refrigerated or contain one or more individually refrigerated storage units 16. The controller 142 is operationally connected (i.e., electrically, mechanically, wirelessly, and/or electronically) to a user interface 144 (e.g., keyboard and/or keypad 146, a display or monitor 148 or the like), and a printer 150. The controller 142 associated with the box structure(s) 10 is operationally connected to and/or includes a mechanism 152 for inputting object information, including storage unit placement, that is associated with a particular item 56. The controller 140 may be built into a personal digital assistant (PDA). The controller 142 allows a user to determine whether or not an object (i.e., an item 56) is in a storage location (i.e., within a home, office; box structure 10 within the home or office, and the storage unit 16); in which part of the storage location the object is located (i.e., which room the box structure 10 is located in); and find the object no matter where the object is stored (i.e., provide a searchable inventory database that provides object information as well as the location where the object is stored). The inventory control system 140 can use pre-existing object information to associate that object with a particular location as well as associate certain information with an object to identify that object and its location. The controller 142 is adapted to receive and store object information from all the structures 10 that are part of the inventory control system 140.

Figure 68:
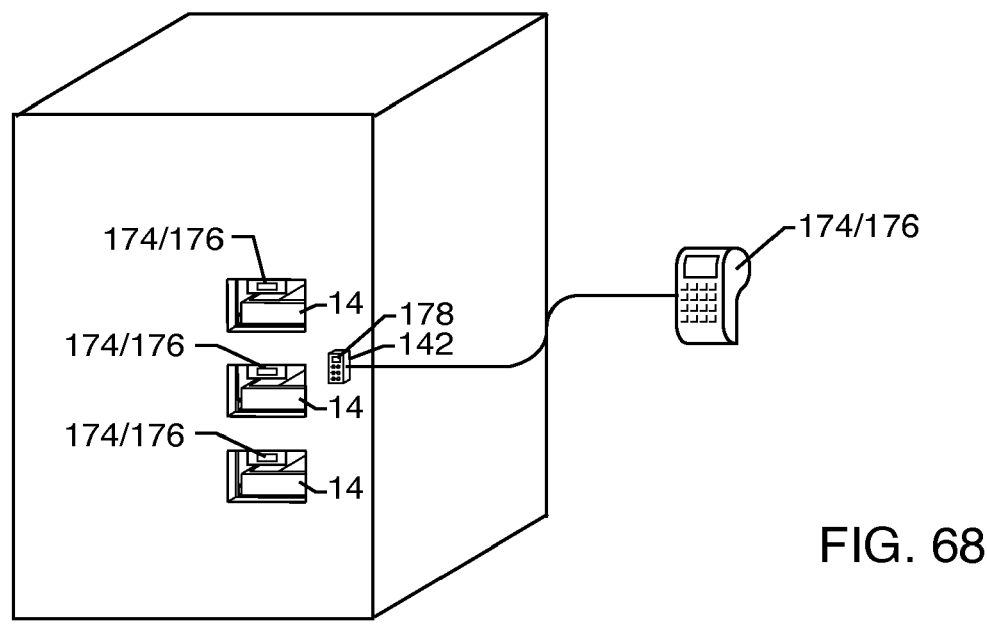
FIG. 68 is a perspective view of a storage module using data readers.
Figure 69:
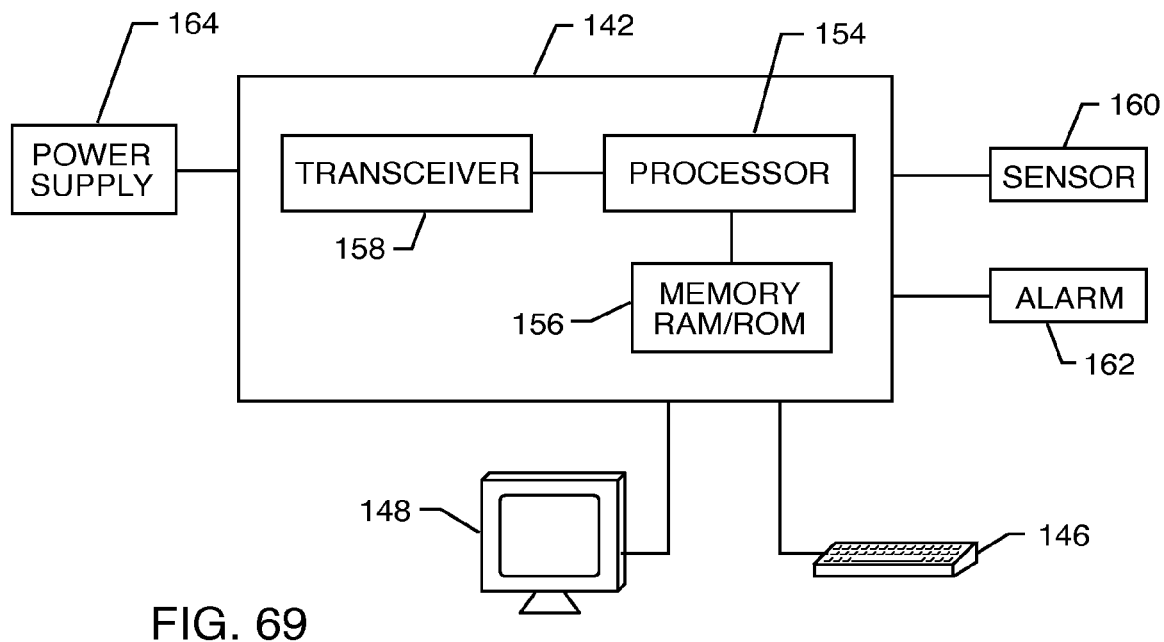
FIG. 69 is a diagram illustrating connections between a control unit and various devices of the present invention.
Figure 70:
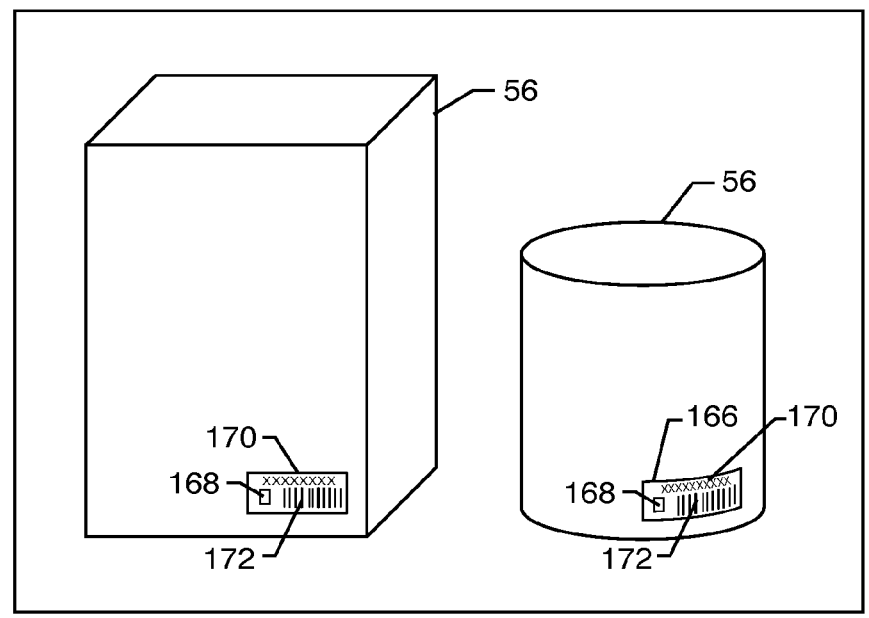
FIG. 70 is a perspective view of illustrative labeled objects stored with a storage unit of a storage module.

With reference now to FIGS. 68 and 69, the controller 142 includes control circuitry that performs the functions described with respect to the controller 18 and the control module 76. The controller 142 includes a digital computer including, without limitation, a processor 154, a memory 156 (including RAM and ROM) operationally connected to the processor, and a transceiver 158 for allowing the controller 142 to communicate with the upright box structure(s) 10. The controller 142 may be operationally connected to a number of sensors 160 (temperature sensors, movement sensors, humidity sensors) and at least one audio alarm 162. A power supply 164 is connected to the controller 142 and the box structure(s) 10.

The processor 154 receives the object information associated with a particular item 56 from the inputting mechanism 152, and stores the object information in the memory 156 for user access therefrom via the user interface 144. In a preferred embodiment, the inputting mechanism 152 comprises at least one data reader adapted to read machine readable codes associated with the items 56. However, the inputting means can also comprise the keyboard/keypad 146, or other inputting means.

The controller 142 coordinates and controls the functions of the box structure(s) 10 (including the temperature of refrigerated storage units 16), the printer 148, the user interface 144 and the data reader 150. The processor 154 of the controller 142 coordinates movement of the storage units 16 and the items 56 associated therewith. The processor 154 is adapted to provide an inventory of the items 56 in the storage units 16 of the box structure(s) 10 as well as to review object information to determine if an expiration date has been exceeded.

The user interface 144 allows a user to program and operate the inventory control system 140. The user interface 144 is adapted to access information about a particular item, search for a particular item using one or more pieces of information about the item 56, locate a particular item 56 within the structure 10, and input information about a particular item 56 into the memory 156. In addition to the keypad or keyboard 146, the user interface 144 may also include, without limitation, knobs, dials, switches, buttons or the like. The display 148 provides a user with a graphical user interface, liquid crystal display or the like. A computer mouse, light pen or stylus may be used in conjunction with the user interface 144. A computer program stored within the memory 156 includes at least one program, executed by the processor 154, which operates the various functions including, without limitation, control, monitoring, and printing functions, when the processor 154 receives electrical signals from the user interface 144 and/or identification information based on a barcode scan or RFID scan from the data reader 152. The information may be input manually by keyboard 146 to the inventory control system 140 as well via a graphical user interface 148.

The printer 150 is for printing human and machine readable indicia on a label 166 for attachment to an item 56, as seen in FIG. 69. The printer 150 is electrically, electronically, wirelessly and/or mechanically connected to the controller 142. The printer 150 may be built into the box structure 10 itself. The printer 150 may be selected from one of several types, including impact printers (e.g., dot matrix, typewriter-like imprint), ion deposition printers, inkjet printers, laser printers, direct thermal printers, and thermal transfer printers. Alternatively, identification information may also be printed directly on the items 56 by laser etching. If direct thermal printing is used, an imaging coating must be provided on any label 166 to be attached to an item 56. The label 166 may include an adhesive surface that allows the label 166 to be attached to the item 56. Information, including but not limited to identifying data (e.g., description of the item 56), expiration dates, etc., may be placed on the label 166 prior to the label 166 being applied to the item 56. The label 166 may also have an RFID inlet or receiver (i.e., chip & antenna) 168 attached, with the information about the item 56 also written to the RFID inlet 168 as well as on the label 166 attached to the side of the item 56. Alternatively, the RFID inlet 168 may be attached to the item 56, either by being embedded within the item 56 or attached to the item 56 by an adhesive or the like either prior to or after the identifying data and the like are imparted to the RFID inlet 168. The item 56 may have had a pre-existing RFID inlet 168 as the RFID inlet 168 may be embedded within a label of a grocery item during the manufacture of the label, just as a UPC number is printed on the label. Identifying data and the like of the item 56 may be written to the RFID inlet 168 on the label 166 either prior to or after the label 166 is attached to the item 56. Human and machine readable text includes, but is not limited to, text indicia 170, bar code indicia 172 (including, but not limited to UPC number), graphical indicia or the like.

At least one software program is stored in the memory 156 to be operated on by the processor 154 within the controller 142. This program may include a first sub-routine for operating the user interface 144. The program may also include a second sub-routine for printing information on a label 166 to be attached to an item 56. The program may further include a third sub-routine for receiving information transmitted to the controller 142 via RFID or barcode reader technology. A data reader 152 including, but not limited to, bar code readers/laser scanners 174 and RFID readers 176 is electrically, electronically, and mechanically connected to the controller 142 such that the reader 152 is able to scan a barcode 172 or RFID inlet 168 associated with a particular item 56 so that the information can be stored in the memory 156 of the controller 142. Information relating to that particular barcode 172 or RFID inlet 168 may have already been downloaded to the controller 142 which is then able to correlate the scanned barcode 172 or RFID inlet 168 with particular information relating to the item 56, such as how many identical items 56 are already in one or more storage units 16. The controller 142 can differentiate otherwise identical items 56 by differing expiration dates. A sub-routine may be dedicated to monitoring whether the expiration dates of various items 56 in the storage units 16 have been exceeded. Another sub-routine may be dedicated to creating an inventory of all items 56 held within the storage units 16. The controller 142 may include a sub-routine for associating a particular scanned barcode 172 or RFID transmitted information with a particular item 56 that the controller 142 then directs the printer 150 to print out a label containing that particular barcode on a label 166 for attachment to that item 56. For example, this would allow a user to scan in the barcode on a tag attached to a newly purchased shirt which will soon have that tag removed. After the shirt has been worn and cleaned, the user can then create a label 166 having that identifying barcode, attach the label 166 to the shirt and then store the shirt in a storage unit 16. The controller 142 includes a sub-routine that allows a user to input information that will later be printed onto a label 166 or read onto an RFID inlet 168 for attachment to an item 56. The processor 154 also includes a sub-routine that provides (via the printer 150, the user interface 144 or the like) an inventory of the items 56 in the structure(s) 10.

There may be mutual communication between the data reader 152 and the controller 142. Initially, the circuitry of the reader 152 is programmed to provide identifying and other information and the controller 142 is capable of eliciting such information from the circuitry of the reader 152. The identifying data may include the name of the item 56, size of the item 56 (e.g., one liter bottle), etc. The controller 142 may then use the printer 150 to print this data on a label 166 for the item 56 at any time during the process, including printing the name of the item 56 on the label 166 in barcode form or printing the expiration date, name, etc. of the item 56 on the label 166. In a read/write configuration of the circuitry of the controller 142, the reader 152 may also impart information to, alter information on, or delete information from the controller 142. Likewise, the controller 142 is capable of providing identifying and other information to the RFID circuitry of a particular item 56.

The controller 142 may also include a built-in user interface 178 which includes a display (such as a liquid crystal display), a thumb print reader, alpha-numeric keypad, and/or various knobs, switches, and controls used to activate/operate the structure(s) 10. The display of the interface 178 could employ touchscreen technology that would eliminate the need for physical switches, keypads, or the like.

As outlined above, a number of sensors 160 are associated with the processor 154 and distributed throughout the interior of the structure(s) 10 to determine conditions (e.g., temperature, movement, humidity, etc.) within the structure(s) 10. The sensors 160 are associated with the track within the structure(s) 10, actuators, and individual storage units 16. Upon detection by one or more sensors 160 of any unauthorized entry of the structure(s) 10 (such as a hand or other object reaching into the structure(s) 10, pulling on the storage unit(s) 16, forcing a storage unit 16 along the track, etc.), a sub-routine run by the processor 154 performs at least one security function. These security functions include sounding an audio alarm via the alarm 162, displaying a graphical alarm via the display 146, and preventing movement of storage units 16 within the structure(s) by shutting off the actuators that move storage units 16 within the structure(s) 10. The processor 154 can send an email alert to a user via the Internet that informs the user of the security situation. A sub-routine run by the processor 154 also monitors and controls temperature within a number of the refrigerated storage units 16 to prevent spoilage of items 56 therein. In the event the processor 154 is unable to maintain temperature within one or more of the refrigerated storage units 16 within an acceptable range, the processor 154 will perform one or more of the security functions described above, including alerting a user to the spoilage situation.

In use, information may be conveyed to the controller 142 before an item or object is placed into the structure(s) 10. Identification information may be conveyed in several ways including, but not limited to, direct input from a user, a bar code assigned to and/or printed on a item 56 that can be read by a data reader 152 operationally connected to the controller 142, and an RFID transport medium on the item 52 that can be read by the controller 142.

The process of entering information which can be pre-printed on the item(s) 56 can begin when the item(s) are brought into a location containing the structure(s) 10. A user can scan the item(s) 56 with the data reader 152 or use the user interface 144 to manually enter the item(s) into the system 140. The data reader 152, 174, 176 may be positioned within the structure 10, near an upper portion of an opening 12 to the storage unit 16, above the drawer 14 so as to scan the item 56 as the item 56 is placed in the drawer 14 of the storage unit 16. Identification and other object information may be downloaded or written to the controller 142 using various technologies including, but not limited to, bar code and RFID technology. The controller 142 can be part of the structure 10 or function as a stand alone unit that does not need to be networked or connected to an IS system located within the home or any other system whereby information may be conveyed to the controller 142. The information obtained by the scan or manually input by the user is stored within the controller 142 and may then be imprinted on the label 166 to be attached to the item and/or written to the RFID chip attached to the item 56, either directly or as part of the label 166. Alternatively, the controller 142 may be networked to the home inventory control system from which the controller 142 can receive constant updates of information, such as power supply.

The item 56 to be stored, depending on its size, will be placed in a storage unit 16 large enough to accommodate its size or, if the item 56 is a perishable item, will be placed in a refrigerated storage unit 16. The label 166, if one is needed, may be affixed to the item 56 after the object information data is transferred to the label 166. The object information can be transferred to the item 56 in a number of ways including, without limitation, by printing human readable text (i.e., alpha-numeric lettering) on the label 166 of the item 56, printing machine readable text (e.g., bar code) on the label 166 of the item 56 or by transmission to the RFID inlet 168 attached to the item 56. Any commercially available RFID chip may be used, including, for example, Hitachi Corporation's mu-chip which is wireless accessible at 2.4-2.45 GHz, can store up to 128 bits of data, and at 0.4 mm square is thin enough to be embedded in a label attached to the item 56 or within a part of the item 56 itself. An antenna for receiving incoming data is connected to the RFID chip.

It is well known to those skilled in the art that RFID circuitry of the type under discussion is provided in a plurality of configurations; for example, read only, read/write, passive, and active. The read only provides previously installed information from the RFID circuit through a compatible reader. The read/write circuit permits the reader to install or alter information stored in the circuit. The passive circuit is one which depends for activation and operating power upon the signal emitted by the reader while the active circuit includes a battery or other internal power source which may be activated by the signal from the reader.

The controller 142 may be powered by an outside source (e.g., a power cord connecting the controller 142 to a wall socket, the electrical system of the structure 10 or the like) or by a battery located within the controller 142. The user interface 144, data reader 152 and/or the printer 150 may be powered in similar fashion. The battery may be a rechargeable battery that is rechargeable while still within the controller 142 by connecting the controller 142 to an outside power source 164.

The controller 142 can come in various forms including, but not limited to, being a part of the structure 10, a personal computer, central server, handheld device, etc. that is electronically, electrically and/or mechanically connected to the structure 10 either by cables, RFID or wireless technology.

In the alternative, the item's 56 identification and other object information may be downloaded and/or written to a home central server at the time the item 56 is brought into the home either by scanning the item 56 or manually entering the information into the central server which is controlling the structure(s) 10 within the home. The home central server may contain a data base of all identification and other information of every item 56 brought into the home where that item's 56 identification and other object information has been entered into the server. This central server could be linked with other homes owned by the user, city or nationwide, to share data in order to maintain an inventory of all items 56 stored by the user in those locations. In this situation, the data file stored on the RFID chip on an item's label 166 is also stored in the home's central server so that the information may be referred to at a later time. In the alternative, additional information can be stored by including a digital photo of the item 56. This photo could be taken by a digital camera and the information then stored within the home central server. The photo could also be printed on the item's label 166. This would further facilitate identification of stored items 56 for insurance purposes in the event of a disaster as the stored photo provides a visual record of an item 56 that may have been destroyed. This would also allow the digital photo to be displayed on the display 148 forming part of the user interface 144 connected to the controller 142. The display 148 allows the item's 56 information to be displayed as well as the digital photo of the item 56.

In another alternative, networking capabilities could be added to the controller 142 that would allow the controller 142 to use an always-on wireless method in order to enable the controller 142 to be in constant communication with the home's central server.

Figure 71:
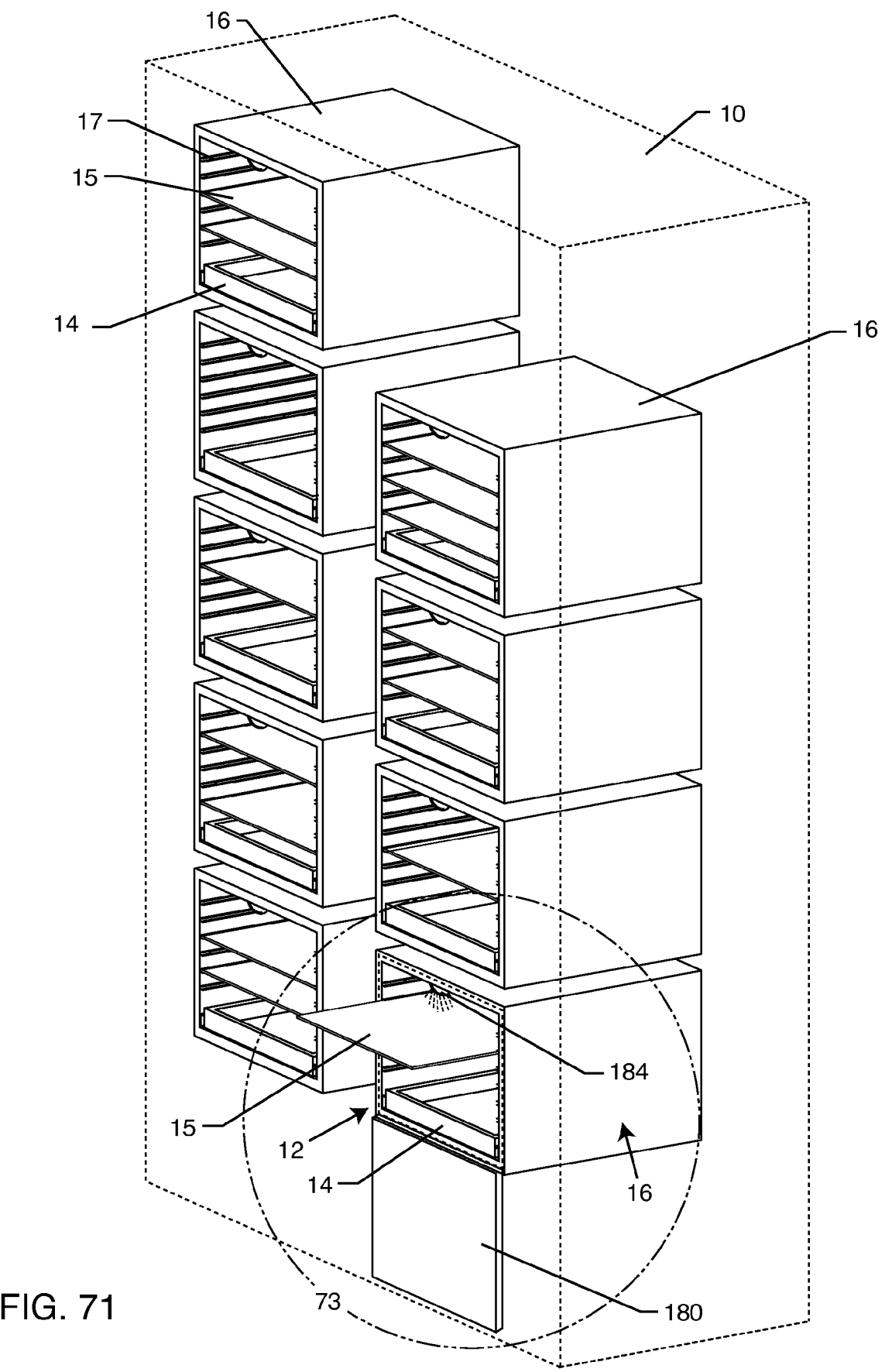
FIG. 71 is a front perspective view of a storage and retrieval system, embodying the present invention, and encased within a wall or housing, without illustrating the tracks, for purposes of clarification.
Figure 72:
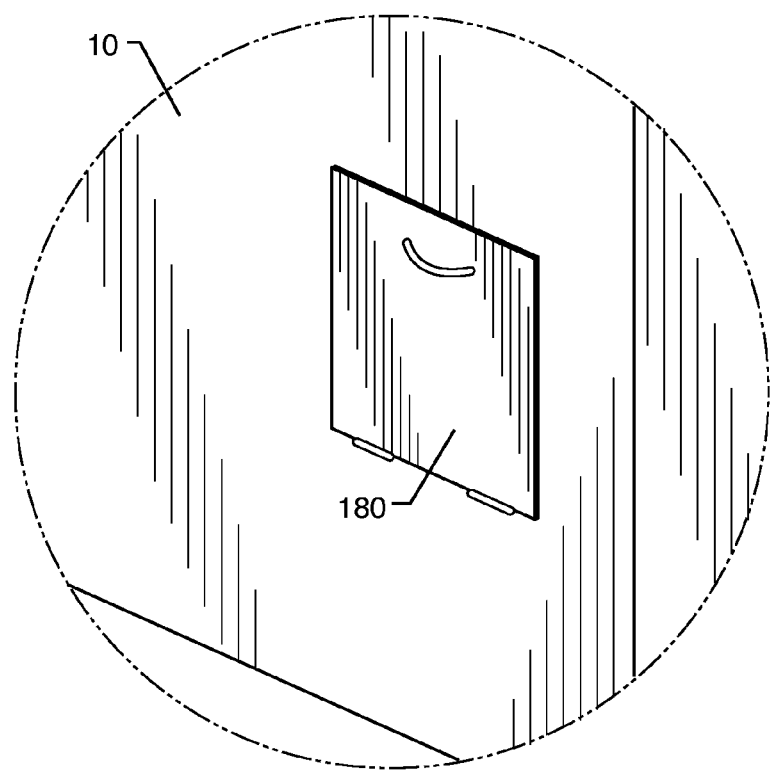
FIG. 72 is an enlarged view of a door in the housing or wall to gain access to a storage unit, in accordance with the present invention.
Figure 73:
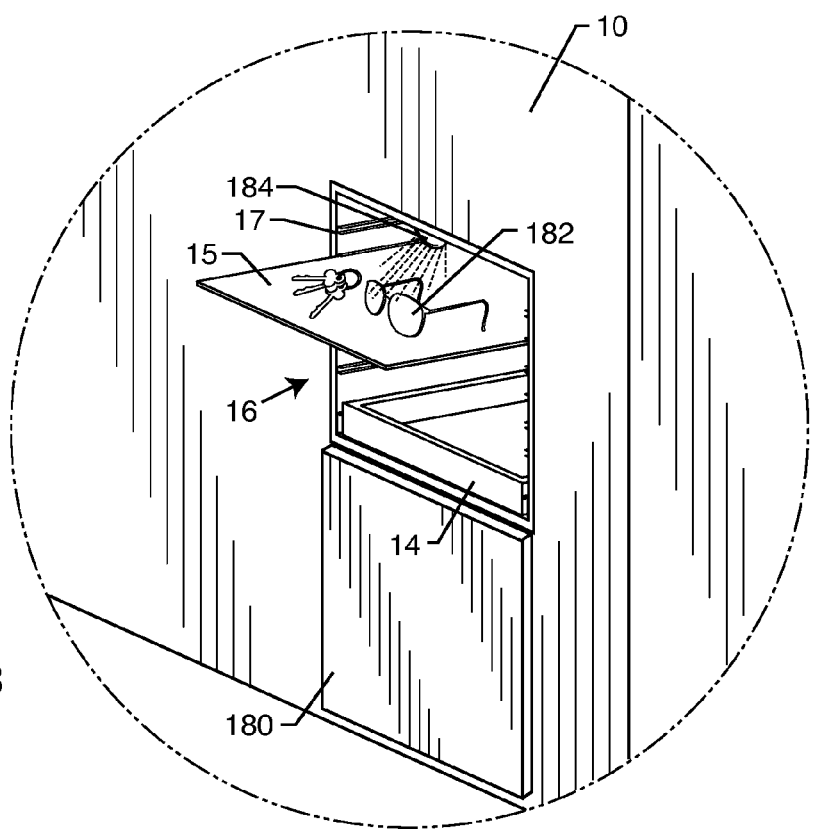
FIG. 73 is an enlarged view of area "73" of FIG. 71, illustrating the retrieval of a desired item from a particular storage unit, in accordance with the present invention.
Figure 74:
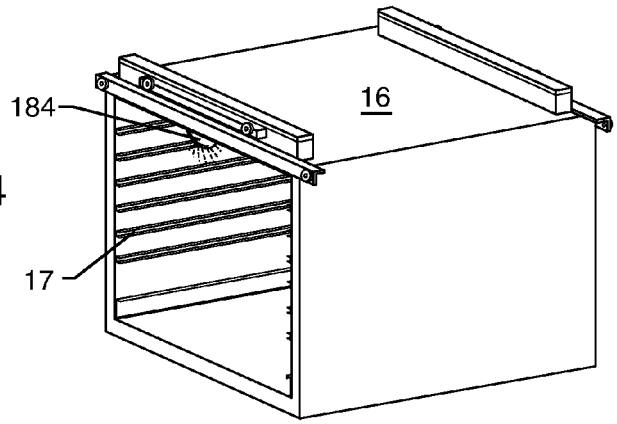
FIG. 74 is a front perspective view of a storage unit used in accordance with the present invention.
Figure 75:
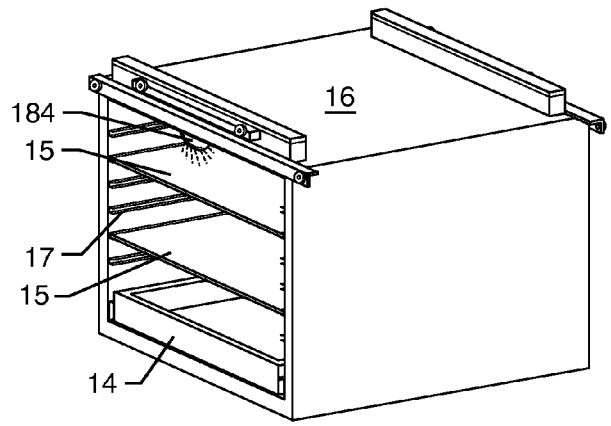
FIG. 75 is a perspective view similar to FIG. 74, but wherein the storage unit has two shelves and a drawer contained therein.
Figure 76:
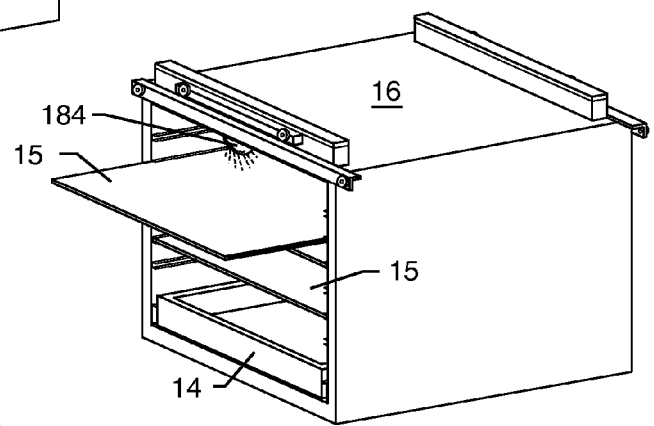
FIG. 76 is a perspective view similar to FIG. 75, illustrating the extension of a shelf, with a light shining on at least a portion thereof, in accordance with the present invention.
Figure 77:
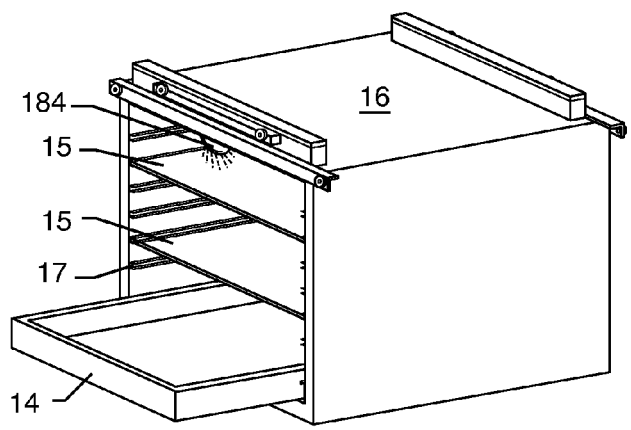
FIG. 77 is a view similar to view 76, but illustrating a drawer of the storage unit extended outwardly.

With reference now to FIGS. 71-73, two columns of a plurality of stacked storage units 16 embodying the present invention are illustrated within a structure 10, typically within a wall space of a house, office or the like. Using the control system of the present invention, as described above, the user selects a drawer or item. The system then automatically moves the storage unit 16 until the desired storage unit having the desired object is disposed in alignment with an opening 12, as described above. It will be appreciated by those skilled in the art that the opening may have a hinged door 180 or the like which must be opened, as illustrated in FIGS. 71 and 73, in order to access the storage unit 16. In a particularly preferred embodiment, the door 180 is capable of opening a full one-hundred-eighty degrees against the side of the wall or other structure 10, so as not to impede access to the storage unit 16, particularly when the user is confined to a wheelchair or the like.

With particular reference to FIG. 73, in a particularly preferred embodiment, the storage unit 16 is capable of holding one or more drawers 14, as well as one or more shelves 15, such as on tracks 17 formed within the storage unit 16. This enables multiple objects to be stored within the storage unit 16, with a drawer 14 or shelf 15 selectively extended, as illustrated in FIG. 73, so as to retrieve the desired object 182. It will be appreciated that the number of drawers 14 and/or shelves 15 depend upon the size and number of objects 182 to be placed within the storage unit 16. In some cases, the storage unit 16 may not include any drawers 14 or shelves 15, the one or more objects merely being placed inside the storage unit 16. However, in other cases, a plurality of drawers 14, a plurality of shelves 15, or a combination thereof, as illustrated in FIGS. 71 and 74-77, can be used.

With particular reference again to FIG. 73, in a particularly preferred embodiment, the control system includes means for locating the position of a particular item in a given storage unit 16. An example of such means includes a light 184 which can be used to view the object 182 in the drawer 14 or on the shelf 15. In a particularly preferred embodiment, the light source 184 is moved or selectively illuminated so as to shine directly onto the portion of the drawer 14 or shelf 15 containing the object. For example, the light source 184 may comprise a plurality of light emitting diodes, only a single, or a limited number of light emitting diodes being illuminated to illuminate only a portion of the drawer 14 or shelf 15, where the desired object is to be found. The location of the object can be tracked in several ways. This can be done by entering the placement of the object in the drawer 14 or on the shelf 15, such as in a grid pattern. Another option is to use sensors to determine the location of the object 182. For example, the object 182 can be labeled with an RFID chip, and a sensor, such as a sensing grid in the drawer 14 or shelf 15 can relay the position of the object 182 in the drawer 14 or on the shelf 15, such that light is directed to that area in order to assist in retrieving the object. It will be appreciated that this can be particularly useful for the elderly or mentally impaired.

Figure 78:
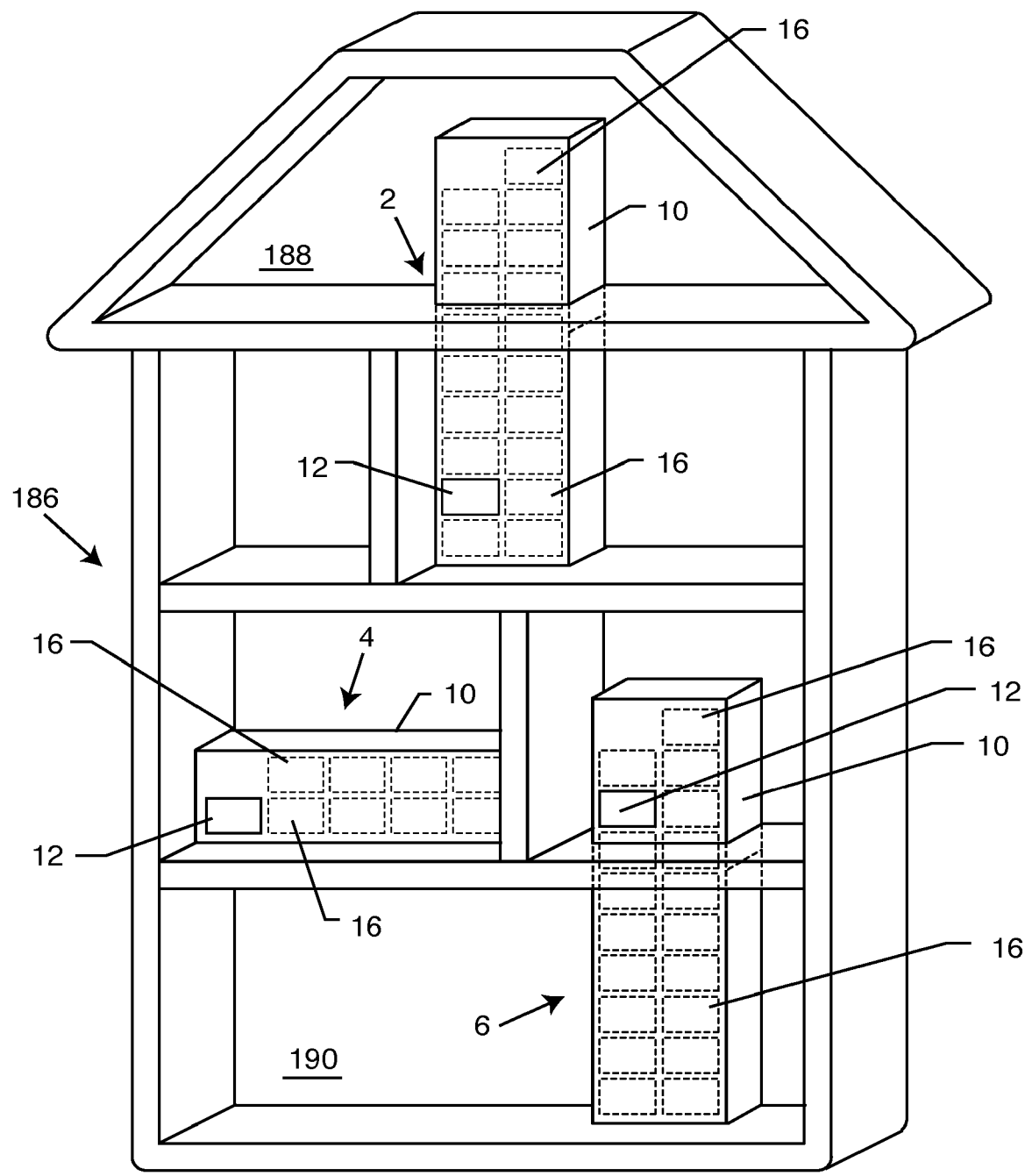
FIG. 78 is a diagrammatic view of a structure having a plurality of storage and retrieval systems embodying the present invention operably disposed therein.

With reference now to FIG. 78, a structure 186, representing a residence, an office, or other structure, includes a plurality of systems 2-6 of the present invention. The systems 2-6 are typically built between wall cavities of the structure 186, although they can have a housing structure separate from the walls so as to have the appearance of a cabinet or the like. It will be appreciated from the drawing that the system of the present invention can have either a vertical or a horizontal configuration. Moreover, it is contemplated by the present invention that otherwise wasted space, such as in the attic or basement, can be used for storage purposes by the present invention. For example, the system 2 includes storage units 16 stacked within the structure 10 on the level or floor which include the access point 12, as well as storage units 16 which extend upwardly into the attic 188 portion of the structure. Similarly, the system identified by reference number 6 has storage unit 16 extending into a basement 190 of the structure 186. Thus, the otherwise wasted space in the attic 188 or basement 190 can be used to house the systems and storage units 16 so as to create an effective storage space, while the individual storage units 16 are accessed on the livable and main levels of the structure 186.

With reference now to FIGS. 79-84, a problem encountered with the single track arrangement of the present invention is that the wheels 38 of the storage unit 16 can fall into the intermediate vertical rails as the storage unit 16 is moved from one end of the track to the opposite end of the track. As described above, the invention incorporated ramps 37, as illustrated in FIG. 3, in order to assist the storage unit 16 from moving between the first vertical set of rails, to the second set of vertical rails. Of course, as shown and described above, this requires that the first set of wheels 38 at a leading edge of the storage unit 16 move from the left intermediate rails 32, past the right intermediate rails 34, and the gap therebetween, and to the far right vertical end rails 30. During this movement, the trailing wheels 38 travel from the far left vertical end rails 28, past the first intermediate rails 32, and into alignment with the second intermediate rails 34, so as to be disposed in the second vertical track and in the second end column. Notwithstanding the use of the ramps 37, however, there still exists the possibility that the wheels 38 could slip into and become jammed in the intermediate rails 32 or 34.

Figure 83:
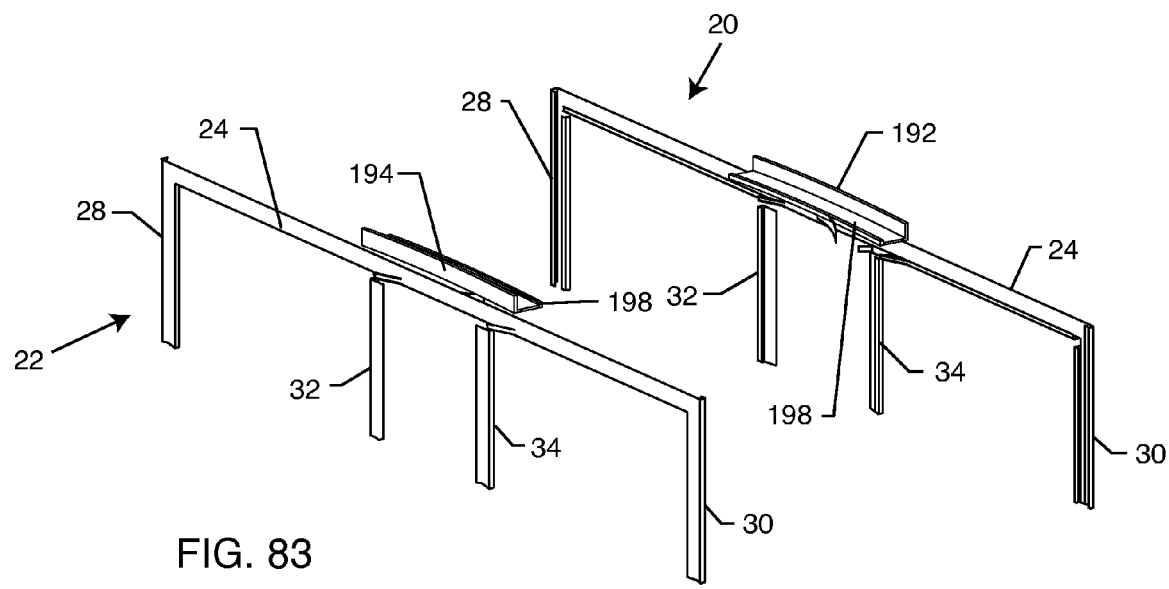
FIG. 83 is a partial perspective view of first and second tracks, each track having a support rail spanning intermediate vertical rails thereof, in accordance with the present invention.

Accordingly, first and second support rails 192 and 194 have been implemented into the invention, and disposed above the upper rails 24 of the first and second tracks 20 and 22. The upper support rails 192 and 194 have a length at least as long as the gap between intermediate rails 32 and 34, but are shorter in length than the upper rails 24. Also, as illustrated in FIG. 83, the support rails 192 and 194 are preferably bowed somewhat, so as to serve to lift the storage unit 16 as the first set of wheels 38 pass over the gap formed by the intermediate rails 32 and 34.

Figure 84:
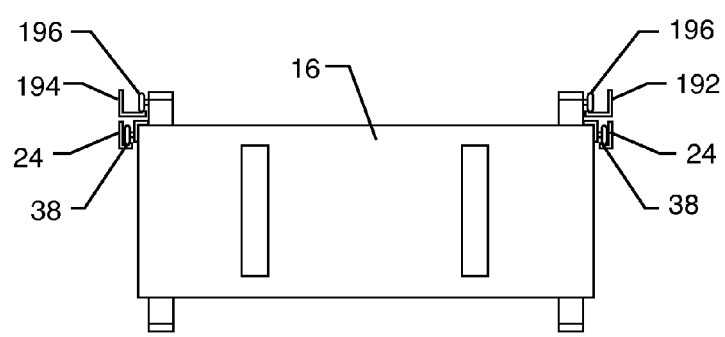
FIG. 84 is a diagrammatic view of a storage unit having its first and second sets of wheels engaging upper rails and support rails, in accordance with the present invention.

With reference now to FIGS. 79-81, the storage units 16, in this embodiment, have been modified to include a second set of wheels 196 which are configured and adapted to engage the support rails 192 and 194. More particularly, as illustrated in FIGS. 79 and 80, the second set of wheels 196 are disposed above, and somewhat inwardly, from the main wheels 38. Moreover, as illustrated in FIGS. 81 and 84, the second set of wheels 196 extend outwardly a shorter distance than the main set of wheels 38. This arrangement allows the second set of wheels 196 to clear the upper 24 or lower 26 rails as the storage unit 16 moves upwardly or downwardly in the first or second sets of vertical tracks. As such, the support rails 192 and 194 are either offset from the upper rails 24, or include a lower traveling lift which is somewhat elongated, as illustrated in FIG. 84, so that the second set of wheels 196 can come into engagement therewith and be supported along the lower elongated ledge 198 of the support rail 192 and 194.

With reference now to FIG. 82, two end columns are illustrated, without the rails or tracks for purposes of clarity. It will be appreciated that the number of storage units 16 in each column can vary, as well as the fact that there can be additional columns of storage units 16 disposed between the end columns. Nonetheless, in accordance with the present invention as described above, an uppermost storage unit 16 in the left end column will need to be moved to an adjacent right column, in this case the far right end column. The means for moving the storage unit 16 have been described above with the use of various actuators.

Figure 85:
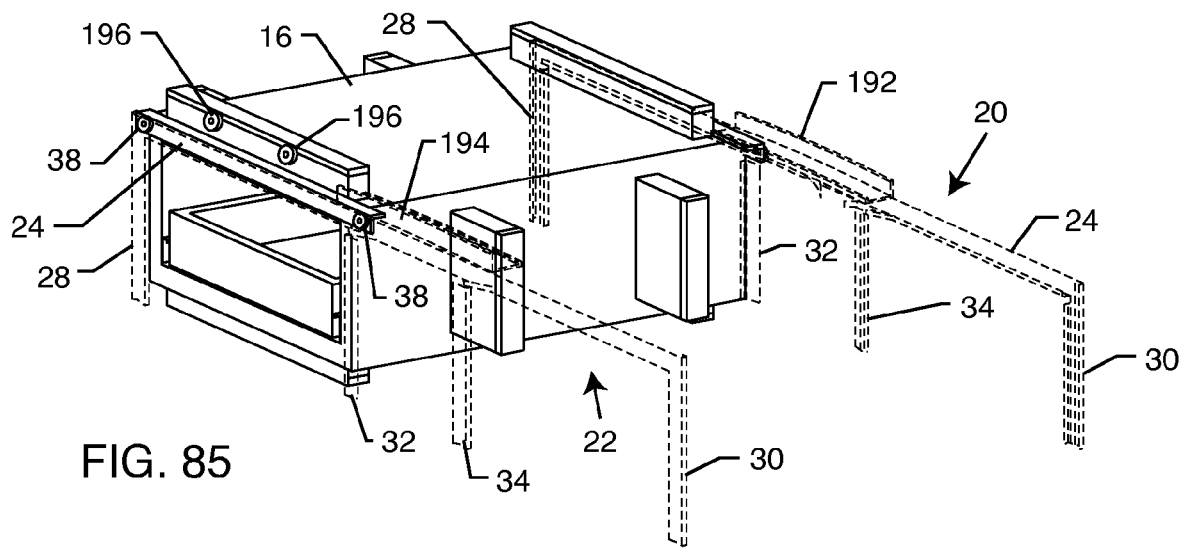
FIG. 85 is a perspective view of a storage unit embodying the present invention disposed at a first end, or vertical track, of the continuous track of the present invention.
Figure 86:
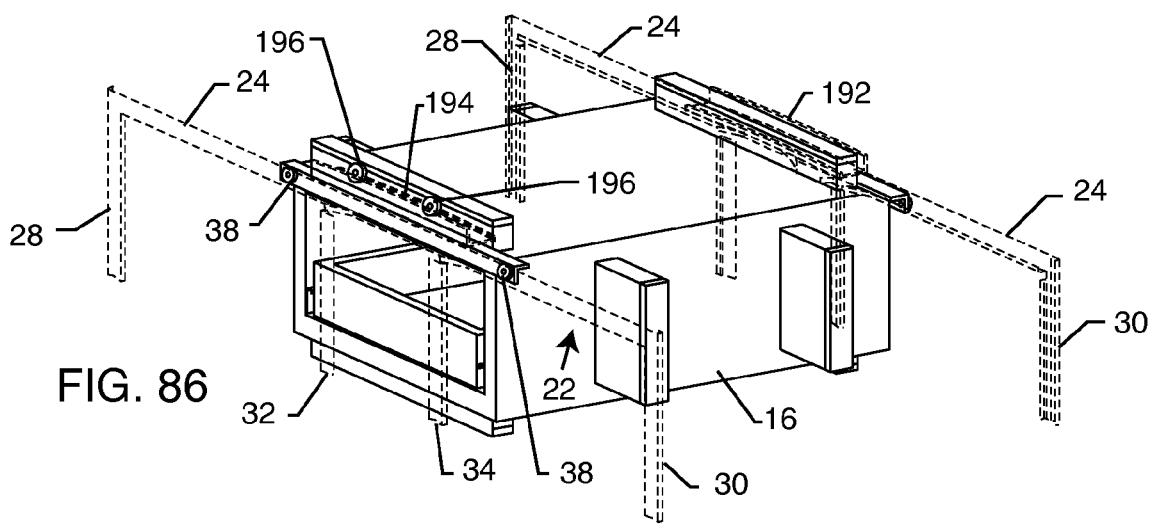
FIG. 86 is a view similar to FIG. 85, illustrating the storage unit's second set of wheels engaging upper support rails as the storage unit passes intermediate vertical rails, in accordance with the present invention.
Figure 87:
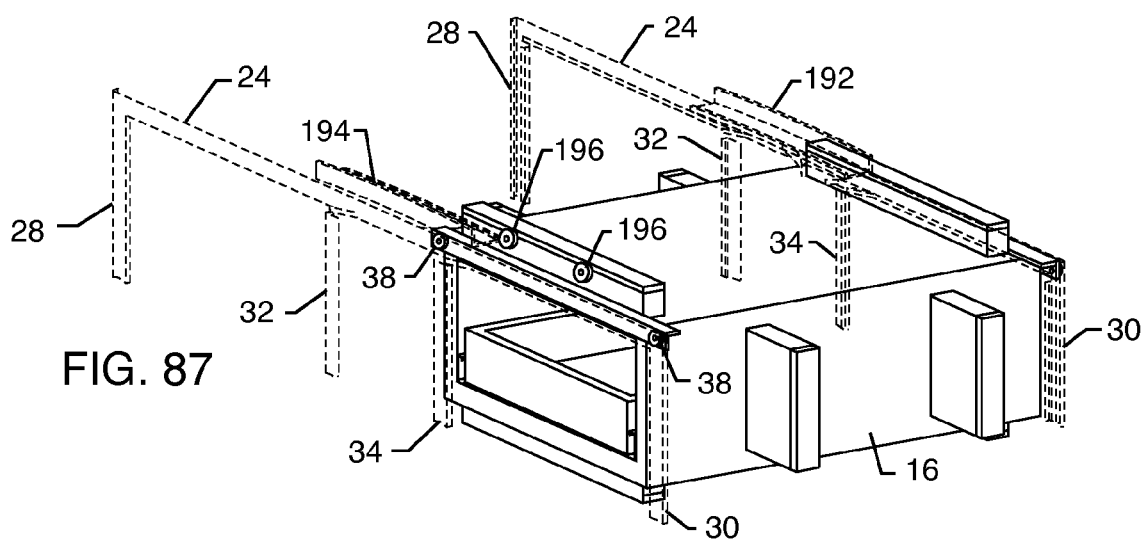
FIG. 87 is a perspective view similar to FIGS. 85 and 86, illustrating the storage unit disposed at an opposite second end, or second vertical track, of the track system of the present invention.
Figure 88:
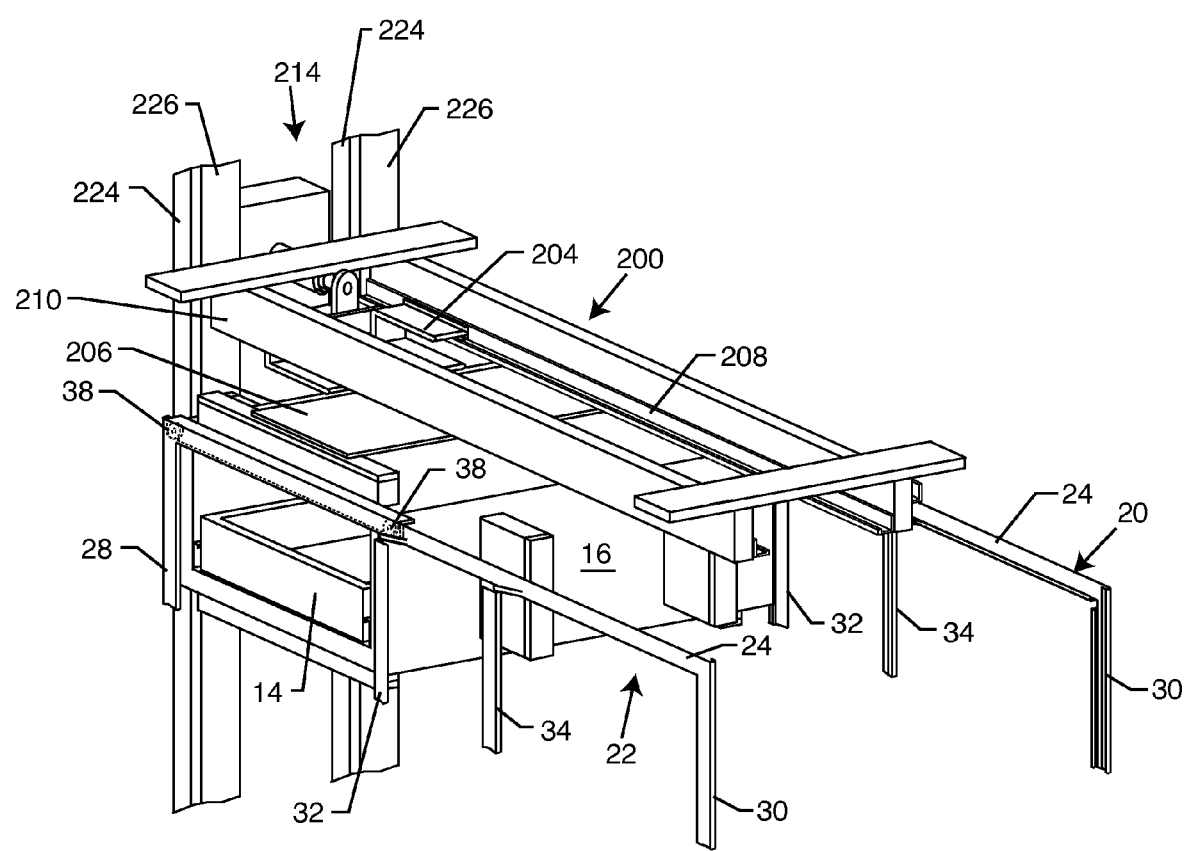
FIG. 88 is a partially fragmented perspective view of a storage and retrieval system of the present invention, incorporating a conveyor apparatus, in accordance with the present invention.
Figure 89:
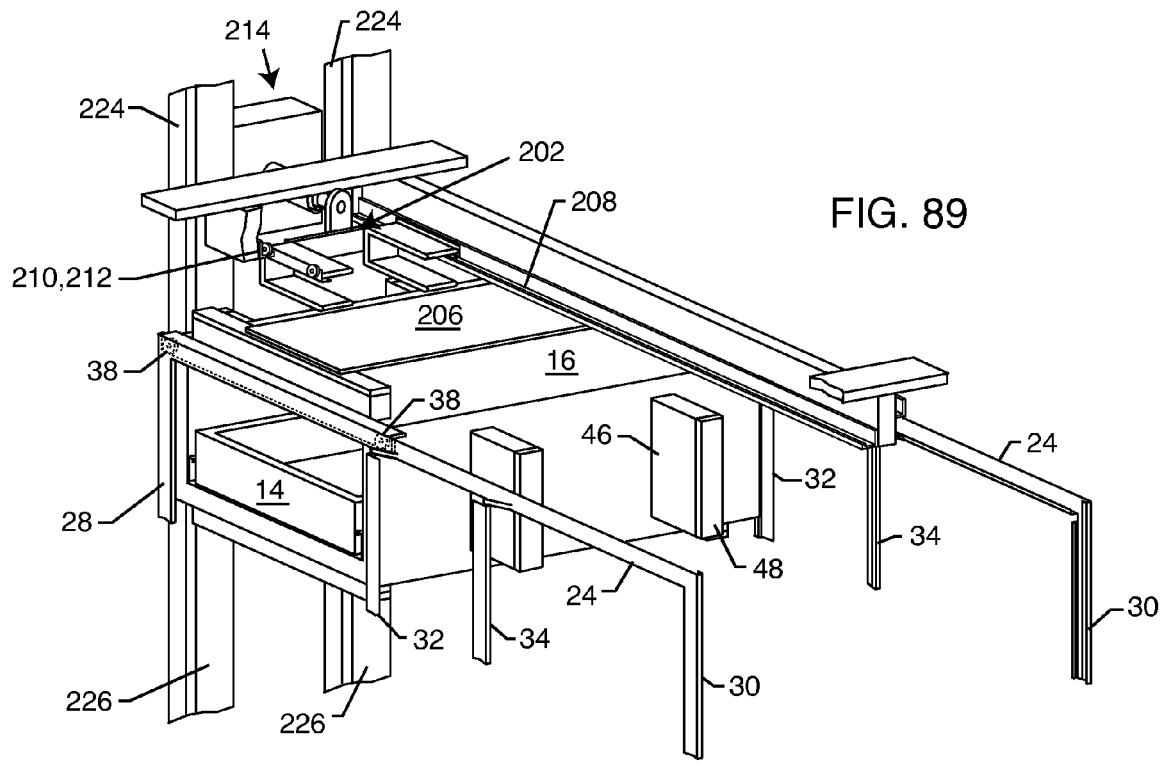
FIG. 89 is a perspective view similar to FIG. 88, but fragmented to show various component parts thereof.

With reference now to FIGS. 85-87, a storage unit 16 disposed at the uppermost position in the far left or first end column is shown moved, such as by the horizontal actuator ram apparatus 70, described above, to the adjacent column, in this case, the far right end column. More particularly, with reference to FIG. 85, it can be seen that the first set of wheels 38 are in engagement with the first end vertical rail 28 and first intermediate or inner rail 32 of each of the first and second tracks 20 and 22. As the storage unit 16 is moved, as illustrated in FIG. 86, the second set of upper wheels 196 come into engagement with the first and second support rails 192 and 194. More particularly, the leading second set of wheels 196 engage the support rails 192 and 194 before the leading main wheels 38 pass over the second inner rail 34. Thus, the storage unit 16 is supported by the second set of wheels 196 on the support rails 192 and 194 as the storage unit 16 passes between the first and second intermediate or inner rails 32 and 34, and the gap therebetween.

With continuing reference to FIGS. 86 and 87, the trailing second set of wheels 196 comes into contact with and rides upon the first and second support rails 192 and 194 before the trailing main wheels 38 come into alignment with the first intermediate or inner rail 32, so as to prevent the trailing main wheels 38 from falling into the gap thereof and becoming bound. As described above, in a particularly preferred embodiment, the first and second support rails 192 and 194 are slightly bowed so that the main wheels 38 are lifted somewhat from the upper rails 24, particularly when the main wheels 38 are positioned over the intermediate rails 32 and 34, to prevent the main wheels 38 from becoming lodged in the gap thereof. The storage unit 16 is then finally moved to the far end, or second, column, wherein the main wheels 38 are in alignment with the second intermediate rail 34 and the second end rails 30, or the second vertical track, so as to be vertically movable along the length thereof, as described above.

With reference now to FIGS. 88-92, in another embodiment of the present invention, a conveyor apparatus 200 is used to pull, and somewhat lift, the storage unit 16 from the end column to an adjacent column, as illustrated the second end column. More particularly, the conveyor apparatus 200 includes a hook assembly 202 including at least one hook member 204 which is configured and adapted to releasably engage a catch 206 extending from the storage unit 16. In a particularly preferred embodiment, as illustrated, the catch 206 comprises a member extending from a top portion of the storage unit 16, such as a metal or rigid sheet or the like extending across spacers 42 and 44.

Typically, the conveyor apparatus 200 includes a first and second rail 208 and 210 which are disposed above the upper rails 24 of the first and second track 20 and 22 and positioned so as to engage wheels 212 operably associated and connected to the hook assembly 202. Although the wheels 212 may extend directly from the one or more hooks 204, as illustrated, more typically the hooks 204 are part of a sub-assembly which extends between the support rails 208 and 210, the wheels 212 being rotatably and operably attached to the ends thereof so as to ride along the rails 208 and 210.

Moreover, similar to that described above, in a particularly preferred embodiment the rails 208 and 210 are slightly bowed or curved so as to lift the storage unit 16 over the gaps of the inner rails 32 and 34, so that the first set or main wheels 38 of the storage unit 16 do not become caught therein.

An actuator 214 is operably connected to the hook assembly 202 and adapted to move the hook assembly 202 into engagement with the catch 206 of the storage unit 16, and push, and somewhat lift, the storage unit 16 across the length of the upper rails 24 until the storage unit 16 is disposed in the desired column. In one embodiment, the actuator 214 comprises a telescopic ram 216, having one end thereof attached to the hook assembly 202, and another end thereof operably connected to a power drive or gear box 218, which selectively extends the ram 216, and retracts the ram 216 in a controlled manner, such as that dictated by control circuitry, as discussed above.

Figure 90:
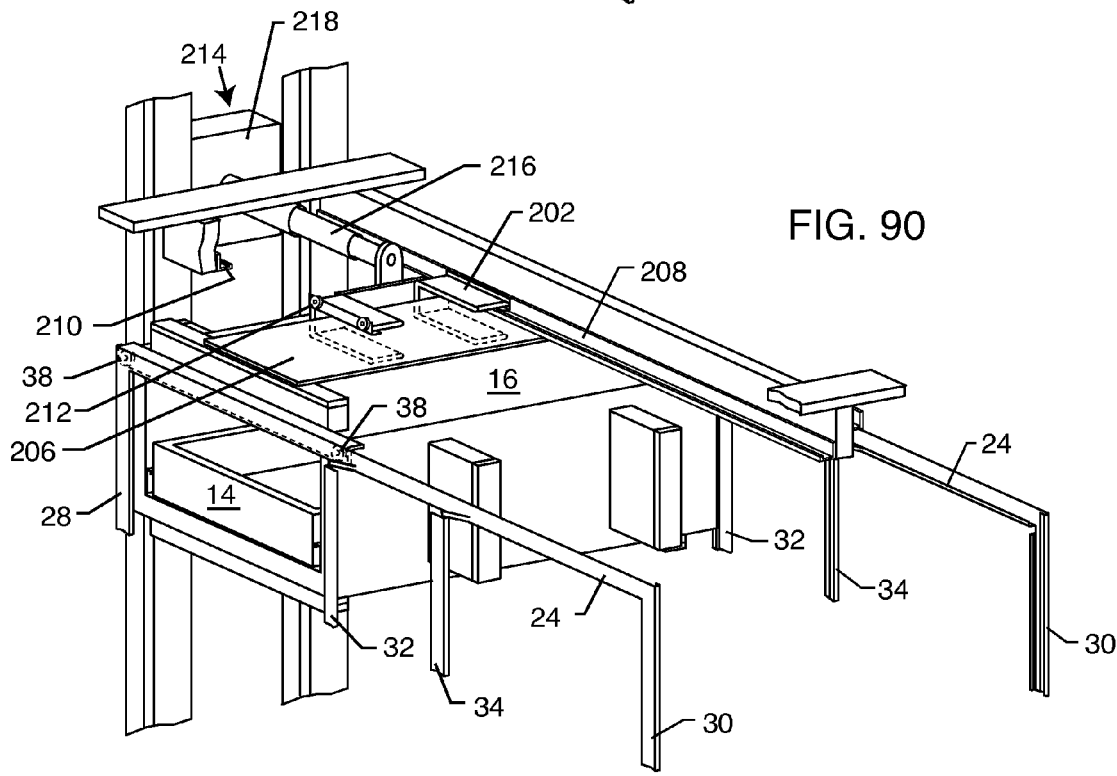
FIG. 90 is a perspective view similar to FIG. 89, but illustrating a hook assembly thereof engaged with a catch of the storage unit, in accordance with the present invention.

With continuing reference to FIGS. 88-92, with the storage unit 16 in the first vertical end track, the wheels 38 of which are riding in vertical tracks 28 and 32, and being at the uppermost position of the column of storage units, in order to move the storage unit 16, the actuator 214 is activated so as to extend outwardly the ram 216, causing the hook assembly 212, and more particularly the one or more hooks 204 to engage the catch 206 of the storage unit 16, as illustrated in FIG. 90.

As mentioned above, wheels 212 of the hook assembly 202 are moved along the rails 208 and 210. The main or first set of wheels 38 of the storage unit 16 ride upon the upper rails, or are lifted slightly out of engagement therewith. This prevents the wheels 38 from falling into the inner rail 32 or 34 before the storage unit 16 has been moved to the adjacent column, or the second vertical track in the end column, as illustrated.

Figure 91:
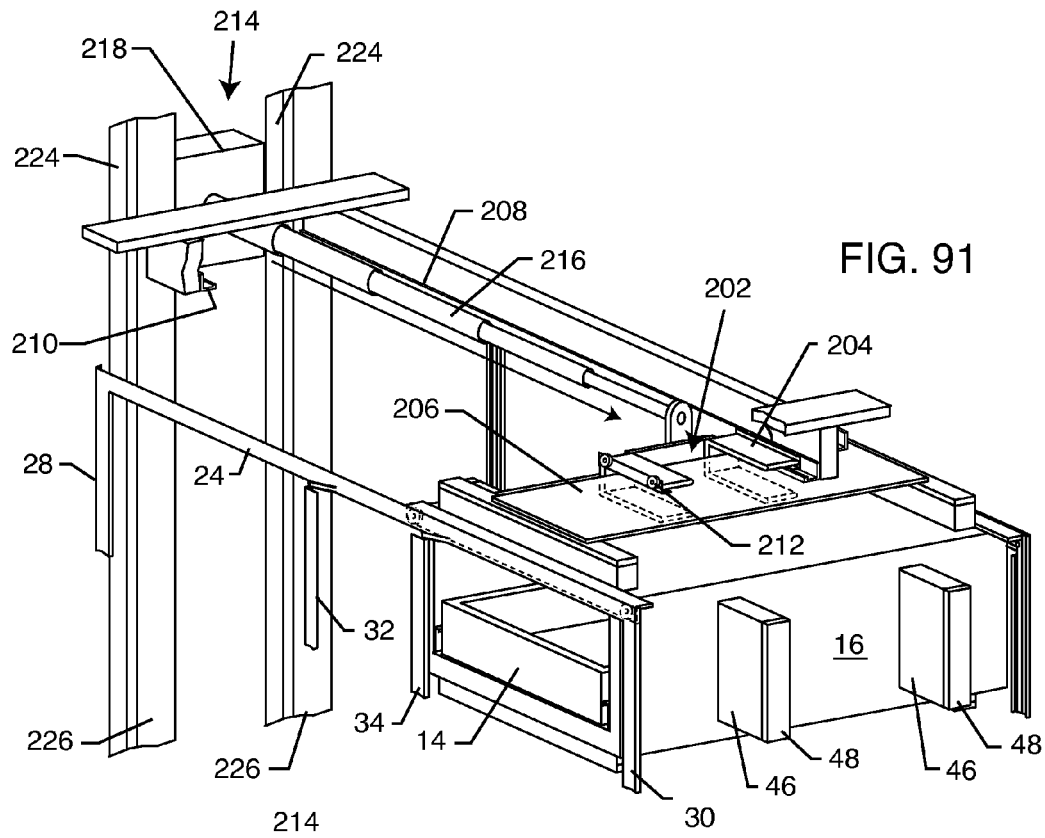
FIG. 91 is a partially fragmented perspective view similar to FIG. 90, but illustrating the storage unit moved from a first vertical track to a second vertical track, in accordance with the present invention.
Figure 92:
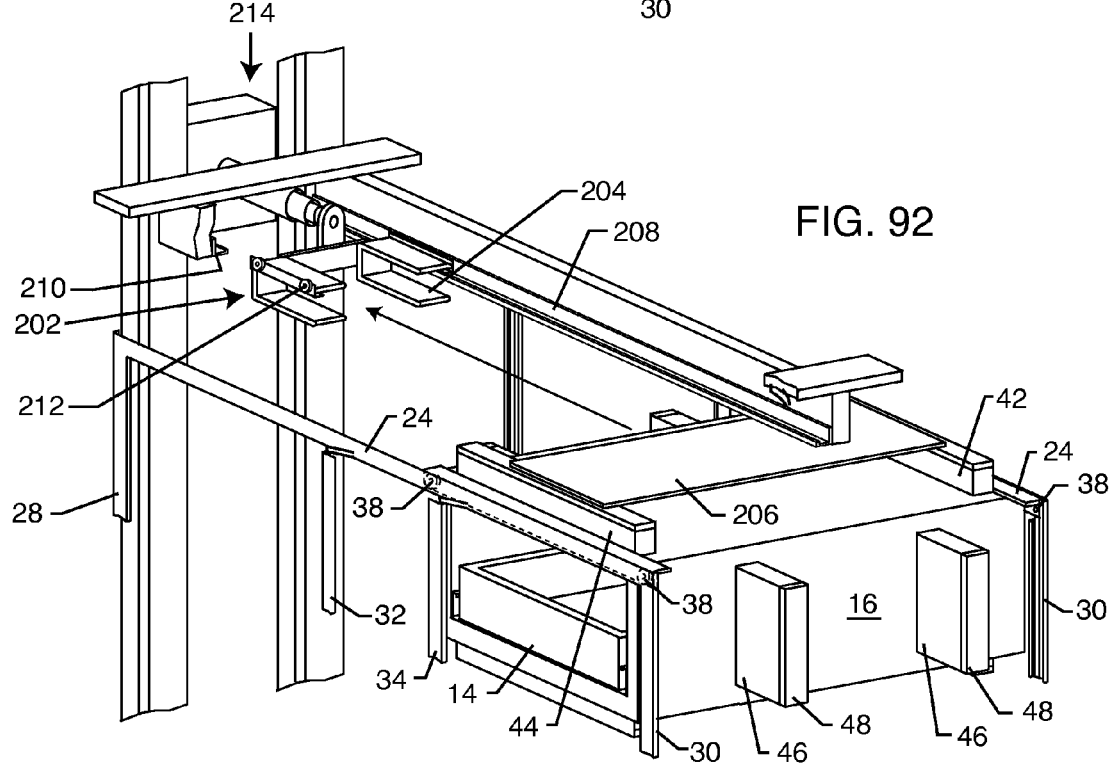
FIG. 92 is a partially fragmented perspective view similar to FIG. 91, but illustrating the retraction of the hook assembly, in accordance with the present invention.

With reference now to FIGS. 91 and 92, the actuator 214 continues to extend the ram 216, and thus the hook assembly 202 and the storage unit 16 until the storage unit 16 is in the proper column, the far right end column as illustrated, wherein the wheels 38 are in alignment with the rails 30 and 34 of the second vertical track, as illustrated in FIGS. 91 and 92. At this point, the actuator 214 will reverse and withdraw the ram 216, and thus the hook assembly 202 back to its starting point in a reciprocal manner.

Figure 93:
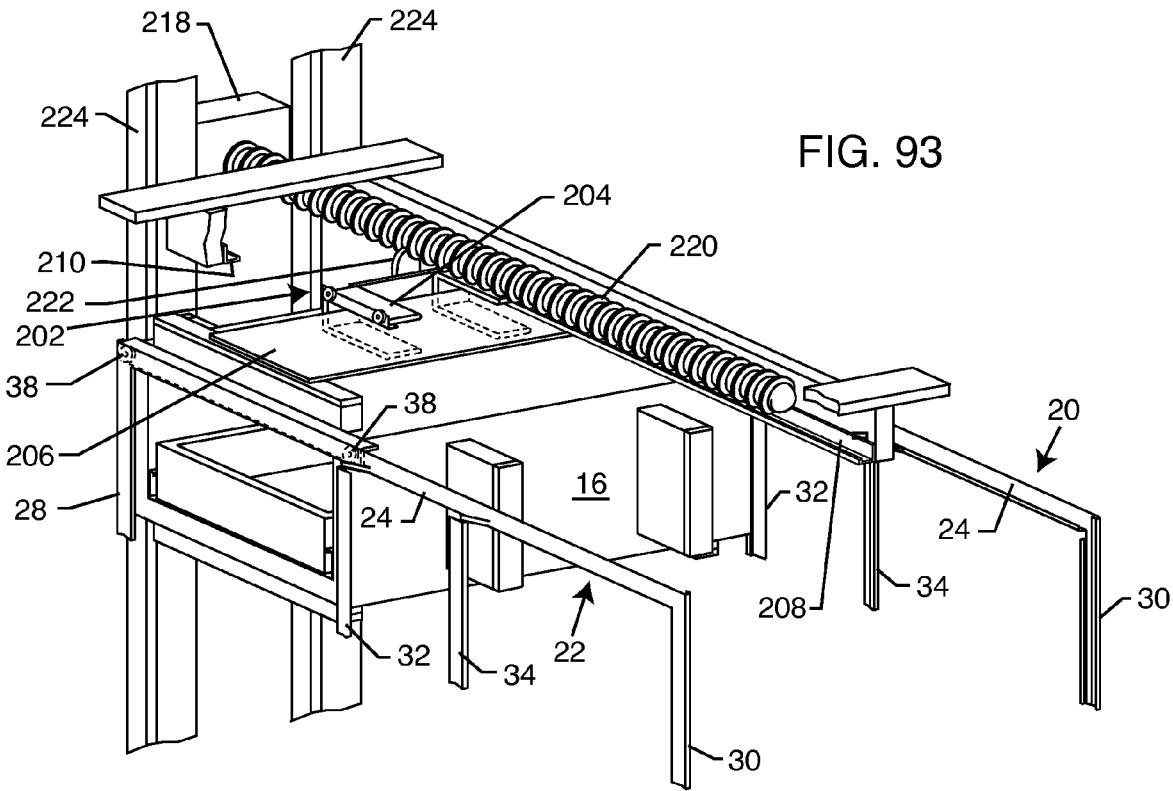
FIG. 93 is a perspective view illustrating a conveyor apparatus with a worm drive actuator.
Figure 94:
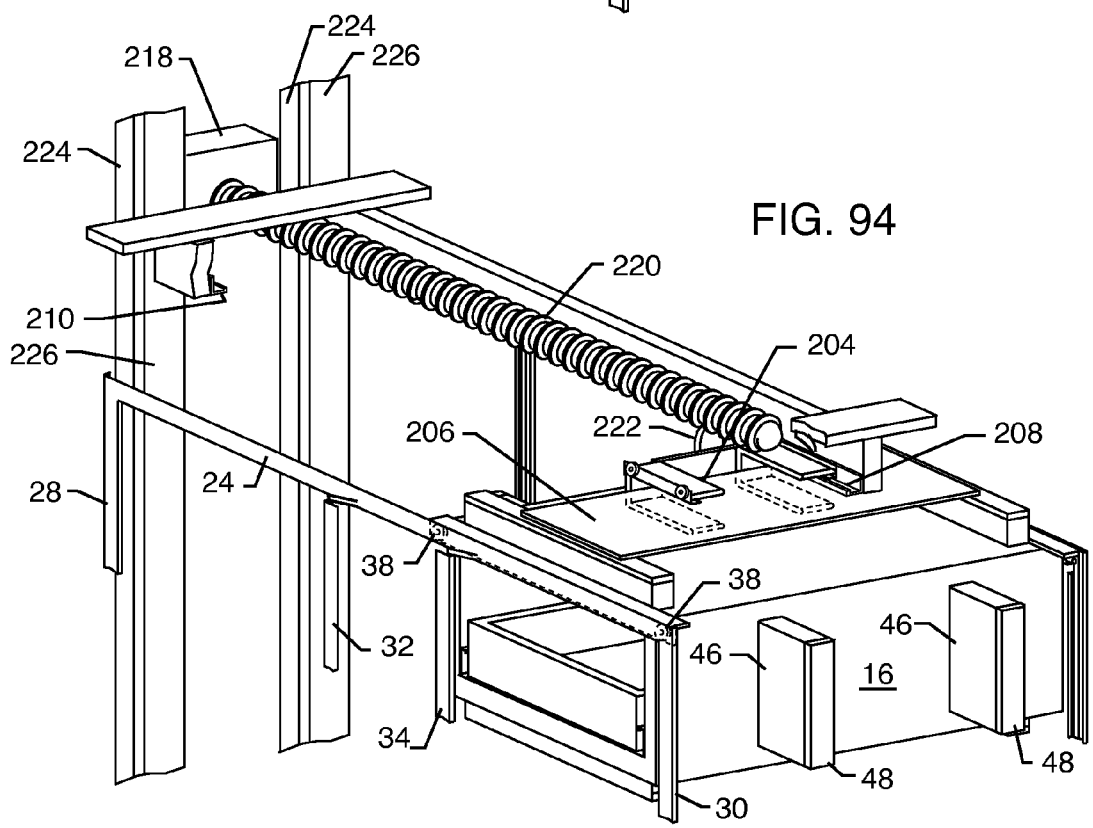
FIG. 94 is a perspective view similar to FIG. 93, but illustrating the hook assembly, and storage unit, moved from one end of the track to the opposite end of the track, in accordance with the present invention.

With reference now to FIGS. 93 and 94, it is contemplated by the present invention that other types of actuators can be implemented in order to engage the hook assembly 202 with the catch 206 and move the storage unit 16. For example, as illustrated in FIGS. 93 and 94, a worm screw 220 may be rotated in a first direction, and engaged with an extension and coupling member 222 of the hook assembly 202 such that the rotation of the worm screw or drive 220 in a first direction moves the coupling 222, and thus the hook assembly 202 from left to right, and reversing the rotation returns the hook assembly 202 to its original start position.

It has also been found that the storage unit 16, particularly when heavy laden with objects, can swing somewhat outwardly, particularly when residing in the vertical tracks 28-34. Of course, this can present problems in the smooth travel and alignment of the storage units 16 in their various columns.

In order to remedy this drawback, vertical support guides or beams 224 are disposed at opposite ends of the continuous track. FIGS. 88-94 illustrate a first set of such vertical support beams 224 at a first end of the track, and it will be appreciated that a second set of such guides or beams 224 are positioned at the opposite end of the track. However, such are not illustrated so as to make the operation of the conveyor apparatus 200, disclosed above, clear.

In a particularly preferred embodiment, the support beams or guides 224 are vertical and extend substantially the length of the columns of stacked storage units, that is slightly above the upper rails 24, and slightly below the lower rails 26. The elongated guides or supports 224 typically include a front face material 226 having low friction characteristics, such as Teflon. These Teflon faces 226 come into contact with the Teflon faces 48 of the spacers 46 extending outwardly from each side or end of the storage unit 16. In this manner, as the Teflon faces 48 and 226 move past one another, there is a relatively low amount of friction, permitting the storage units 16 to move vertically downwardly or upwardly as needed. If, at the same time, the storage units 16 do not pivot outwardly, such movement being prevented by the elongated guide members 224. It will be appreciated that the Teflon faces 48 and 226 can always be in contact with one another when the storage units 16 are in the first and second end columns, or slightly spaced apart from one another such that they only contact when the storage unit 16 moves out of vertical alignment slightly.

Although several embodiments have been described in detail for purposes of illustration, various modifications may be made to each without departing from the scope and spirit of the invention. Accordingly, the invention is not to be limited, except as by the appended claims.

What is claimed is:

1. A storage and retrieval system, comprising:
    a first track having a generally rectangular configuration, and including a pair of spaced apart inner rails extending between upper and lower rails thereof;
    a second track having a generally rectangular configuration, and including a pair of spaced apart inner rails extending between upper and lower rails thereof, the first and second tracks disposed generally parallel to one another and cooperatively forming a continuous track;
    a first support rail fixedly disposed above a gap defined by the inner rails of the first track and the upper rail of the first track, the first support rail extending at least the length of the gap between the inner rails of the first track, but less than a length of the upper rail;
    a second support rail fixedly disposed above a second gap defined by the inner rails of the second track and the upper rail of the second track, the second support rail extending at least the length of the second gap between the inner rails of the second track, but less than a length of the upper rail of the second track;
    a plurality of individual storage units stacked in multiple columns and disposed between the first and second tracks;
    a first set of wheels extending from each storage unit and configured to engage the upper rails or lower rails of the first and second tracks so as to suspend the storage unit from the upper or lower rails of the first and second tracks when disposed at an uppermost or lowermost position in the column and permit selective movement along the continuous track;
    a second set of wheels extending from each storage unit in spaced relation to the first set of wheels and which engage the first and second support rails and support the storage unit as the storage unit moves past the gaps between the inner rails of the first and second tracks; and
    means for selectively moving the storage units along a length of the continuous track.

2. The system of claim 1, wherein the upper and lower rails of the first and second tracks are generally parallel and spaced apart.

3. The system of claim 2, wherein the first and second tracks further each comprise a first vertical end rail interconnecting the upper and lower rails, a second vertical end rail extending between the upper and lower rails in spaced relation to the first vertical end rail, and the inner rails extending between the upper and lower rails.

4. The system of claim 3, wherein the first vertical end rail and the inner rail adjacent thereto of each of the first and second tracks cooperatively form a first vertical track, and the second vertical end rail and the inner rail adjacent thereto of each of the first and second tracks cooperatively form a second vertical track.

5. The system of claim 1, wherein the multiple columns comprises a first end column and a second end column of stacked storage units.

6. The system of claim 5, including a column of stacked storage units disposed between the first and second end columns.

7. The system of claim 1, wherein the means for selectively moving comprises:
   a first vertical actuator having an arm selectively movable under a bottom storage unit of a first end column, and adapted to lift the first end column of storage units;
   a first horizontal actuator for moving a storage unit from a top position in the first end column to a top position in an adjacent column;
   a second vertical actuator having a second arm selectively movable under a storage unit positioned immediately above a bottom storage unit of a second end column of storage units, and adapted to support all but the bottom storage unit of the second end column of storage units; and
   a second horizontal actuator for moving the bottom storage unit from a bottom position in the second end column to a bottom position of the first end column.

8. The system of claim 7, wherein the first and second horizontal actuators include a ram adapted to extend from and contact a side wall of a storage unit at a top position of the first or second end column and push the storage unit to the adjacent column.

9. The system of claim 7, wherein the first and second horizontal actuators and the first and second vertical actuators are power-driven.

10. The system of claim 7, including control circuitry for coordinating the movement of the actuators.

11. The system of claim 1, including a stop disposed on the upper rail, intermediate the ends thereof, of the at least the first or second track and adapted to permit one-way travel of a storage unit past the stop.

12. The system of claim 11, wherein at least a portion of the stop is biased away from the rail.

13. The system of claim 1, the first set of wheels extend from the storage unit a first distance for engagement with the upper and lower rails, and wherein the second set of wheels extend from the storage unit a second distance for engagement with the support rails.

14. The system of claim 1, wherein the system includes means, apart from the track itself, for determining balance of the storage units.

15. A storage and retrieval system, comprising:
   first and second tracks in spaced apart and parallel relation to one another, the first and second tracks cooperatively forming a continuous track, the first and the second tracks each comprising generally parallel and spaced apart upper and lower horizontal rails, a first vertical end rail interconnecting the upper and lower rails, a first vertical intermediate rail extending between the upper and lower rails in spaced relation with the first vertical end rail, the first vertical end rail and the first vertical intermediate rail cooperatively forming a first vertical track, a second vertical end rail extending between the upper and lower rails, and a second vertical intermediate rail extending between the upper and lower rails in spaced relation to the second vertical end rail, the second vertical end rail and the second vertical intermediate rail cooperatively forming a second vertical track;
   a first support rail fixedly disposed above a gap defined by the first and second vertical intermediate rails of the first track and the upper rail of the first track, the first support rail extending at least the length of the gap between the first and second vertical intermediate rails of the first track;
   a second support rail fixedly disposed above a second gap defined by the first and second vertical intermediate rails of the second track and the upper rail of the second track, the second support rail extending at least the length of the second gap between the first and second vertical intermediate rails of the second track;
   a plurality of individual storage units stacked in multiple columns and disposed between the first and second tracks;
   a first set of wheels extending from each storage unit and configured to engage the upper rails or lower rails of the first and second tracks so as to suspend the storage unit from the upper or lower rails when disposed at an uppermost or lowermost position in the column and permit selective movement along the continuous track;
   a second set of wheels extending from each storage unit in spaced relation to the first set of wheels and which engage the first and second support rails as the storage unit is moved between the first vertical track to the second vertical track of the first and second tracks; and
   means for selectively moving the storage units along a length of the continuous track.

16. The system of claim 15, wherein the multiple columns comprises a first end column and a second end column of stacked storage units.

17. The system of claim 16, including a column of stacked storage units disposed between the first and second end columns.

18. The system of claim 16, wherein the means for selectively moving comprises:
   a first vertical actuator having an arm selectively movable under a bottom storage unit of the first end column, and adapted to lift the first end column of storage units;
   a first horizontal actuator for moving a storage unit from a top position in the first end column to a top position in an adjacent column;
   a second vertical actuator having a second arm selectively movable under a storage unit positioned immediately above a bottom storage unit of a second end column of storage units, and adapted to support all but the bottom storage unit of the second end column of storage units; and
   a second horizontal actuator for moving the bottom storage unit from a bottom position in the second end column to a bottom position of the first end column.

19. The system of claim 18, wherein the first and second horizontal actuators include a ram adapted to extend from and contact a side wall of a storage unit at a top position of the first or second end column and push the storage unit to the adjacent column.

20. The system of claim 18, wherein the first and second horizontal actuators and the first and second vertical actuators are power-driven.

21. The system of claim 18, including control circuitry for coordinating the movement of the actuators.

22. The system of claim 15, including a stop disposed on the upper rail, intermediate the ends thereof, of the at least the first or second track and adapted to permit one-way travel of a storage unit past the stop.

23. The system of claim 22, wherein at least a portion of the stop is biased away from the rail.

24. The system of claim 15, the first set of wheels extend from the storage unit a first distance for engagement with the upper and lower rails, and wherein the second set of wheels extend from the storage unit a second distance for engagement with the support rails.

25. The system of claim 15, wherein the system includes means, apart from the track itself, for determining balance of the storage units.

* * * * *